US005727161A

United States Patent [19]
Purcell, Jr.

[11] Patent Number: 5,727,161
[45] Date of Patent: Mar. 10, 1998

[54] METHOD AND APPARATUS FOR GRAPHIC ANALYSIS OF VARIATION OF ECONOMIC PLANS

[75] Inventor: W. Richard Purcell, Jr., Boulder, Colo.

[73] Assignee: PlanScan, LLC, Boulder, Colo.

[21] Appl. No.: 307,946

[22] Filed: Sep. 16, 1994

[51] Int. Cl.⁶ .................. G06F 17/60; G06F 7/48
[52] U.S. Cl. .................. 395/207; 395/764; 395/230
[58] Field of Search .................. 364/408, 402, 364/401, 406; 395/140, 141, 142, 143, 144, 145, 147, 148, 155, 161

[56] References Cited

U.S. PATENT DOCUMENTS

| | | | |
|---|---|---|---|
| 5,121,499 | 6/1992 | McCaskill et al. | 395/700 |
| 5,303,146 | 4/1994 | Ammirato et al. | 364/401 |
| 5,371,675 | 12/1994 | Greif et al. | 364/419.1 |
| 5,375,201 | 12/1994 | Davoust | 395/161 |
| 5,461,708 | 10/1995 | Kahn | 395/140 |

OTHER PUBLICATIONS

Borland Quattro Pro for Windows, Building Spread Sheet Applications, 1993, pp. 17–31, 548–557.
Borland Quattro Pro for Windows, user Manual, 1993, pp. 5, 86–91, 207–209, 221, 239, 267–277, 287, 415–421, 493–499, 475–479.
An Introduction to CAD Using Cadkey, Hugh F. Keedy PWS–Kent Publishing, 1991, pp. 15–19.
Quattro Pro Version 2.0 User's Guide; Borland International; copyright 1987, 1990; pp. 146–148, 333–381, 535–546.

*MicroWarehouse*, Microsoft Products Guide, vol. 1.0, pp. 3e–3f.

*TigerSoftware*, vol. IV, No. 5, pp. 66–67, 69–70.

*Primary Examiner*—Gail O. Hayes
*Assistant Examiner*—Stephen R. Tkacs

[57] ABSTRACT

Graphic analyses are displayed on a computer display screen showing graph lines of mathematical relationships between goals and factors in a spreadsheet plan and depicting continuums of what-ifs across ranges of variation from the spreadsheet plan, providing information for planning and management of the factors to improve results for the goals. Goals and factors reflect elements of the plan for which, in the spreadsheet, values are contained in output and input cells respectively. The goals and factors are selected by the user from lists that are created and displayed. After such selection, the designated graphic analysis is performed and the graph lines for the selected goal and factor(s) are displayed. The user is able to analyze and evaluate entire ranges of "what-if" possibilities using the graph lines. Desired graph points can be moved to interactively in order to arrive at desired what-if possibilities. At any selected what-if possibility, print and numeric text can be displayed that provides information about the selected what-if possibility. For any desired graph point, a new spreadsheet plan model can be generated with new data reflecting the selected graph point. Selected graphic analyses can be saved in a method and customized user interface that simplify later redevelopment of the graphic analyses ready for further interactive moves to what-if possibilities.

72 Claims, 55 Drawing Sheets

| | PROD DEV | | SALES PERIODS | | | | | | | | |
|---|---|---|---|---|---|---|---|---|---|---|---|
| | START 1st Qtr | Last | Y1 Q1 | Y1 Q2 | Y1 Q3 | Y1 Q4 | Y2 Q1 | Y2 Q2 | Y2 Q3 | | |
| ProdSales | | | 126 | 315 | 504 | 693 | 882 | 1071 | 1260 | | |
| ConsultRev | | | 60 | 150 | 240 | 330 | 420 | 510 | 600 | | |
| REVS | | | 186 | 465 | 744 | 1023 | 1302 | 1581 | 1860 | | |
| UnitsCost | | | 12 | 30 | 48 | 66 | 84 | 102 | 120 | | |
| ConsultCost | | | 36 | 90 | 144 | 198 | 252 | 306 | 360 | | |
| TekSupportCost | | | 36 | 54 | 72 | 90 | 108 | 126 | 144 | | |
| Commisns | | | 9 | 23 | 37 | 51 | 65 | 79 | 93 | | |
| SalesStaff | | | 96 | 114 | 132 | 150 | 168 | 186 | 204 | | |
| AdminCost | | | 81 | 99 | 117 | 135 | 153 | 171 | 189 | | |
| ProfServices | | | 27 | 3 | 3 | 3 | 3 | 3 | 3 | | |
| DevStaff | 90 | 300 | 90 | 90 | 90 | 90 | 90 | 90 | 90 | | |
| DevOffice | 45 | 150 | 45 | 45 | 45 | 45 | 45 | 45 | 45 | | |
| Depreciatn | 2 | 6 | 2 | 2 | 3 | 3 | 3 | 4 | 4 | | |
| COSTS | 137 | 456 | 434 | 551 | 691 | 831 | 972 | 1112 | 1252 | | |
| PretaxProfit | -137 | -456 | -248 | -86 | 53 | 192 | 330 | 469 | 608 | | |
| Tax | | | 0 | 0 | 0 | 0 | 0 | 43 | 152 | | |
| NETPROFIT | -137 | -456 | -248 | -86 | 53 | 192 | 330 | 426 | 456 | | |

FIG. 3

|  | START | PROD DEV 1st Qtr | Last | SALES PERIODS Y1 Q1 | Y1 Q2 | Y1 Q3 | Y1 Q4 | Y2 Q1 | Y2 Q2 | Y2 Q3 |
|---|---|---|---|---|---|---|---|---|---|---|
| ProdSales |  |  |  | 101 | 252 | 403 | 554 | 706 | 857 | 1008 |
| ConsultRev |  |  |  | 60 | 150 | 240 | 330 | 420 | 510 | 600 |
| REVS |  |  |  | 161 | 402 | 643 | 884 | 1126 | 1367 | 1608 |
|  |  |  |  |  |  |  |  |  |  |  |
| UnitsCost |  |  |  | 10 | 24 | 38 | 53 | 67 | 82 | 96 |
| ConsultCost |  |  |  | 36 | 90 | 144 | 198 | 252 | 306 | 360 |
| TekSupportCost |  |  |  | 36 | 54 | 72 | 90 | 108 | 126 | 144 |
| Commisns |  |  |  | 8 | 20 | 32 | 44 | 56 | 68 | 80 |
| SalesStaff |  |  |  | 96 | 114 | 132 | 150 | 168 | 186 | 204 |
| AdminCost |  |  |  | 81 | 99 | 117 | 135 | 153 | 171 | 189 |
| ProfServices |  |  |  | 27 | 3 | 3 | 3 | 3 | 3 | 3 |
| DevStaff |  |  | 300 | 90 | 90 | 90 | 90 | 90 | 90 | 90 |
| DevOffice |  |  | 150 | 45 | 45 | 45 | 45 | 45 | 45 | 45 |
| Depreciatn |  |  | 6 | 2 | 2 | 3 | 3 | 3 | 4 | 4 |
| COSTS |  |  | 456 | 431 | 542 | 676 | 811 | 946 | 1081 | 1216 |
|  |  |  |  |  |  |  |  |  |  |  |
| PretaxProfit |  |  | -456 | -270 | -140 | -33 | 73 | 180 | 286 | 392 |
| Tax |  |  |  | 0 | 0 | 0 | 0 | 0 | 0 | 0 |
| NETPROFIT |  |  | -456 | -270 | -140 | -33 | 73 | 180 | 286 | 392 |

| | A | B | C | D | E | F | G | H | I | J | K |
|---|---|---|---|---|---|---|---|---|---|---|---|
| 1 | | CONDO | | | | | | | | | |
| 2 | | | | | | | | | | | |
| 3 | | GOALS | | | | | | | | | |
| 4 | | Net Present Value | 10.65 | | | | | | | | |
| 5 | | Rate of Return | 23.48 | | | | | | | | |
| 6 | | Max Cash Out | -133.75 | | | | | | | | |
| 7 | | Valuation | 210.65 | | | | | | | | |
| 8 | | | | | Year: | 0 | 1 | 2 | 3 | 4 | 5 |
| 9 | | FACTORS | | | Purchase/sale | -200 | | | | | 300 |
| 10 | | Price | 200 | | Loan/repayment | 160 | -30 | -30 | -30 | -30 | -40 |
| 11 | | Financed Percent | 80 | | Rent | | 24 | 26 | 28 | 30 | 32 |
| 12 | | Principal Payment | 30 | | Interest | | -12 | -9.75 | -7.5 | -5.25 | -3 |
| 13 | | Interest Rate | 7.5 | | Maintenance | | -3 | -3 | -3 | -3 | -3 |
| 14 | | Rent, % plan | 100 | | Depreciation | | -5 | -5 | -5 | -5 | -5 |
| 15 | | Maintenance | 3 | | Tax ord | | -2 | -4.13 | -6.25 | -8.38 | -10.5 |
| 16 | | Depreciation Life | 40 | | Tax cap | | | | | | -18.75 |
| 17 | | Value Inflation | 10 | | Net Cash Flow | -40 | -23 | -20.88 | -18.75 | -16.63 | 256.75 |
| 18 | | Min ROI Rate | 20 | | Cum Cash Flow | -40 | -63 | -83.88 | -102.6 | -119.3 | 137.5 |
| 19 | | | | | Present Value | -40 | -19.17 | -14.5 | -10.85 | -8.02 | 103.18 |
| 20 | | | | | Cum PV | -40 | -59.17 | -73.66 | -84.51 | -92.53 | 10.65 |

FIG. 14

(Spreadsheet screenshot with menu: File Edit View Style Tools Range Window Help)

Column E header labeled FORMULAS / CURRENT FILE:

- L11: -$C11*1000/($C17)/1000
- K11: -$C11*1000/($C17)/1000
- J11: -$C11*1000/($C17)/1000
- I11: -$C11*1000/($C17)/1000
- H11: -$C11*1000/($C17)/1000
- G6: -C11*1000/1000
- L6: 200000*(1+(C18/100)*C25)/1000
- L13: -($C22/100)*(L6+G6+@SUM(H11..L11))/1000
- L10: -$C16*1000/1000
- K7: -C13*1000/1000
- J7: -C13*1000/1000
- I7: -C13*1000/1000
- H7: -C13*1000/1000
- G7: (C11*1000)*C12/100/1000
- L9: -($C14/100)*@SUM($G7..K7)

Labels in column F: Purchase/sale, Loan, Rent, Intere, Main, Depr, Tax, Tax, Net, CUM, Pres Year 0, 1, 2, 3
Values: -200.00, 0.00, 0.00, 0.00, 0.00

Audit dialog:

Audit:
- ● All formulas
- ○ Formula precedents
- ○ Cell dependents
- ○ Circular references
- ○ File links
- ○ DDE links Produce a:
- ○ Selection
- ● Report at range: [E2]

Limit audit to:
- ● Current file
- ○ All files

Labels: 1401, 1402, 1403

|   | A | B | C | D | E | F | G |
|---|---|---|---|---|---|---|---|
| 1 |   | CONDO |   |   |   |   |   |
| 2 |   |   |   | PRECEDENTS OF CELL C5 |   |   |   |
| 3 |   | GOALS |   | CURRENT FILE |   |   |   |
| 4 |   | Net Present Value | 10.65 | L19: @SUM($G18..L18) |   |   |   |
| 5 |   | Rate of Return | 23.48 | G18: +G15*1/(1+($C19/100))^G4 |   |   |   |
| 6 |   | Max Cash Out | -134 | H18: +H15*1/(1+($C19/100))^H4 |   | Purchase/sale | -200.00 |
| 7 |   | Valuation | 210.65 | I18: +I15*1/(1+($C19 |   | Year | 0 |
| 8 |   |   |   | J18: +J15*1/(1+($C1 |   |   |   |
| 9 |   | FACTORS |   | K18: +K15*1/(1+($C |   |   |   |
| 10 |   | Price | 200 | L18: +L15*1/(1+($C1 |   |   |   |
| 11 |   | Financed Percent | 80 | G15: @SUM(G6..G1 |   |   |   |
| 12 |   | Principal Payment | 30 | C19: 20 |   |   |   |
| 13 |   | Interest Rate | 7.5 | G4: 0 |   |   |   |
| 14 |   | Rent % plan | 100 | H15: @SUM(H6..H1 |   |   |   |
| 15 |   | Maintenance | 3 | H4: 1 |   |   |   |
| 16 |   | Depreciation Life | 40 | I15: @SUM(I6..I10)+ |   |   |   |
| 17 |   | Value Inflation | 10 | I4: 2 |   |   |   |
| 18 |   |   |   | J15: @SUM(J6..J10 |   |   |   |

Audit

Audit:
- ○ All formulas
- ● Formula precedents
- ○ Cell dependents
- ○ Circular references
- ○ File links
- ○ DDE links Produce a:
- ○ Selection
- ● Report at range: E2

Limit audit to:
- ● Current file
- ○ All files

METHOD AND APPARATUS FOR GRAPHIC ANALYSIS OF VARIATION OF ECONOMIC PLANS

FIELD OF THE INVENTION

The present invention relates to providing economic information in particular, to the production and displaying of a continuum of "what-if" scenarios of causative factor data and resulting goal data for a plan entered in an electronic spreadsheet.

BACKGROUND OF THE INVENTION

In planning and managing economic investments and operations, results for numerical goals are typically determined by scores of quantifiable factors that managers and investors plan, predict and manage, for which there are thousands of possible combinations that lead through chains of mathematical calculations to thousands of possibilities for results for the goals. For zeroing in on optimal combinations of factors leading to best results for the goals, investors and managers need best information on how the factors and combinations of factors affect the goals across the ranges and panoramas of possibilities for the plan. Modern computer technology offers calculation power to develop and deliver such information. But to date, no system has been developed that fully applies the potential of computer technology to develop and deliver such information.

With respect to providing information that assists the decision-maker, electronic spreadsheets are well-known and powerful planning and management tools. Spreadsheets organize and present financial or accounting information. The spreadsheet includes a number of cells that contain data entered by the preparer or user that comprise the spreadsheet plan-model. Each of these cells is separately identifiable by column and row, and typically each row has a name in a cell at its left and each column has a heading in a cell at top. Some of the cells have formulas associated with them. For example, data in one cell may be a function of the data or the value in another cell.

The spreadsheet format of columns and rows has been used for centuries. However, relative to the information on ranges of possibilities that managers and investors needed to make decisions, such spreadsheets have had a number of drawbacks, including: each spreadsheet was very expensive, in human time and cost, to prepare; each spreadsheet was prone to human error in calculation and writing; in comparison to the number of what-if possibilities for business factors and goal results, a single spreadsheet reflected only a single dot or single possibility. Adding additional spreadsheets added more numbers tending to cause most managers and investors to be overwhelmed by all of the numbers. Furthermore, each spreadsheet did not reveal relationships between key factors and key goals. Typically, in proceeding from business factors to goal results, a number of calculations or chains of calculations had to be stepped through.

In more recent times, modern processors have speeded calculations and eliminated human calculation mistakes. Even more recently, spreadsheet software packages have been developed and commercialized, such as LOTUS 1-2-3® available from Lotus Development Corporation, EXCEL® available from Microsoft Corporation, and QUATTRO PRO® available from Novell, Inc. Such software not only displays a spreadsheet on a computer display, but also uses the processing power of the personal computer to perform desirable or appropriate functions, such as calculating spreadsheet data using formulas that interrelate different cells of the spreadsheet. These electronic spreadsheets receive input data that is inserted into some cells using a keyboard or a mouse. Automatic calculations are made to determine the value of data in other cells using the afore-noted formulas. In this manner, the electronic spreadsheet includes inputted data comparable to that inputted by hand using paper generated spreadsheets, as well as data calculated using the processing power of the computer.

In one embodiment of an electronic spreadsheet, it is known to adjust spreadsheet data to reflect any one of a number of "what-if" scenarios. Each of these is displayed as a table of data containing different user-entered input data representing an "if" together with output data calculated to reflect the resultant "what." According to this method, by changing input data to reflect one and then another "if," a spreadsheet plan-model can be changed into one and then another of a number of what-if scenario data tables, which can be viewed sequentially on the computer display for analysis by the user.

Such electronic spreadsheets still suffer from major deficiencies. They only develop and show what-if scenarios for a plan one at a time, with each in the format of a table of numbers. The manager or investor must examine a number of tables and can easily become lost or confused in the spreadsheet numbers. The current modern spreadsheet also does not show relationships between business factors and goal results any more than hand generated and calculated spreadsheet data.

Current spreadsheet software also offers business graphics for visual presentation and comparisons of individual numbers displayed in spreadsheets, including pie graphs, bar graphs and "line" graphs (dots representing several numbers that are connected by lines with no informational content). Such business graphics are merely graphic depictions of parts of individual spreadsheet data tables. They depict individual discrete data elements contained in particular individual spreadsheet cells, rather than mathematical relationships between inputs and outputs and continuums of what-ifs. Like the spreadsheet itself, each such graph depicts values contained in the spreadsheet at one time and do not effectively respond to the above-noted spreadsheet deficiencies.

Hence, it would be advantageous to develop and display what-if related spreadsheet scenarios in a way that optimizes the organization and understanding of such information by showing key factor(s)/goal(s) relationships and visually represent what-if scenarios involving spreadsheet factors and goals associated with a vast number of possible what-if scenarios on a single graph.

SUMMARY OF THE INVENTION

In accordance with the present invention, method and apparatus are provided for graphically developing and displaying a continuum of what-if scenarios derived, in a preferred embodiment, from spreadsheet plan-model data entered by a user. The present invention develops and displays graphic analyses of entire ranges of hundreds and thousands of what-if possibilities for an economic plan in which each possibility is defined in terms of values of economic factors and goal results, in graphic-analysis formats that show priorities, trade-offs, alternative routes to higher results for the goal, and combinations of factors that represent thresholds of risks. For a typical spreadsheet plan-model, the present invention offers thousands of graphic analyses of different sets of factors and goal results, which are selectable from simple menus shown on a computer display. With respect to the what-if possibilities for the spreadsheet plan-model, on each graphic analysis, the user is able to move to various what-if graph points and at each graph point have factor and goal values displayed.

The apparatus of the present invention preferably includes a computer system that executes software for manipulating and displaying spreadsheet input and output data in the form of a graph. In one embodiment, this software includes a spreadsheet software package that displays an electronic spreadsheet having a number of columns and rows that define identifiable cells.

The software further includes a novel graphic analysis software package that links with the spreadsheet software and a plan-model it contains to request and manipulate plan-model data that is controllably organized and manipulated to develop one or more graphic analyses. Each of the graphic analyses contains one or more curved or straight lines that depict plan-model goal-factor relationships. More particularly, the spreadsheet plan-model includes cells containing externally entered input data and other cells that have associated formulas and display output data calculated to reflect the input data. After invoking the graphic modeling software, the user selects a first goal and at least a first factor for which he wants a graphic analysis presenting a goal-factor relationship and a range of variant what-ifs. Specifically, he selects a plan-model output as a first goal, for which he wants to see "what" results for various factor-value "ifs," and selects at least one plan-model input as a first factor, for which he wants to see effects of various "if" values on the "what" measured by the goal. Each goal and factor is identified by a name indicating its meaning to the user such as price, interest rate, depreciation, period(s) of time, sales, profit, rate of return, net present value, etc. For this selection process, the graphic modeling software identifies and provides lists of spreadsheet plan-model inputs and outputs and associated names, from which the user can develop lists of goals and factors identified by names for which graphic analyses are to be offered. In one embodiment of the invention, in the spreadsheet plan-model, the user determines those outputs to be offered as goals and those inputs to be offered as factors for graphic analyses, and structures the plan-model with these goals and factors and their names located in particular ranges of the spreadsheet plan-model to facilitate development of the goal and factor lists in the graphic modeling software.

Regardless of the embodiment employed to provide goal and factor lists, such lists are displayable on a display screen of the computer system in the form of menus. In one embodiment, a menu list of goals identified by name and a menu list of factors identified by name are displayed on a display screen of the computer system. The user is able to select one or more graphic analyses presenting different goal-factor relationships using such menu lists.

In one embodiment, from the two menu lists one goal and one factor are selected. The graphic modeling software then carries out the selected graphic analysis and creates a graph line showing the relationship of the goal to the factor and showing a range of variant what-ifs each defined by variant factor value and resultant variant goal value. In creating the graph line, variant data are determined for the factor relative to the factor data contained in the spreadsheet and corresponding goal values are determined using the spreadsheet as a calculator. A range of factor values above and below the spreadsheet data is determined. Within this range, factor values are determined for variant what-if graphpoints required to determine the graphic analysis goal value range and to develop the graph line. For each such factor value, the corresponding goal value is determined using the spreadsheet as a calculator, through insertion of the factor value into the plan-model and obtaining the resultant value for the goal calculated by the spreadsheet. In one embodiment, a direct goal-factor relationship expression is derived from the plan-model and used for such calculations. A graph of the goal variant values as a function of the factor variant values is created from the variant what-if value-sets each comprising determined factor variant data and associated calculated goal variant data. In the case of this first embodiment, for any selected goal a number of different graph lines setting out relationships of the goal to different factors can be created by selecting from the menu lists a goal and a number of factors. In accordance with this embodiment, in one graphic analysis a desired number of these different graph lines can be simultaneously developed and displayed.

In another embodiment, in addition to the first menu list of goals and the first menu list of factors a second menu list of the factors is also generated. In this embodiment, after selection of a goal, one factor is selected from each of the two factors menu lists. Similarly to the previous embodiment, graph lines are created setting out the relationship of the selected goal to the two selected factors in combination.

In the case of this second embodiment, a number of different graph lines are created, with each graph line representing a variant value of one of the two factors. Specifically, each graph line is representative of a different value for one of the two selected factors. The other factor is represented by horizontal position relative to the x-axis, and the goal is represented by vertical position relative to the y-axis.

For each of the two embodiments, once the graph is displayed, the graphic modeling software enables the user to obtain information and data related to the selected factor(s) and goal. In particular, when more than one graph line is displayed, the user is able to choose one of the plurality of graph lines for evaluating or analyzing factor and goal variant data that varies from the plan data that was previously entered as part of the plan-model spreadsheet. The chosen graph line is illustrated on the display screen so that it is distinguished from the other graph lines (e.g., by color). The user is able to cause a marker to "move along" this selected graph line in desired increments to one or more different graph points. In accomplishing this, a horizontal scroll bar is utilized. The horizontal scroll bar is illustrated or found along the factor or x-axis of the graph and is activated to cause horizontal marker movement in the desired direction (+or −) relative to plan data. The horizontal scroll bar functions with a dotted indicator line that is useful in identifying the factor variant data or value that was moved to along the selected graph line. The indicator line for the horizontal scroll bar is a dotted vertical line on the display screen and is horizontally movable relative to the horizontal axis.

Associated with this movable horizontal axis position indicator is a horizontal axis position meter, showing in the form of a number the value represented by the horizontal axis position moved to.

Where the vertical dotted line representing horizontal axis position meets the selected graph line, directly above the selected horizontal axis position, a dot is displayed representing the what-if possibility or scenario moved to. And from that dot, a vertical axis position indicator dotted line extends horizontally leftward to the vertical goal axis, showing graphically the resultant goal value of the what-if possibility moved to. This vertical goal axis position indicator also has an associated axis meter, showing in the form of a number the resultant goal value of the what-if moved to.

With this interactive move system, on a graphic analysis the user can move to any or each of a large number of what-if scenarios defined in terms of variant factor values and, for each, see the resultant goal value. In one embodiment, in which each graph line represents a different factor and the horizontal axis has a common denominator scale for variant values of any of the factors, on a single graphic analysis the user can select any of the depicted factors (graph line) and any of a range of variant values for that factor (horizontal axis position), and for each of these what-if possibilities see the resultant goal value. In another embodiment in which the horizontal axis represents a range of variant values for one factor and a set of graph lines, where each represents a different value for a second factor, on a single graphic analysis the user can move to any of a large number of combined variant values of two factors (graph line and horizontal axis position), and for each such what-if possibility see the resultant goal value.

Further, at any what-if graph point moved to, the system offers additional information on that what-if, including a numerical summary of values for all factors and goals at that what-if and comparisons of these values with those at other designated what-if graph points, including the factor and goal values of the graph point representing the originally entered spreadsheet plan-model.

Additionally, on each graphic analysis, the graphic modeling software provides a method for moving to various goal values, enabling the user to see various factor values or factor-value combinations that would produce particular goal results. A vertical scroll bar is displayed along the vertical goal axis, usable for moving to various vertical positions each representing a particular goal value. A "goal-line" extends horizontally across the graphic analysis at the height of the goal value moved to relative to the vertical axis, and an associated goal-line value meter shows the goal value moved to in the form of a number. By observing where this goal-line intersects each of one or more graph lines, the user can see one or more graph points each representing what-if factor values that will produce the goal value the user has moved to. What each of these graph points represents in factor values is readable by observing what the graph line represents as shown by its label and observing the position of the graph line's intersection of the goal-line relative to the horizontal axis. Furthermore, to assist the user in reading factor values that meet a goal value moved to, the graphic modeling software offers a system through which, after moving the goal-line to a desired goal value, for any one selected graph line or for all graph lines additional information is displayed both graphically and in the form of numbers to specify one or a plurality of factor values or factor-value combinations required to meet the designated goal value.

Returning to the graphic modeling software method for moving to individual what-if scenario graph points, each selected in terms of factor values, at any such graph point the user has selected, the user is able to create a new or modified spreadsheet that reflects the variant data for the selected graph point. From this, the display screen is able to display this new or revised spreadsheet, with the selected graph point being used as the new input or what-if for this new spreadsheet. Additionally, or alternatively, each graph that presents different input/output relationships can be saved or stored. When a number of graphs is saved, a menu can be created that includes names or labels of the saved graphs.

Based on the foregoing summary, a number of benefits and/or advantages of the present invention are readily seen. Information is developed and delivered on entire panoramas of possibilities for a plan and on the underlying relationships among the factors and goals, across ranges of possibilities above and below the values in the spreadsheet plan-model. Through the development and delivery of such information, priorities among factors relative to their effects on goals, trade-offs between alternative factor combinations relative to resulting goal values, alternative combinations of factors that result in particular user-defined goals, and combinations of factor values that force goal values below any particular user-defined minimum goal levels are provided. Such information based on spreadsheet plan-model data is developed and delivered using spreadsheet software products, as well as other plan-model entry devices. More particularly, from the spreadsheet plan-model, the present invention enables the operator/user to select inputs (factors) and outputs (goals) for creating a desired graph. In one embodiment, a number of different graph lines are displayed that illustrate relationships between each of a number of different factors and the same goal. In another embodiment, a graphic relationship is illustrated between a selected goal and any two selected factors in combination. In both embodiments, the developed and displayed information covers ranges of factor and goal values above and below the original or plan data entered in the spreadsheet plan-model, including goal-factor relationships not ever defined or shown in any formula in the typical spreadsheet plan-model. The graphic presentation of the present invention provides a concise visual delivery of spreadsheet plan-model analysis information for which users of all skill levels can benefit from assistance in both learning and ongoing application. In that regard, interactive moving is provided to various factor-goal graph points in the realm of what-if possibilities shown by each graphic analysis and presenting information associated with each such graph point that is moved to. The present invention is also able to create a new detailed spreadsheet plan-model reflecting the chosen graph point. Additionally, customized menus of particular graphic analyses and other customized user interfaces can be created, as well as saving the graphic analysis in storage memory using, for example, disk files.

Additional advantages of the present invention will become readily apparent from the following discussion, particularly when taken together with accompanying drawings.

BRIEF DESCRIPTION OF THE DRAWINGS

FIG. 3 illustrates a plan-model that includes data and other information of a representative, hypothetical company;

FIG. 4 illustrates the same spreadsheet plan-model of FIG. 3 except for a change to reflect a different what if;

FIG. 7 illustrates a spreadsheet plan-model that displays goal and factor cells that will be linked to using the graphic modeling software;

FIG. 14 illustrates a process for developing a list of outputs from a plan-model to assist the user in selecting goals;

FIG. 15 illustrates a process for developing a list of inputs from a plan-model to assist the user in selecting factors;

FIG. 22 illustrates an example of steps for deriving a relationship between factor and goal by listing dependent cells for a selected factor;

FIG. 45 illustrates a computer display screen similar to FIG. 44 but providing additional information on a factor value required to produce the goal value the user has moved to;

FIG. 46 illustrates use of the spreadsheet software as a calculator to determine a factor value required to produce a goal value the user has moved to;

DETAILED DESCRIPTION

The description of the present invention that follows is directed to an embodiment for use (a) on an IBM-compatible PC system, (b) in the Microsoft "Windows" software environment, in general conformance with the Microsoft "Windows" user-interface style conventions, (c) for analysis of spreadsheet plan-models, (d) with the graphic analysis performed by novel graphic modeling software external to spreadsheet software, (e) with interaction between the graphic modeling software and the spreadsheet software accomplished through Microsoft "Windows" dynamic data exchange (DDE) and object linking and embedding (OLE). However, the present invention is not limited to the elements of the described embodiment. It could be used on other computer systems, such as computer work stations, in other software environments (e.g., UNIX), with user-interface style conventions different from those of Microsoft "Windows," such as those found with Macintosh computers. The invention could be embodied in systems including graphic modeling software different from that described hereinafter. The graphic modeling software of the present invention could, with respect to spreadsheet plan-model entries, use either or both of data in separate software products other than spreadsheets, such as financial modeling or database or accounting software, and/or entries made in the graphic modeling software itself. Interactions between the graphic modeling software and other software containing plans, models and/or data, if any, could be accomplished by methods other than DDE and OLE, such as various programming languages.

Figure 1:
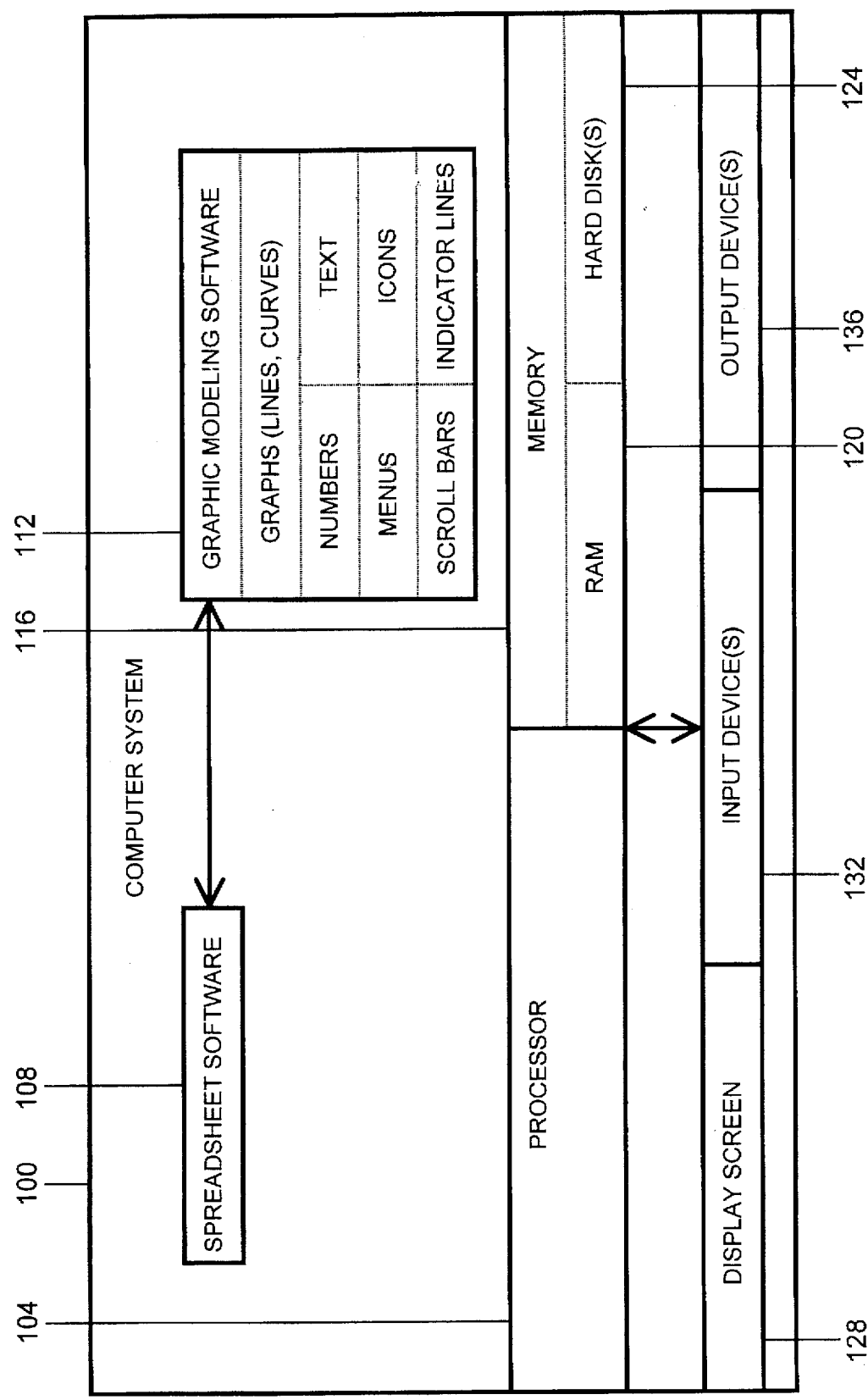
FIG. 1 is a block diagram generally identifying the hardware and software of the present invention.

With reference to FIG. 1, this preferred embodiment of the present invention is schematically illustrated in a block diagram. The present invention is embodied in a computer system 100 that includes the IBM-compatible PC having a processor 104 processing the data and other information inputted or otherwise provided to or otherwise developed by the computer system 100. The processor 104 executes software that enables the user to create for display from a substantial number of possible graphic analyses a desired one or more of them. In one embodiment, the software is categorized as spreadsheet software 108 for, among other things, displaying a traditional spreadsheet comprised of a number of columns and rows with each rectangle in a particular column and a particular row being defined as a cell. The spreadsheet software 108 is also useful in determining outputs using formulas that interrelate input and output data. In this embodiment, the spreadsheet software 108 is communicated or linked by novel software that is identified as graphic modeling software 112, although it should be appreciated that the spreadsheet software 108 and the graphic modeling software 112 could be integrated as a single software package. The graphic modeling software 112 performs a number of advantageous functions, which will be explained in detail later herein, including the development and display of graphic analyses, numbers or values, printed text, as well as displaying, for activation by the operator or user, menus, icons, horizontal/vertical scroll bars and horizontal/vertical indicator lines.

The computer system 100 also includes a memory 116 that communicates with and is accessed by the processor 104 for performing the desired functions, including obtaining data from memory in connection with execution of the software 108, 112. In one embodiment, the storage memory 116 includes a random access memory (RAM) that typically stores data involved in processing such as calculated data or interim calculated data. The memory 116 also includes one or more hard or floppy disks 124 for storing the executable software, as well as saving data or other information, such as information for reproducing graphic analyses that were created and are stored for later reference.

The computer system 100 further includes a computer terminal display screen 128 that illustrates or displays information in a desired and advantageous format, such as the afore-noted spreadsheet and created/selected graphic analyses that interrelate spreadsheet input and output variables. One or more input devices 132 enable the user to communicate the user's inputs to the computer system 100. The input devices 132 typically include a keyboard and mouse. One or more output devices 136 may also be provided and could include, for example, a printer that provides desired hard copies of displayed information, including the graphic analysis or analyses selected by the user.

Figure 2:
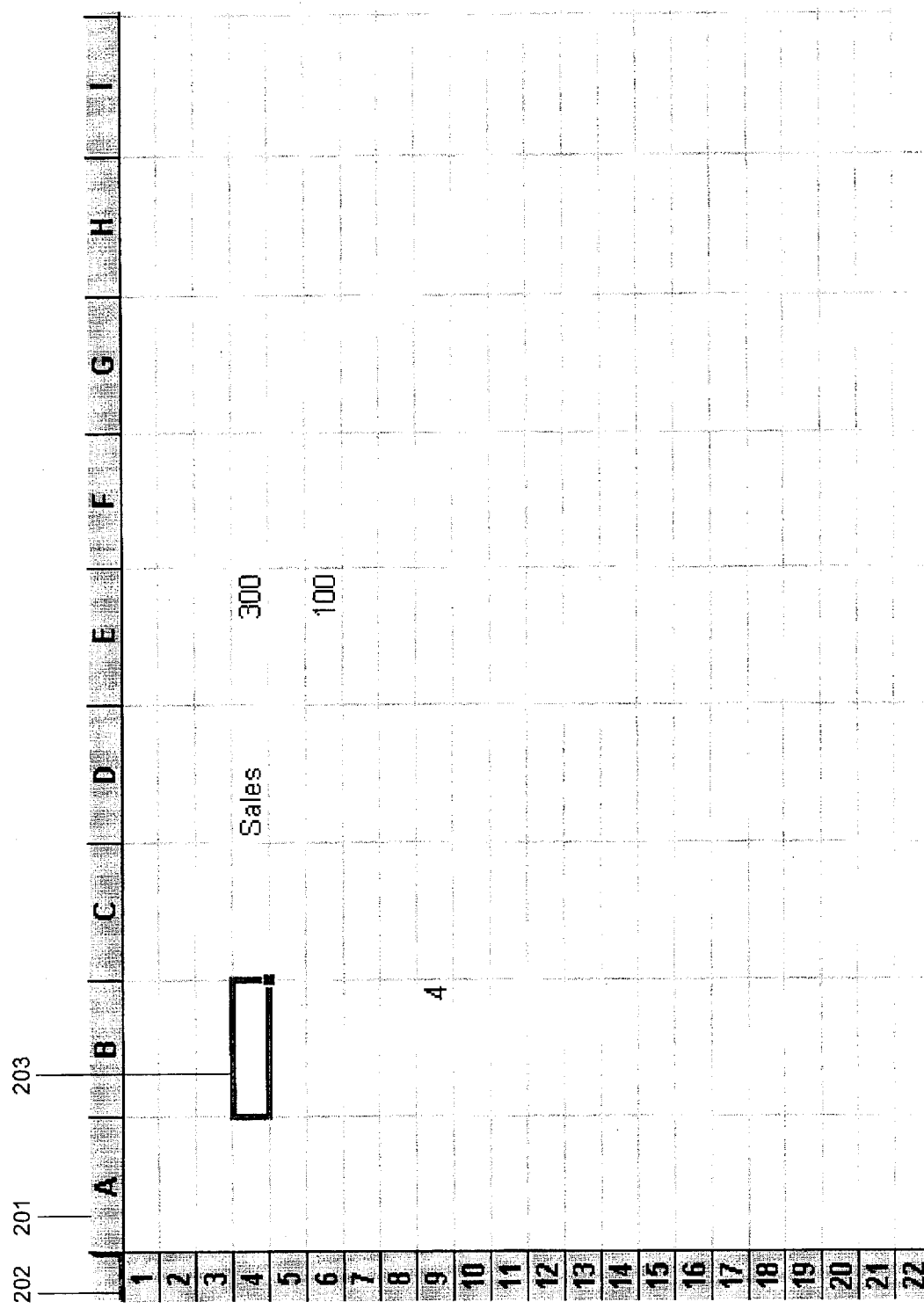
FIG. 2 illustrates a computer displayed spreadsheet that is generated using a spreadsheet software package that includes a number of identified cells, any of which can be used for containing cell data that is a function of data in one or more other cells.

Referring now to FIG. 2, the description of the spreadsheet software 108 is continued. FIG. 2 shows the work area of an electronic spreadsheet that can be generated on the display screen 128. The spreadsheet includes a matrix of columns 201 and rows 202. In a spreadsheet matrix, typically each column is identified by a letter shown above the column —A, B, C, etc. Each row is typically designated by a number as shown at the row's left—1, 2, 3, etc. The rectangles created by intersections of columns and rows are called cells. Each cell is commonly designated by the letter of its column and the number of its row. For example, the cell 203 in column B and row 3, shown in FIG. 2 with a heavier border, is designated as cell B3.

Spreadsheets have far more cells than the computer display screen 128 shows at any one time. The user can pan the computer display screen 128 across the spreadsheet to illustrate other columns. For example, columns T through Z or AF through AM can be seen by panning to the right. The computer display screen 128 can be panned downwardly to see other rows, such as rows 55 through 77. Current spreadsheets have huge numbers of cells. For example, at this writing, the current versions of the Lotus 1-2-3® and Quattro Pro® spreadsheets each offer a matrix of over 250 columns and over 8000 rows providing over 2 million cells. The Microsoft Excel® matrix has twice as many rows, providing a matrix of over 4 million cells.

In any cell, a user can enter text (such as "sales," as shown in FIG. 2 cell D4), or a number (such as "300," entered in cell E4). With these simple capabilities, spreadsheets are useful for almost every situation in which a user wants to produce either numbers or words or both laid out in columns and rows. Spreadsheets are used widely for such purposes.

In any cell, instead of simply entering text or a number, a user can make a third kind of entry: a formula which calculates a number, such as =2+2. For formula entries, spreadsheets provide the following key characteristics and capabilities:

(a) When a user enters a formula in a cell, the cell displays the formula answer or result. For example, in FIG. 2, in cell B10, the user has entered the formula =2+2, and in that cell what is displayed is the result, 4.

(b) In a cell's formula, the user can include references to other cells, such as cell E6. In place of each such cell reference, the formula will use the number displayed in the referred-to cell. For example, in the example of FIG. 2, in cell E6, assume the user has entered the formula =E4−200, and since the number displayed in E4 is 300, the formula in E6 calculates 300−200 and its cell E6 displays the E6-formula result, 100.

(c) In a formula a user can include predefined mathematical components, commonly called functions, which greatly expand user ability to enter formulas and simplify user entries of formulas. For example, for certain calculations of loan payments, most users would have difficulty defining the right algebraic entries, but spreadsheets have functions that have loan-payment algebra built in and are very easy to enter.

(d) When the number displayed in any cell is changed, any other cell with a formula affected by the changed number will recalculate its result based on the change. For example, if in the spreadsheet matrix shown in FIG. 2, the user changes the number in cell E4 from 300 to 600, the formula in E6, which is =E4−200, will recalculate, using for E4 that cell's new number of 600. The result will be displayed in cell E6, which will change from its prior result of 100 to display the new result of 400.

(e) Any cell's formula can include references to other formula cells, and for each such reference will use the displayed result number of the referred-to formula cell. For example, in FIG. 2, cell D7 could have a formula referring to the formula in cell E6, and cell F9 could have a formula referring to the formula in cell D7 which in turn refers to the formula in cell E6. In every case, wherever a formula has a reference to another cell having a formula, it will use the result-number displayed in that referred-to formula cell. And if any cell's number is changed, all cells with formulas will recalculate as necessary to reflect the change. For example, if the user makes the entries just described, and then changes the number in cell E4, that change of cell E4 will cause recalculation and change in cell E6, which will cause recalculation and change in cell D7, which will cause recalculation and change in cell F9.

(f) Current spreadsheet products enable a user to make entries on multiple spreadsheet pages, and on any spreadsheet page enter formulas that refer to cells on other spreadsheet pages. Each spreadsheet page, containing its own matrix of columns, rows, and cells is called a worksheet; a set of worksheets is commonly called a workbook. For example, an analyst could use five worksheets for five components of an analysis, and a sixth worksheet for a summary in which he enters formulas with references to cells in the other worksheets to calculate the summary numbers. Current spreadsheet products provide workbooks of many worksheets which together contain vast numbers of cells. Each of the cited spreadsheets offers workbooks of over 250 worksheets, and with each worksheet offering 2 to 4 million cells, in such a workbook a user can build a model in a three-dimensional space of a half billion to a billion cells.

FIG. 3 shows an example of a typical single-worksheet business-financial plan-model, in this case a startup plan for a hypothetical new software company, simplified so it can be fully shown in the illustration. FIG. 4 shows the same plan-model after the user has changed an input representing rate of growth of unit sales. Together these two figures provide a simplified example of typical use of spreadsheets for viewing alternative possibilities for a plan. A more realistic and typical example would show a model with more columns, rows, and numbers, and show more tables representing more possibilities for the plan.

For business-financial plans in particular, two aspects of spreadsheets are widely considered major advantages. One is that the columns-and-rows format (and large numbers of available columns and rows) conforms to the centuries-old traditional practice of producing business-financial projections and reports in the format of large tables of columns and rows of many numbers.

The second is that with formulas in spreadsheet cells able to use results of other formulas in other cells, spreadsheet users can build models that reflect complex input-output relationships by entering much simpler formulas, for individual small steps in the inputs-to-outputs calculation processes. With a very wide range of business-financial users, most of which are not mathematical experts, this spreadsheet characteristic facilitates wider business-financial use.

Figure 5:
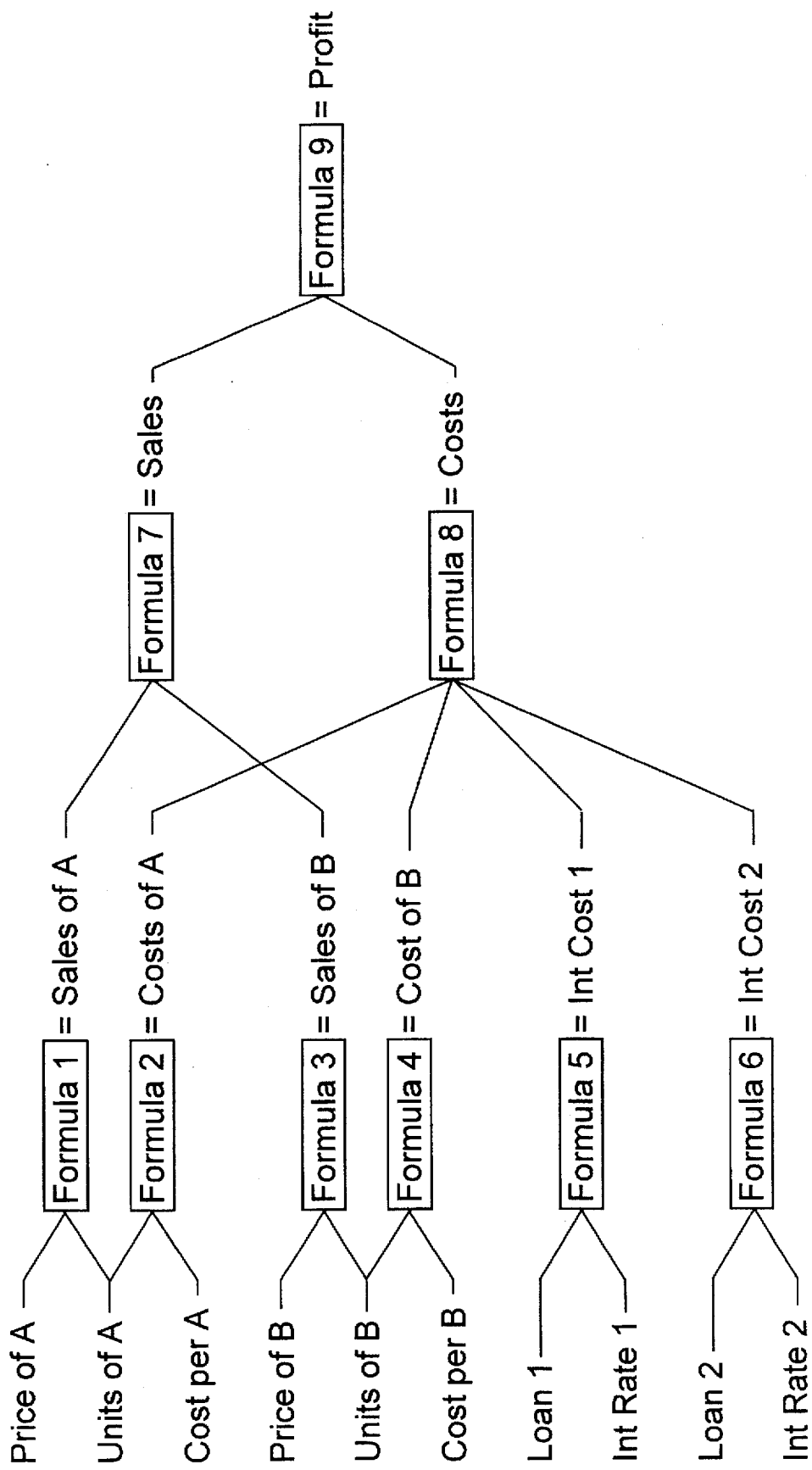
FIG. 5 illustrates an example of a "formula tree" associated with a financial plan.

In spreadsheet entries of business-financial plans and other models, it is common that effects of particular input values on particular output values are not expressed through single formulas, but rather are implied through chains of formulas. To illustrate this point, and to illustrate that it is true for most of even the simplest spreadsheet models, FIG. 5 shows a "formulas tree" for a typical entry of a very simple business-financial plan. In this diagram, each rectangle containing the word "Formula" represents a location of a formula that calculates the value of the variable to the formula's right using values of items to the formula's left. For example, Formula 1 nearest top left is:

Sales of A=Price of A×Units of A In this example, the value of Units of A, which is the second item at far left and may be an input, affects the value of Profit which is at far right and is an output. This effect is not realized through a single formula, but through a "double chain" of six formulas. Units of A affects Sales through Formula 2 and Formula 7, and also affects Costs through Formula 2 and Formula 8; and these two formula chains affect Profit through Formula 9. While in the model as a whole, the value of Units of A affects the value of Profit, the builder of this model has not entered and the model does not display or contain any formula that defines the value of a typical key output, e.g., Profit, in terms of the value of a typical input with important effect on that output, such as Units of A.

This is typical of business-financial spreadsheet plan-models. For most relationships between inputs and outputs (especially most final outputs the user considers most important), the user has not formulated or made any entry expressing the relationship between the input and the output. Additionally, the plan-model does not contain or display any formula or equation expressing the relationship between the input and the output. The significance of this to advances and advantages of the present invention will be described further on.

As has been noted, a spreadsheet plan-model can be rapidly changed from one combination of input and output values to another; however, these combinations are shown one at a time, with each combination of input and output values depicting one what-if scenario as a table of numbers. The principal most recent innovation for improving use of multiple input-output value combinations for a spreadsheet plan-model is a feature called version manager or scenario manager. This feature enables users to, for a particular spreadsheet plan-model, create, manage, and view multiple input-output value combinations or what-if scenarios more efficiently and quickly. Nonetheless, with this new feature, it remains true that the spreadsheet displays alternative input-output value combinations (what-if possibilities) one at a time with each displayed as a table of numbers that is typically large.

Figure 6:
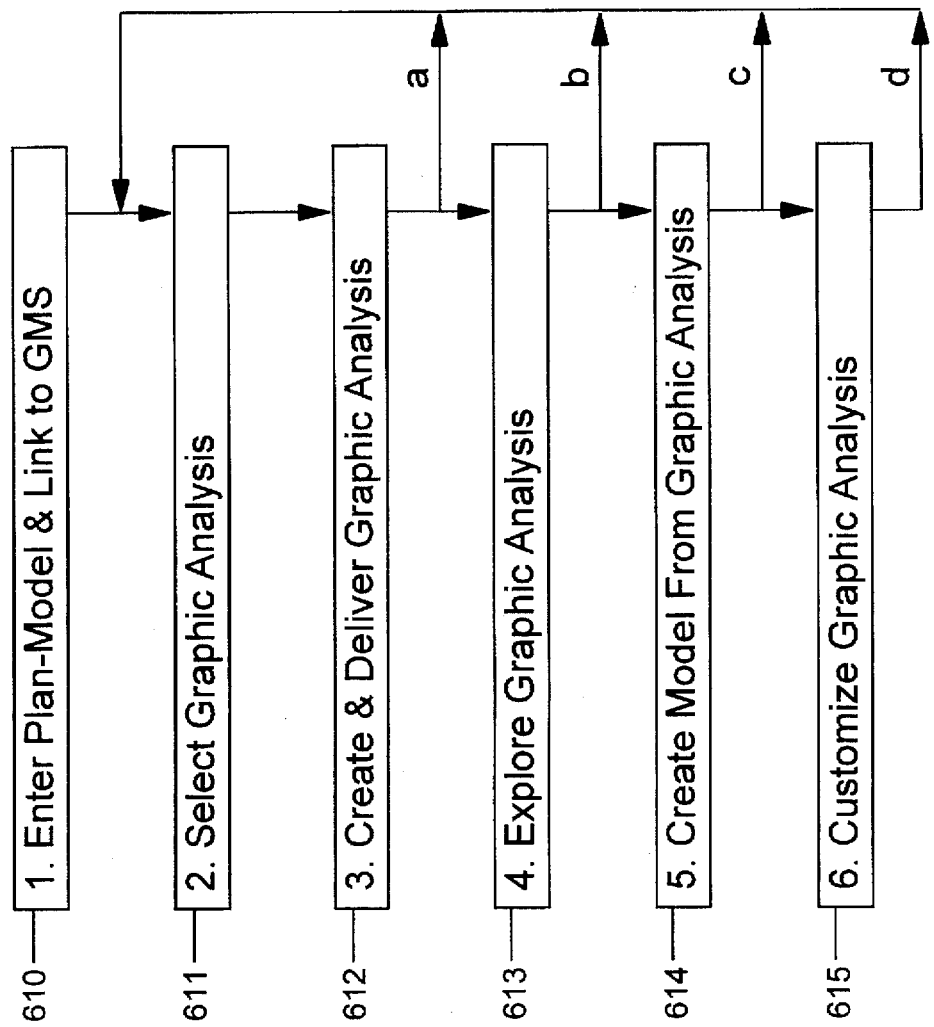
FIG. 6 identifies principal steps and processes of the graphic modeling software.

With reference initially to FIG. 6, the present invention displays the what-if possibilities using a novel graphic analysis process that advances the user beyond these vast tables of numbers. This is primarily accomplished using the graphic modeling software 112. For steps 611–615 of FIG. 6, the graphic modeling software "GMS" is the sole or principal application software. With regard to step 610, the GMS could be the sole application software or this function could be shared by other software product(s) used for some or all of the spreadsheet plan-model entry and storage, such as the spreadsheet software 108.

Before proceeding to a more detailed discussion of the steps of FIG. 6, an overview thereof is described. Step 610 recites the step of entering the spreadsheet plan-model, including input values, formulas and labels. If the spreadsheet plan-model is external to the graphic modeling software 112, such as in the embodiment that includes the spreadsheet software 108, a link is made between the spreadsheet software 108 and the graphic modeling software 112. In step 611, a selection is made as to which of hundreds or thousands of possible graphic analyses will be displayed on the display screen 108 for analysis. The graphic analysis of one or more graph lines is developed and subsequently displayed in accordance with step 612. After display, the user is able to interactively use the displayed graphic analysis to conduct desired what-if analysis, as recited in step 613. As part of the what-if analysis using the displayed graph lines, the user is able to select one or more graph points from which one or more new spreadsheet plan-models can be created, in accordance with step 614. Finally, the user can save and reproduce the graphic analyses and their interactive graph usage by means of customized analysis files stored on disk or other memory in accordance with step 615.

Although six major steps are noted, it should be understood that a number of integrated processes are definable using less than all of the six steps 610–615. In a first integrated or subcombination process, steps 610–612 are performed. From these steps, the computer system 100 through user selection of a goal and one or more factors develops and displays graphic analyses showing goal-factor relationships and panoramas of combinations of factor variant data and goal variant data across ranges above and below values contained in the spreadsheet plan-model, representing a great number of what-if possibilities. A second integrated process or subcombination adds the step 613 to steps 610–612. Specifically, after the created graphic analysis with graph lines is displayed, interactive explorations of what-if possibilities are conducted. A third integrated process or subcombination adds the step 614 to steps 610–613 whereby a new or modified spreadsheet is generated using the results of the interactive usage of the displayed graph. A fourth process adds step 615 through which user interface is customized for easiest access to and use of particular graphic analyses.

FIG. 6 also illustrates the main procedures for conducting steps 610–615. In particular, a representation is provided of the cycling of steps conducted by the user. With respect to cycles a, b, after step 612 or 613, the user will typically cycle back to step 611 in order to select, then create and then explore another of the many graphic analyses that are available. Similarly, in accordance with cycle C, the user will commonly proceed to select, create and explore graphic analyses of the new or modified spreadsheet plan-model that was created. In accordance with cycle d, after a user has finished step 615, new cycles of use will typically be carried out by other users for whom the graphic analyses has been customized.

FIG. 7 illustrates an example of a spreadsheet plan-model that is to be entered and linked to using the graphic modeling software 112. The illustrated plan-model is an investment in a condominium which is to be rented out for five years and then sold. Except for the aspect of plan-model layout and structure described just below, standard spreadsheet modeling entries and methods are used.

As FIG. 7 shows, the spreadsheet plan-model is laid out in three major sections: a two-column list of factor names and values 701, which contains names and input plan data or values for which the user will or may want to explore effects of variations in values; a typical plan-model projection table 702, which shows the results of formulas for the progressions of calculations from inputs to key outputs, with the formulas being part of the cells; and a second two-column list of goal names and goal values data 703, which are representative of output values that the user considers critical for assessing results. The table 702 is built with the projection table data being based on the data or values in the cells in the factors list, so that whenever values in the factors list are changed, the table results change to reflect the current data in the factors list. For example, if the price of 200 in the factors list is changed to 210, the data in cell F6 changes using its associated or contained formula (which is –Price) to –210.00. Similarly, the cells in the goals list contain references to projection table cells so that the goal data reflects current results in the table.

It should be understood that spreadsheet plan-model data already entered without this layout can be adapted to this layout easily. The key step is to enter the factors list, and then in the existing plan-model, change the original entry of each factor value into a reference to that value's cell in the factors list.

As will be seen, this spreadsheet layout is part of the system for the entry-and-linking process in the embodiment of the present invention under current discussion; but it is also good modeling structure with important advantages for plan-modeling within the spreadsheet itself. With this spreadsheet layout, the model-builder and other users can (i) quickly see what input values (factors) and output results (goals) the model has been structured to test, and (ii) in the concise spreadsheet area of just the two lists, see and test changes for values of all key inputs, or factors and resulting values of all key outputs, or goals.

Figure 8:
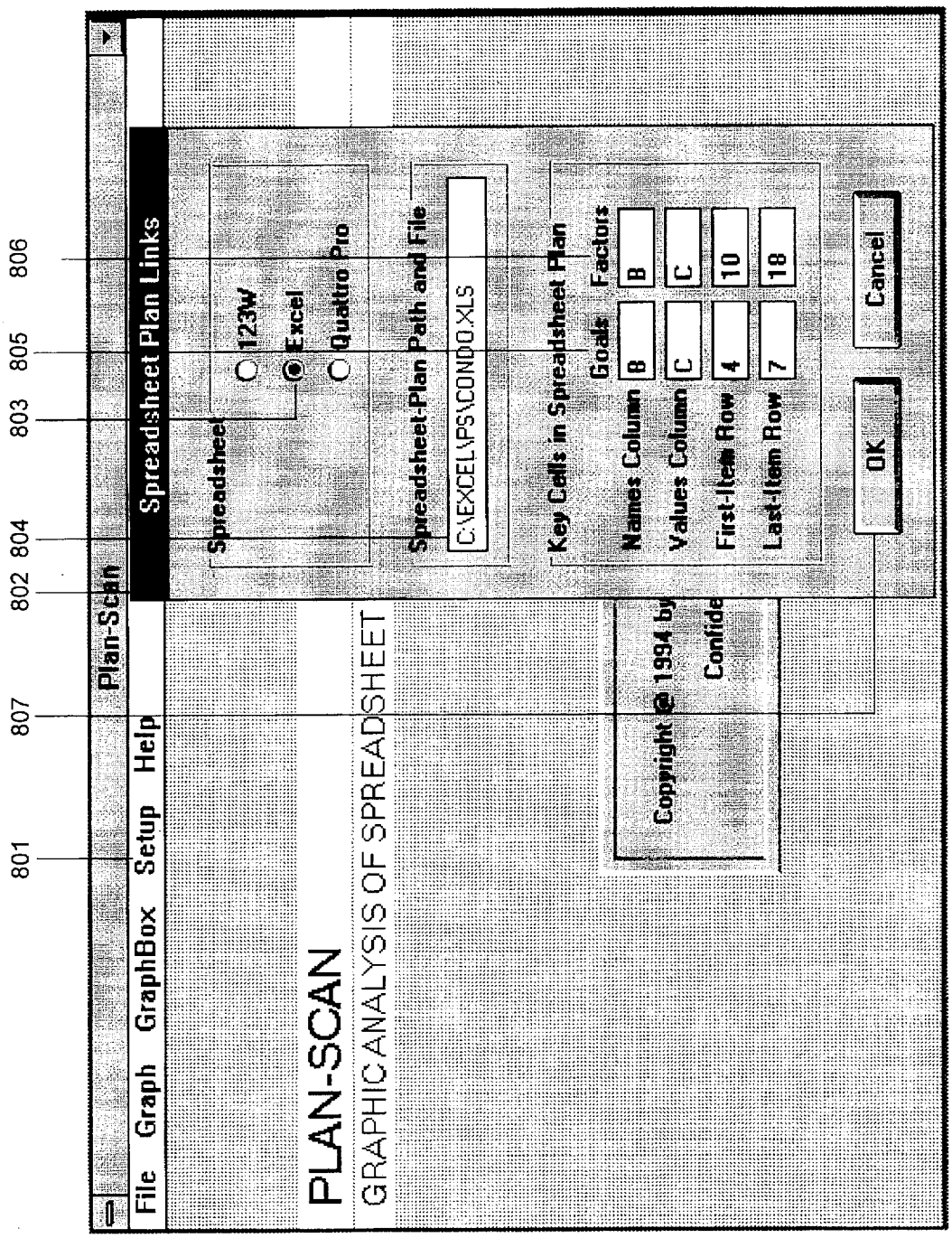
FIG. 8 illustrates an embodiment for use in linking between the graphic modeling software and the spreadsheet software.

FIG. 8 illustrates one embodiment of a user interface for the graphic modeling software to link to the spreadsheet plan-model. This particular interface design is tailored for spreadsheet plan-models entered in the layout described just above and illustrated in FIG. 7. In the exemplary design shown in FIG. 8, in the graphic modeling software, the user has selected the menu item Setup 801, which caused display of a dropdown list of subchoices from which the user selected Spreadsheet Plan Links ("SpredLink"). This selection causes appearance of the window titled SpredLink 802.

In the SpredLink window, to indicate the spreadsheet software 108 in which the plan-model is entered, the user selects an option-button 803. Next he enters disk path and file name of the spreadsheet plan-model in a textbox 804 labeled for that purpose. At lower left in the SpredLink window in the goals column 805, the user provides information on spreadsheet location of the goals list: letters of name and data columns, and numbers of top and bottom rows. At lower right in the SpredLink window in the factors column 806, the user provides analogous information on the spreadsheet location of the factors list. When the user has completed his entries in the SpredLink window, he clicks its OK button 807. The SpredLink window disappears from view.

Once the user has completed provision of information in the SpredLink window, in the graphic modeling software the user can create a disk file which will contain this SpredLink information, so that for future graphic modeling of the same plan-model, he need not provide the information in SpredLink again. Instead, with the graphic modeling software open, the user simply opens the file, at which point the graphic modeling software automatically re-enters the SpredLink information. This file could also contain additional information on the plan-model and its graphic analysis, exploration, and customization which will be discussed in the following sections.

With the information provided in the SpredLink window, the graphic modeling software can link to and interact with the spreadsheet plan-model, including factor data and goal data, using DDE and OLE, to carry out procedures and processes described in following sections. As soon as the user indicates completion of SpredLink entries by activating or clicking OK, the graphic modeling software uses the information the user has entered to establish the linking and obtain the plan-model names and data to prepare for rapid execution of steps and processes described in the following sections.

Once the user has provided the SpredLink-window information required for the linking, the graphic modeling software offers the user means for modifying the factors and goals lists to be used by the graphic modeling software. To enable this modifying, the graphic modeling software displays a Modify Lists window 901 shown in FIG. 9. To produce this window, the graphic modeling software obtains from the spreadsheet plan-model the names of all goals and factors using DDE or OLE, and displays them in the Modify Lists window, in two user-modifiable lists of goals 902 and factors 903.

In this Modify Lists window, the user can edit names of goals or factors. He may want to modify some of these names specifically for use in the graphic modeling software for various reasons, such as to make a goal or factor name more descriptive to others who will use the graphic modeling software, or to shorten some names for display as labels on the graphic analyses. To edit names, the user first selects the Edit option button 904. With this option button selected, the user can select and edit the name of any goal or factor, using standard text entry and editing procedures.

In the Modify Lists window, the user can also delete and restore any goal on the list for graphic analysis. The user can also delete and restore any factor on the list, either (a) for all graphic analyses or (b) for graphic analyses focused on any particular goal. A principal reason users are likely to do this is that some factors are important for one goal but irrelevant for another—for example, in an overall business-financial plan-model, the Number of Shares input has important effect on the Earnings per Share goal, and should be offered for graphic analyses focused on that goal; but has no effect on the Total Profit goal, for which reason the user may want to exclude it from options for graphic analyses focused on that goal.

To delete and/or restore goals or factors being identified in the Modify Lists window, the user first selects the Delete/Restore option button 905. With this option button selected, the user can delete any nondeleted output by selecting its name, which on this list grays it (makes it appears semi-erased); and restore any deleted goal by selecting it. When any goal has just been restored, the factors list is specific to that goal, and the user can use the same procedures on the factors list to delete and restore factors for that specific goal. When the modification of lists is completed, the user selects the OK button 906.

The entry-and-linking system of the present invention is not limited to the exemplary design described above. The invention can use any system or combination of systems that enables the user to enter and/or link to the graphic modeling software a plan-model or parts of the plan-model in a manner such that the graphic modeling software can, as in the embodiment described herein, or otherwise, determine goal data or values for various combinations of factor data or values.

Figure 10:
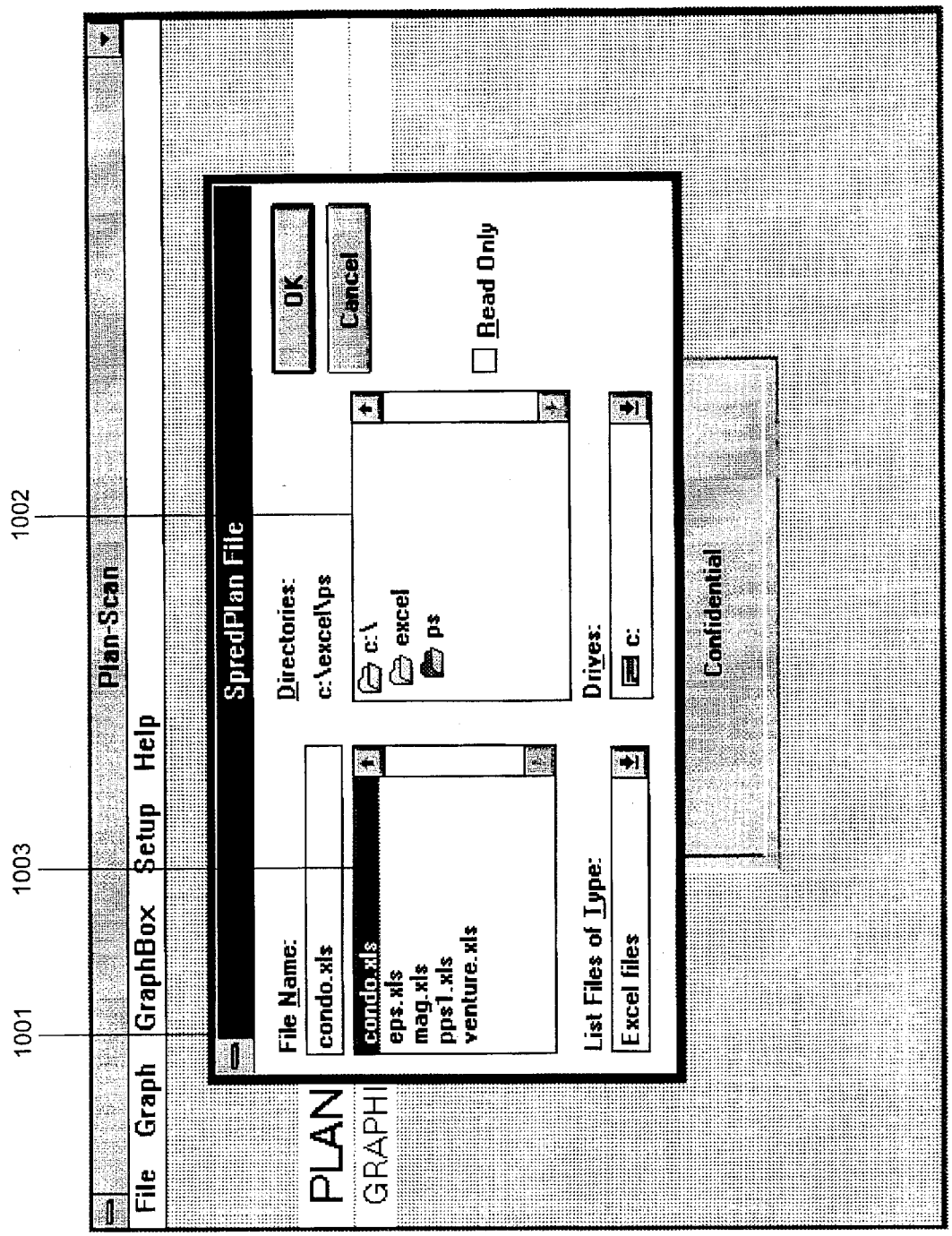
FIG. 10 illustrates a computer display screen having a user interface that enables the user to select the external software, such as the spreadsheet software, and the plan-model file using the graphic modeling software.

In another embodiment for entry-and-linking, FIG. 10 illustrates a design of user interface through which the user can, by selection only, indicate to the graphic modeling software the disk path and file of external software containing the plan-model or part thereof. The graphic modeling software displays a dialog box 1001, which in the illustration is titled SpredPlan File. This dialog box 1001 contains a rectangle 1002 through which the user can by selection (e.g., by mouse) peruse all file directories on all storage disks and select any directory for display of files it contains. This box also has a second rectangle 1003 in which the user can see a list of files in any directory he has selected, and select any displayed file for the linking. Procedures for using such a dialog box are identical to those used for opening all Windows application software files, with which the user must be familiar for use of any Windows software product and which any user of the invention will know well. Such a user interface design can be used for the user's designation to the graphic modeling software of the disk path and file for any external software containing the plan-model or any portion thereof, including spreadsheets, database software, accounting software, or other software products external to the graphic modeling software.

Figure 11:
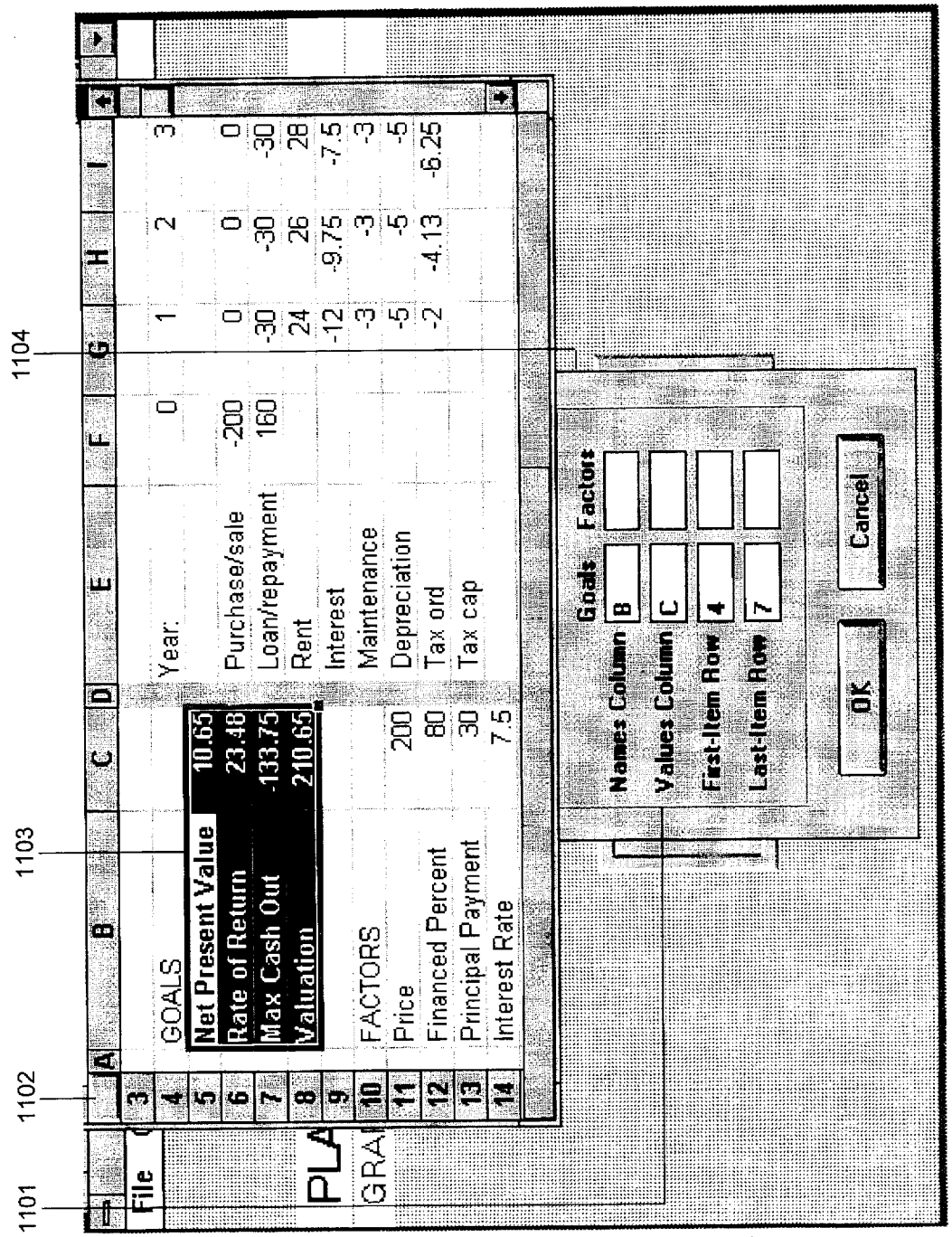
FIG. 11 illustrates a computer display screen that enables the user to select data from the external software.

Similarly, in any embodiment of the invention in which all or any of the plan-model or data is contained in any external software, user indication of where it is located in the external software could be made by selection. FIG. 11 illustrates an example of this approach for the spreadsheet entry of the spreadsheet plan-model shown in FIG. 7. In FIG. 11, the user has the graphic modeling software's SpredLink window open, with the lower part 1101 of this window for indication of spreadsheet location of goals currently visible. To enter the location of the goals list, the user has the spreadsheet and its plan-model open 1102, and has selected the columns-and-rows rectangle of the spreadsheet (called a range) containing the goals list 1103. This selection of the goals-list area of the spreadsheet plan-model 1103 causes entry of the appropriate column letters and row numbers in the goals part of the graphic modeling software's SpredLink window 1104.

Figure 12:
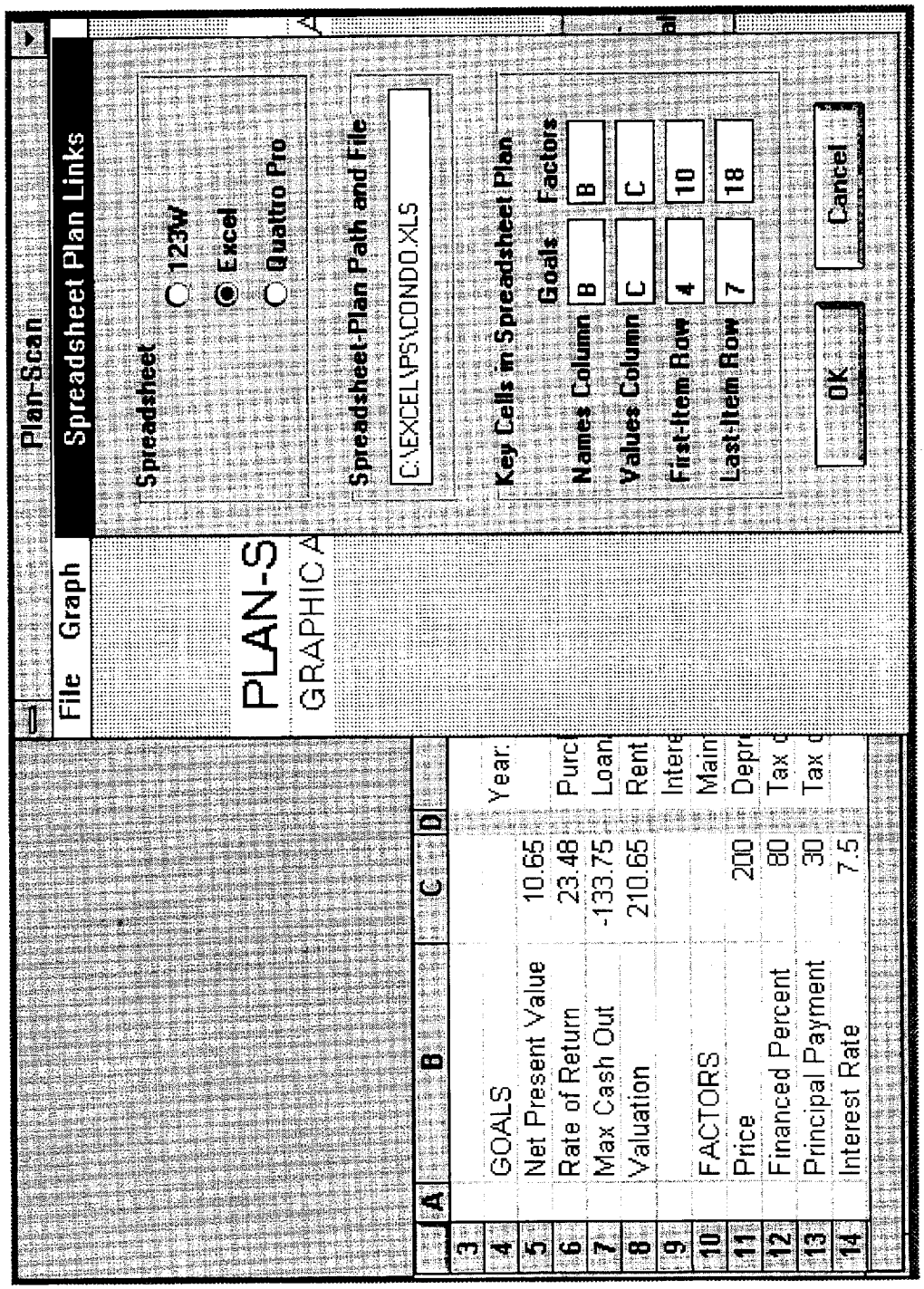
FIG. 12 illustrates a computer display screen for an invention embodiment in which the graphic modeling software works as a part of or add-in for another software product.
Figure 13:
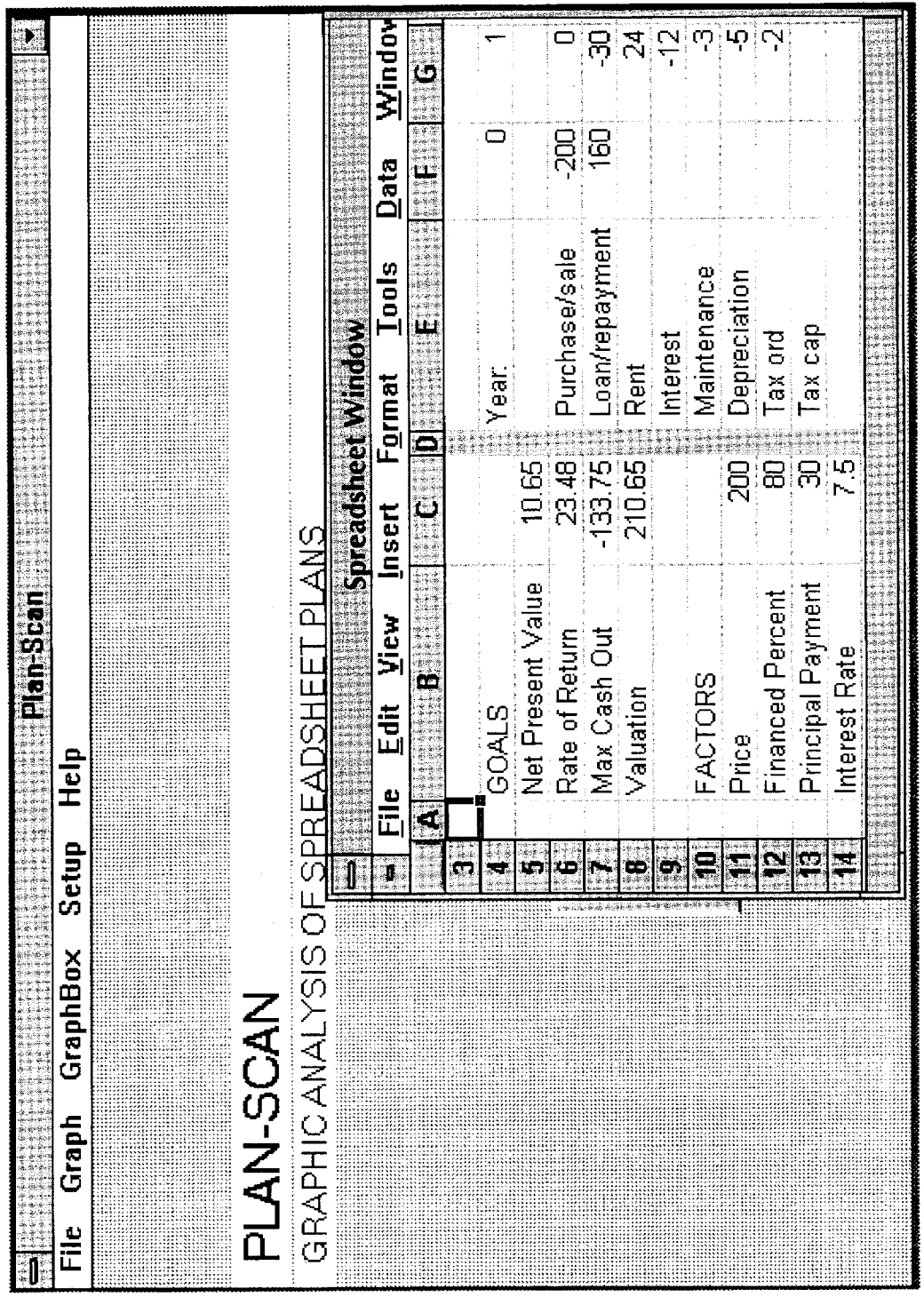
FIG. 13 illustrates a computer display screen involving use of both the Lotus 1-2-3® software product of Lotus Development and the Excel® software product of Microsoft in which these external software products are an integral part of or add-in for the graphic modeling software.

In an embodiment of the present invention, the graphic modeling software need not be a separate software product—it can be partly or wholly integrated with a spreadsheet or some other software product used for all or some of the plan-model entry. For example, the invention can be implemented with the graphic modeling software as an "add-in" software product designed to work as an optional extra for the spreadsheet or other software product, or as an integral part of a spreadsheet or some other software product, as illustrated in FIG. 12. In an alternative embodiment, a spreadsheet or other software product could be an add-in to the graphic modeling software or an integrated part of the graphic modeling software, as illustrated in FIG. 13. Through integration of the graphic modeling software with the spreadsheet or other software product used for plan-model entry, some or all of the linking steps otherwise taken by the user can be automated or simplified through programming of the integrated product(s).

Automation of the invention's linking can include automatic listing of all items in the plan-model that the user may want to designate as goal cells, so that instead of the user carrying out the linking steps of determining and indicating locations of goal cells, the user can select goals from a list of goal candidates developed and provided for him. FIG. 14 provides an illustration of a system that can be used for this method of aiding the user in linking. In FIG. 14, the audit feature 1401 of the Lotus 1-2-3® spreadsheet has been used in the condominium plan-model to display a list of "all formulas" 1402, starting in cell E2, which causes the spreadsheet to display in its column E a list of cell addresses and contents of all condominium-model cells containing formulas, which are all output cells 1403. Since all goals must be results of contents of other cells, all goal cells with data or values must contain or be associated with formulas. Potential goals for the graphic analysis must be in such a list. The graphic modeling software can use OLE or DDE to command the spreadsheet to display such a list for the user's plan-model. Then, the label or name defining each of these cells is found by searching cells to left of and/or above the cell containing the data. A list is all these names as potential goals, from which the user can select all those he wants in his list of goals for the graphic analysis.

Similarly, the graphic modeling software can use the audit feature of Lotus 1-2-3® as shown in FIG. 15 to display, for each goal, a list of all input cells that affect that goal's value, and thus for each goal provide the user a list from which he can select the factors he wants on that goal's factors lists for the graphic analysis. In FIG. 15, in the spreadsheet plan-model, the Net Present Value goal (C5) 1501 is selected. The audit feature's Formula Precedents 1502 is used to display a list 1503 of all cells whose values affect the selected Net Present Value goal. For each goal the user has selected for his goals list, the graphic modeling software can command the spreadsheet to display such a list. Then from this list, the graphic modeling software can find all cells in the list that contain inputs, and for each formula found, repeat the process until all inputs affecting the goal directly or through formulas are identified. For each such cell, the label or name is found and a list of these potential factor names is provided to the user for his selection of which inputs affecting the goal user wants to select as factors for the graphic analysis.

Figure 16:
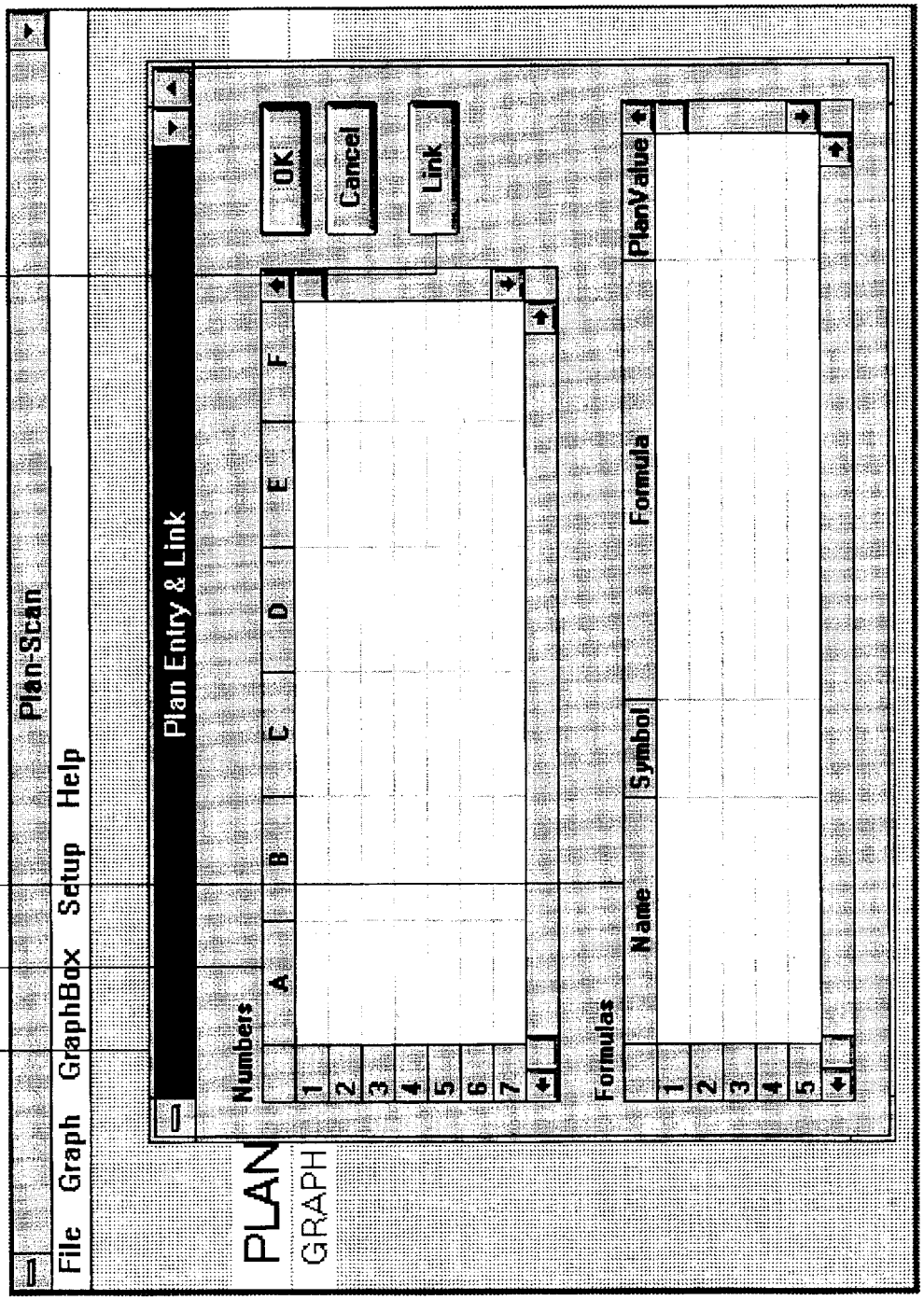
FIG. 16 illustrates a computer display screen for use in linking and using plan-model data entered or stored in various types of software products including the graphic modeling software.

As has been noted, the present invention's entry-and-linking process is not limited to entries made or contained in a spreadsheet. The entry-and-linking part of the invention process can be implemented through entries or data made or contained in other kinds of application software, which are then linked to or copied to the graphic modeling software or through entry directly in the graphic modeling software itself or through combinations of these two. An example of the basic framework of one design for all such entry-and-linking is shown in FIG. 16. This figure shows a design for a window of the graphic modeling software titled Plan Entry & Link 1601, which contains a matrix for Numbers 1602 and a form for Formulas 1603. In the Numbers matrix, the user can enter data (a) directly and (b) by linking to elements of external software. To obtain the user interface for indicating to the graphic modeling software the external source, the user selects the Link button 1604. In the Formulas 1603, the user can make entries in the same ways, directly and/or by linking to external software products. As an example of the flexibility of this design, a user could enter an entire spreadsheet plan-model in the Numbers matrix by linking, and then define further output relationships by entering formulas in the Formulas 1603 that contain references to elements of the linked spreadsheet in the Numbers matrix. Once the entries are made in this window, by either direct entry or linking or both, no further linking is required because the entries in this window are already contained by the graphic modeling software in locations and formats it can use for the graphic analyses.

Figure 9:
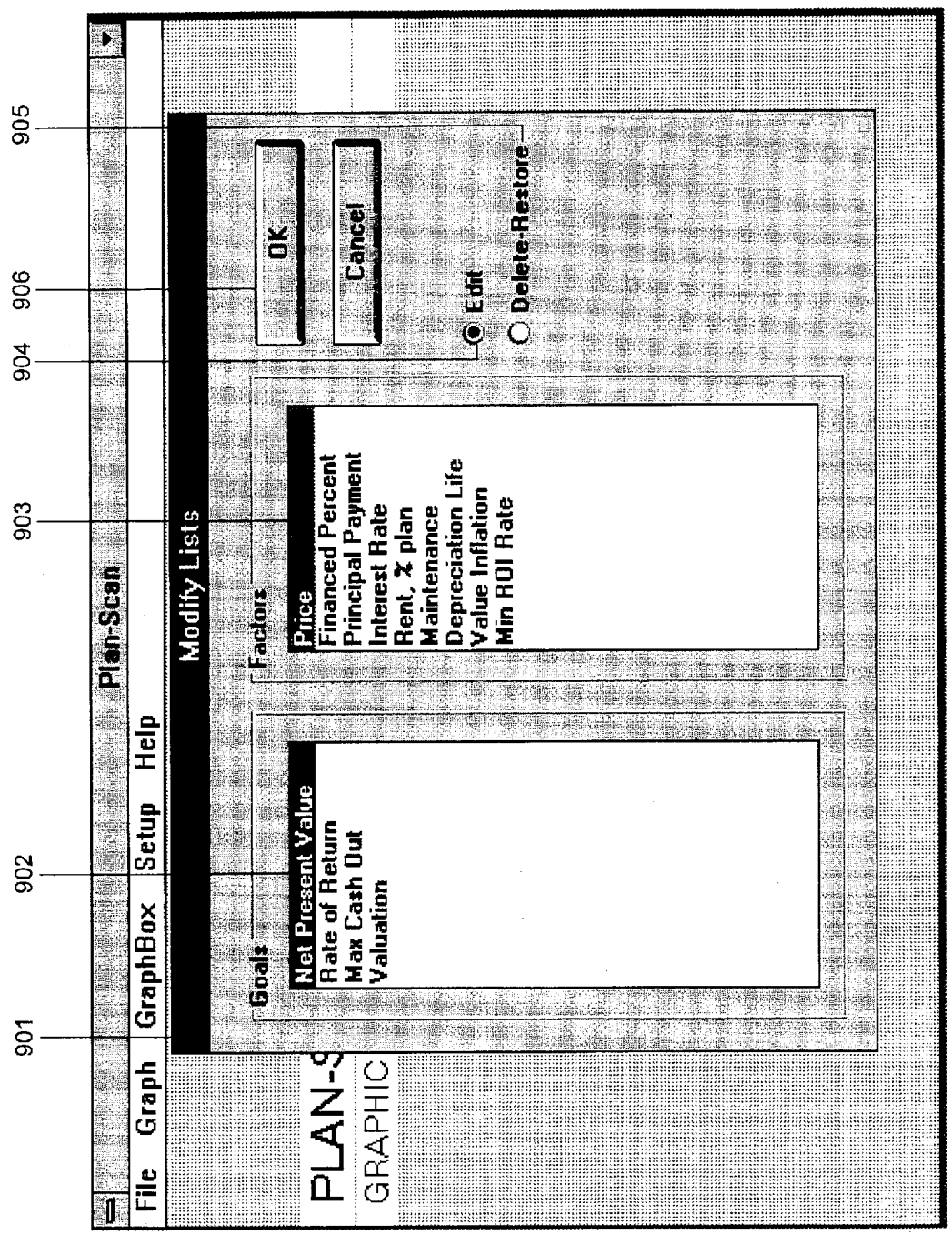
FIG. 9 illustrates a computer display screen having a "Modify Lists" window for changing factor and goal lists and names.

For users who already have plan-models entered in spreadsheets or prefer to enter them in spreadsheets, an embodiment and user interface designed especially for linking to spreadsheet plan-models as exemplified by FIG. 8 may be most convenient, perhaps with user interface options as exemplified in FIGS. 9–11. As of this writing, in light of widespread use of spreadsheets and resulting possession of plan-models already entered in spreadsheets and skills for entry of plan-models in spreadsheets, such embodiments may be preferred embodiments of the present invention at this time. But in the future, more flexible embodiments of the invention designed for entry directly within the graphic modeling software and/or in various types of external software, as exemplified by the design example shown in FIG. 16, may become preferred, and represent more fully the scope of the entry-and-linking part of the invention.

With desired linking in place, the user has options to select substantial numbers of graphic analyses with each involving variations in the data or values of different combinations of goals and factors. In the preferred embodiment, multi-list menus are provided in which (a) each list is a list of either goals or factors and (b) one or more selections on each of two or more lists constitutes selection of one graphic analysis. The preferred embodiment of the graphic analyses includes, but is not limited to, the two types described next. A first type of graphic analysis shows relationships and values of factors and goals across ranges above and below original or plan data (variants) for a selected goal relative to each of any number of selected factors. This is identified as a "prioritizer" type. A second type of graphic analysis illustrates relationships and values across ranges above and below original or plan data (variants) for a selected goal relative to a combination of any two selected factors. This is identified as an "optimizer" type.

Figure 17:
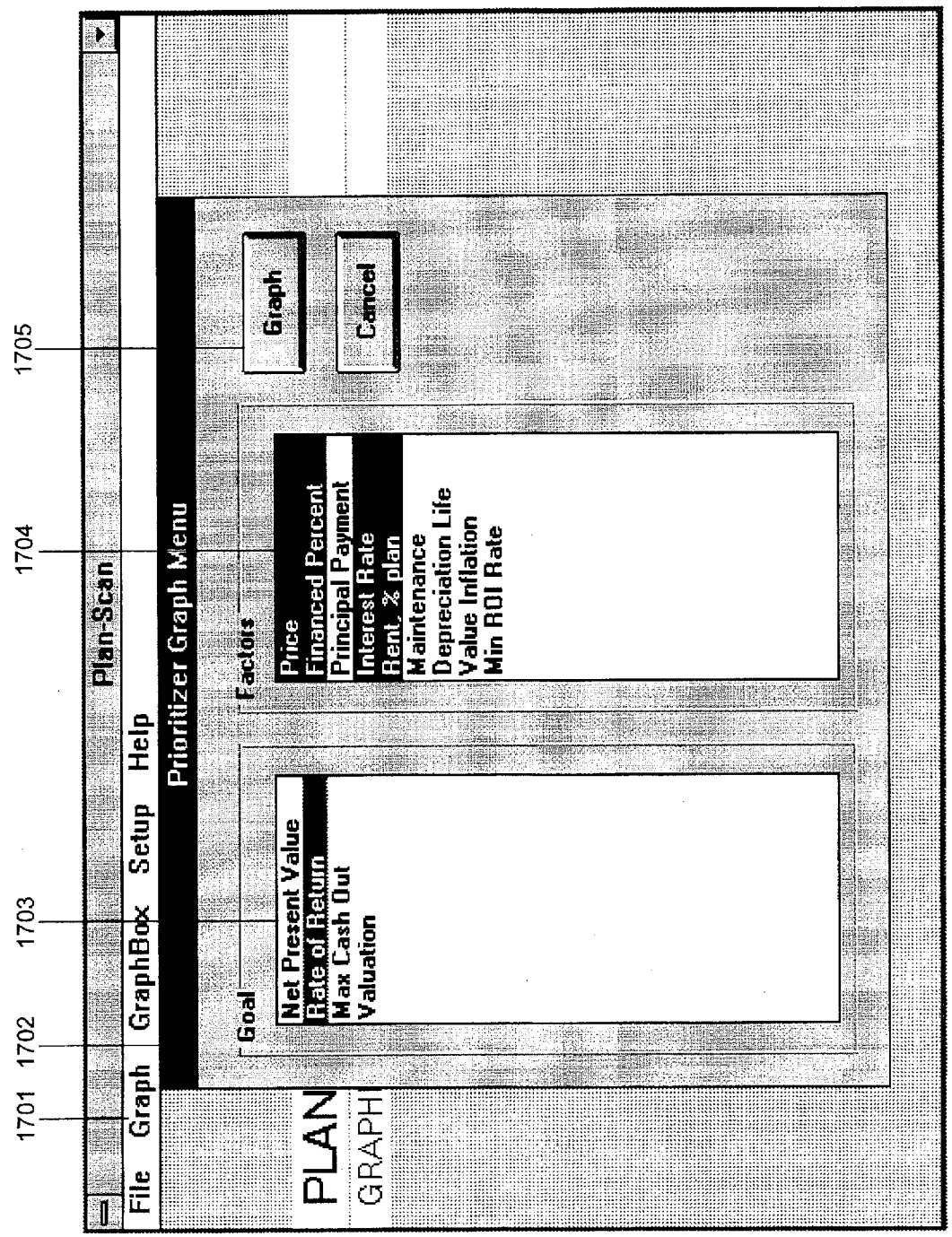
FIG. 17 illustrates a computer display screen having a window for selecting a prioritizer type of graphic analysis.

With reference to FIG. 17, a window of the graphic modeling software for identification and user selection of graphic analyses of the prioritizer type is displayed on the computer display screen 128. In this illustration, the graphic analyses offered are those for the condominium example set out in the spreadsheet of FIG. 7 and linked to the graphic modeling software in accordance with FIG. 8.

In accordance with this example, at any time after plan-model entry and linking, to see available graphic analyses and make a selection, the user first selects graph 1701 on the menu, which causes display of a dropdown list of graphic analysis types including prioritizer and optimizer. The user's selection of prioritizer causes display of the prioritizer graphic analyses menu 1702, containing a list of goals 1703 and a list of factors 1704. In this menu, the user can select any item in the goal list. (In the illustration, the goal rate of return is selected.) As the user makes or changes the goal selection, if the factors associated with the selected goal differ from those in the menu's factors list, the factors list changes so that it always shows the factors associated with the currently selected goal. After selecting a goal, the user then selects any one or more items in the factors list. (In the illustration, the first, second, fourth, and fifth items in this list are selected.) The user can select any goal together with any one or more factors, and the combination of all selected items in both lists constitutes selection of a graphic analysis. Once the user has completed these selections, to initiate creation and delivery of the designated graphic analysis he selects the Graph button 1705.

Figure 18:
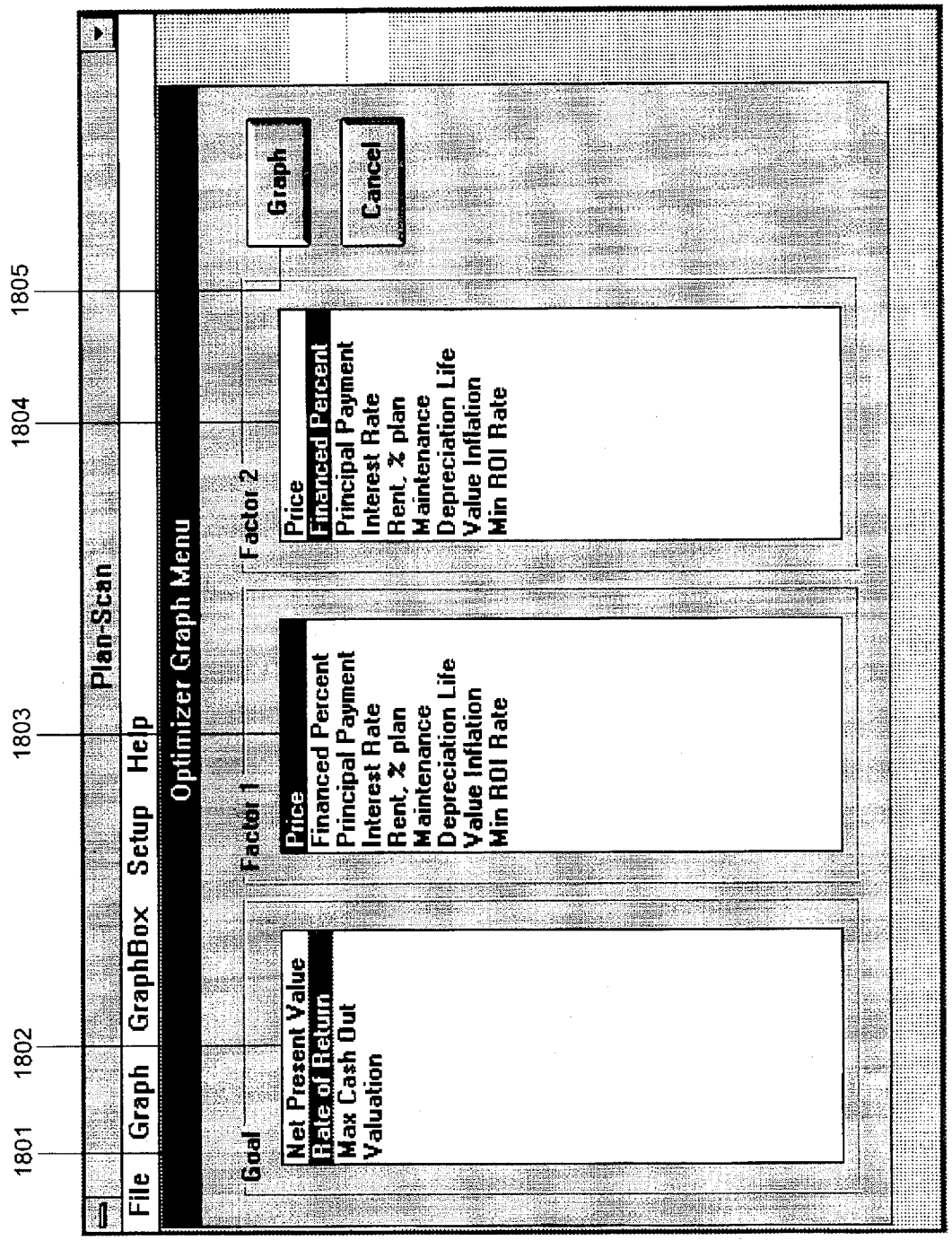
FIG. 18 illustrates a computer display screen having a window for selecting an optimizer type of graphic analysis.

Similarly, FIG. 18 illustrates a design for a window of the graphic modeling software for identification and user selection of graphic analyses of the optimizer type. If after selecting Graph on the menu, in the dropdown list the user chooses optimizer, his selection causes display of the optimizer graph menu 1801. This window contains a list of the goals 1802 and two lists of factors labeled respectively factor1 1803 and factor2 1804. In this menu, the user can select any item in the goal list, at which the factor lists change as necessary to list factors associated with the selected goal and then select any one factor in each of the two factors lists (but not the same factor on both lists). The combination of selected items in all three lists constitutes selection of a graphic analysis. Once the user has completed these selections, to initiate creation and delivery of the designated graphic analysis the user selects the Graph button 1805.

Figure 19:
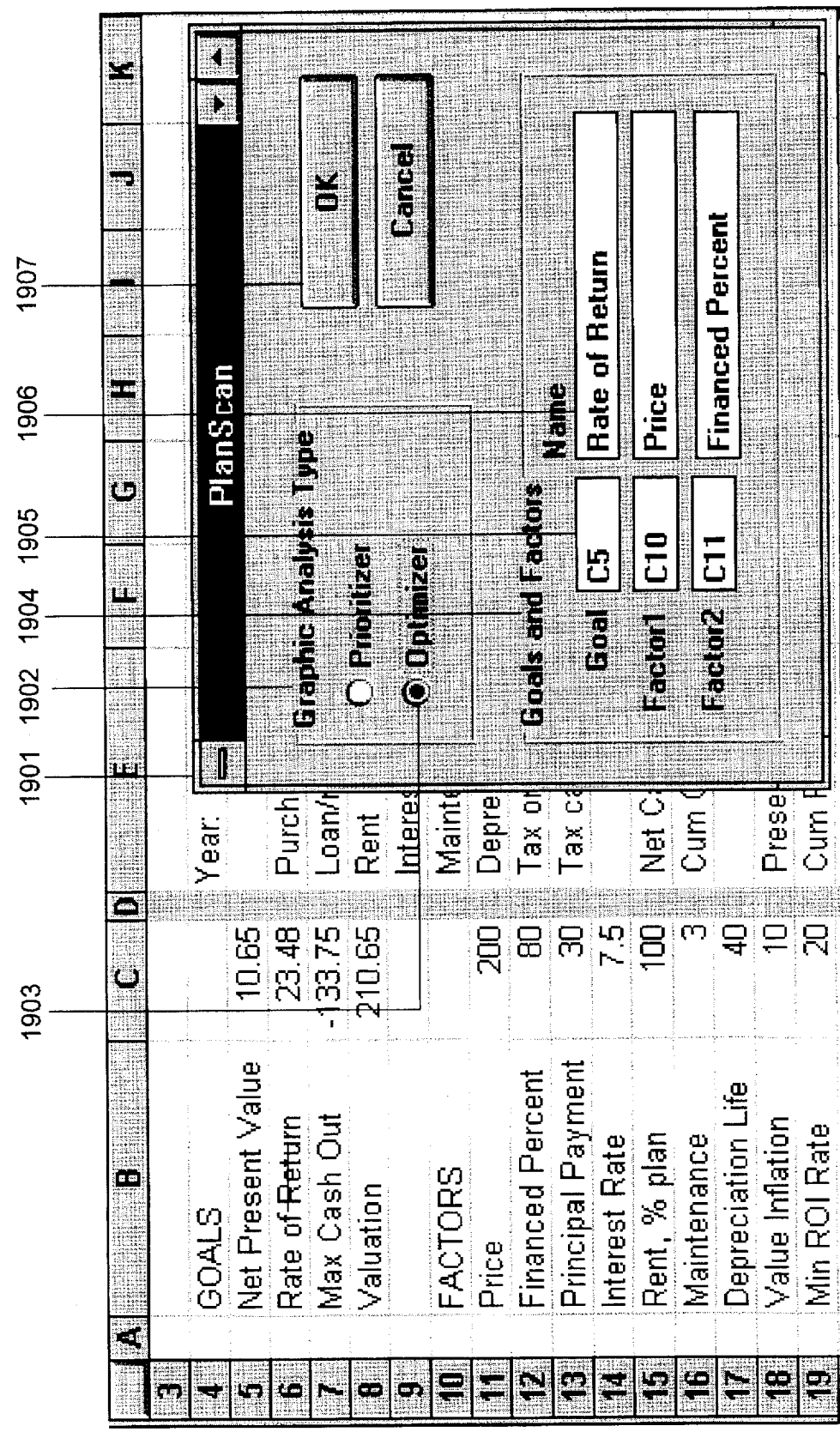
FIG. 19 illustrates a computer display screen for another embodiment used in connection with choosing a goal and factor(s)

It should be noted that choosing goals and factor(s) for particular graphic analyses is not limited to the illustrated user interfaces for this choosing discussed in preceding pages, and can be accomplished without the step of creating lists of goals and factors from which individual goal/factor combinations are to be chosen for individual graphic analyses. In another embodiment, the graphic modeling software and spreadsheet software are integrated and the menu at top of the integrated product includes a choice for going to graphic analyses of a plan, and when, with a spreadsheet plan-model displayed, the user selects this menu choice, a dialog box 1901 appears in front of the spreadsheet plan-model as shown in FIG. 19. The top section of the dialog box 1902 offers alternatives for graphic analysis type, including prioritizer and optimizer. In the illustration, the user has selected optimizer 1903. In the lower section 1904 of the dialog box are text boxes for choosing goal and factor(s) for a particular graphic analysis of the selected type and indicating a name for each chosen goal and factor. These text boxes are laid out in two columns: a left column 1905 for choosing goal and factor(s) and a right column 1906 for designating a name for each goal and factor. In the left column 1905, in each textbox, the user indicates the appropriate plan-model cell containing the value of an output that is to be the goal or of an input that is to be a factor, either by typing that cell (such as B2) in the text box or, with the typing cursor located in the text box, pointing to the cell in the plan-model and clicking. In any text box for a goal or factor name, in the right text box column 1906 of the dialog box, the user may indicate a plan-model cell containing the appropriate name, in either of these ways, or alternatively type the desired name directly in the text box. When the dialog box indicates the graphic analysis type, goal, factor (s), and goal and factor names that the user desires, to proceed to development and display of the designated graphic analysis the user selects the OK button 1907.

In this embodiment, the lower section of the dialog box changes in response to user change of the upper section's selection of graph type. In the example illustrated in FIG. 19, in which the user has selected optimizer graphic analysis type, the lower section of the dialog box provides text boxes for choosing a factor1 and a factor2, which are the appropriate factor choices for an optimizer graphic analysis. These factor choice options correspond to the factor choices illustrated in the preceding FIG. 18, which illustrates a menu-lists window customized for choosing goal and factors for an optimizer graphic analysis. In fact, the graphic analysis chosen in the dialog box in FIG. 19 is exactly the same as that chosen from the menu lists system in FIG. 18. If instead in the upper section of the dialog box the user changes the selection of graphic analysis type to prioritizer, the lower section of the dialog box changes to enable the user to choose as many factors as he desires, corresponding to the menu lists window customized for prioritizer graphic analyses illustrated in FIG. 17, which enables choosing any number or combination of the listed factors. In the dialog box in FIG. 19, when the selected graphic analysis type is prioritizer, the user can obtain more text box rows to choose more factors, either by resizing the dialog box vertically to make it "taller," or by scrolling down to more text box rows using a displayed scrollbar.

After the goal and factor(s) are selected by the user, analytic graph lines or curves can be created and displayed. The graph lines show the mathematical relationships involving a goal and one or more factors singly or in combination. The graphs represent a vast number of "what-ifs" on a single display, with the graph line points representing data or values above and below the plan data entered (e.g., via spreadsheet) by the user. To accomplish this the graphic modeling software 112 manipulates the plan data or values in order to create and display the graph lines illustrating relationships between a designated goal and one or more factors.

Figure 20:
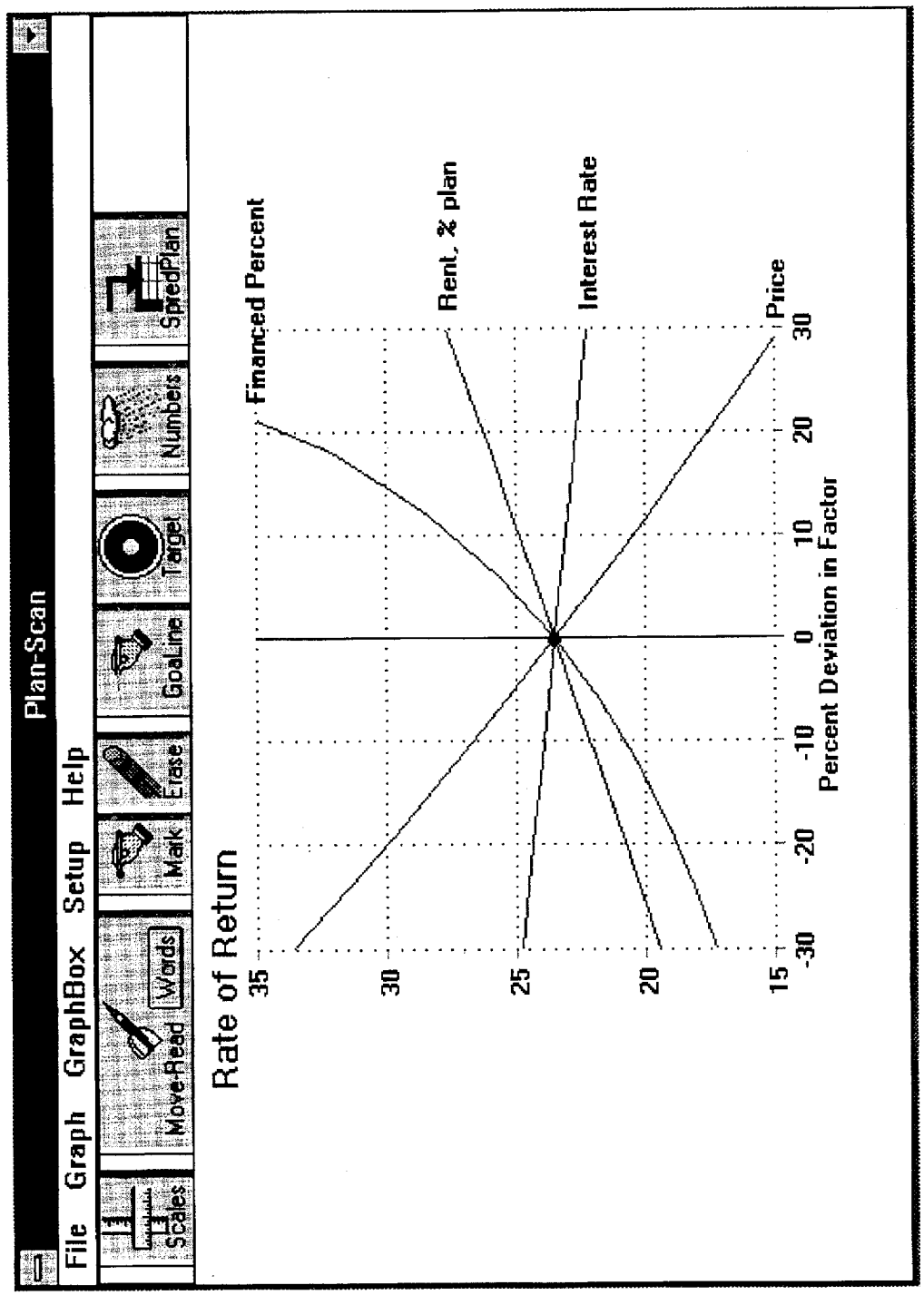
FIG. 20 illustrates a computer display screen having a prioritizer type graphic analysis.

FIG. 20 shows an example of a prioritizer graph. This particular graph is a graphic analysis developed from the condominium-investment plan-model entered in the spreadsheet as shown in FIG. 7, specifically the graphic analysis chosen by the combination of prioritizer graph menu selections shown in FIG. 17.

For prioritizer graphs, as illustrated by the example in FIG. 20, the vertical axis is a scale for measuring or identifying goal data or values. This axis measures goal data for which the user selected a graphic analysis in the goals list of the prioritizer graph menu. In the graph shown in FIG. 20, it measures goal data for rate of return as was selected from the goals list in the menu of FIG. 17.

The horizontal axis is a scale of potential deviations from plan data for factors. At or near the center of the horizontal axis is a zero-deviation point, meaning plan data entered in the plan-model. To the right is a scale of higher-than-plan data, and to left a scale of lower-than-plan data. This scale is measured in a common-denominator measure of deviations from plan data that can apply to any factor, in this example percent deviation from plan data. In the graph example shown in FIG. 20, the scale runs from 30% below plan (−30%) at the left of the graph, to 30% above plan (+30%) at the right of the graph.

The dot near the center of the graph represents the plan data entered in the plan-model. This plan-data dot is directly above the zero-deviation-from-plan position along the horizontal-axis scale. This means that all factors are at plan data or values. The height of the plan-data dot along the y-axis represents plan data for the goal, as shown in the entered plan-model. In the graph shown in FIG. 20, the height of this graph point represents the rate of return for the condominium plan according to the entered plan data, in this case 23.48% as was shown in the spreadsheet entry of the plan-model in FIG. 7.

Each graph line shows the relationship of the goal to one factor, with each particular factor identified by the label at that graph line's right end. There is a graph line for each factor selected from the factors list of the prioritizer graph menu on which the user selected this graphic analysis, shown in FIG. 17. On the menu in FIG. 17, the user selected four factors—price, financed percent, interest rate, and rent % plan. The graph in FIG. 20 delivers a graph line for each of these four factors.

The user will observe that the graph lines for the various factors all pass through the plan data "dot." All graph lines start at the plan data point and extend to the right and left from this graph point to show effects on the goal of positive (to right) and negative (to left) deviations of their factors from plan data.

In subsequent text, interactive use of the graphs are described, including illustrations of moving to various particular deviations from plan data and reading goal values of data for such what-if possibilities. At this point, a summary of the procedure for reading individual what-if possibilities is outlined. To read the effect on the goal of any particular deviation from plan data of any of the factors, the user proceeds from horizontal axis up to the graph line and then left to the vertical axis. For example, to find the goal result for a deviation from plan data for price 10% above plan, the user proceeds along the horizontal axis scale of percent deviations from plan data to the graph point of the hypothesized amount of factor deviation, in this case +10%. From that horizontal-axis graph position, the user goes vertically up to the graph line of the deviating factor, in this case price, to intersect this at the graph point for the hypothesized deviation from plan data. From that graph point, the user moves horizontally left to the vertical axis scale to read the corresponding goal value. The vertical-axis goal value or data for this rate of return goal is somewhat greater than 20%.

From the foregoing, it is seen that each graph line is a continuum of possibilities, in which every dot along the line is a what-if possibility associated with the plan-model. Each dot along the graph line is defined on the graph in terms of factor deviation (the position directly below along the horizontal axis scale) and in terms of the goal result (the position straight left along the vertical axis scale). For example, in FIG. 20, the price graph line shows price deviation and rate of return result for price 30% below plan, price 29% below plan, price 28% below plan, etc. With just a single graph line, the graph shows many possibilities; and multiple graph lines multiply the numbers of possibilities shown on a single graph of this type.

Each graph line is the mathematical relationship between a factor and a goal, delivered graphically. As has been noted, typically these relationships are not entered or displayed at any place in the entire entered plan, yet the graphic analysis of the invention determines these relationships, and delivers them in a visual manner in which typical business users can understand them.

By determining and displaying these factor-goal relationships, and especially determining and displaying them for multiple factors in a single graphic analysis, the invention develops and delivers fundamental information on the economic-mathematical structure of the world of what-if possibilities for the plan-model relative to a particular goal. Conceptually, the plan data in the entered plan-model is just one dot in a world of possibilities, in which any factor can deviate from plan data and change results for the goal according to the economic-mathematical factors-goal structure of the plan. The prioritizer graph develops, and delivers within the two dimensions of the computer display, fundamental information on the economic-mathematical structure of the world of possibilities for the plan.

The slopes of the graph lines developed and displayed by the prioritizer graph provide information on relative priorities or leverages of various factors in effect on the plan-model goal. For given factor deviations as measured by the horizontal axis scale, factors with steeper graph lines have more effect on results for the goal. For example, the graph in FIG. 20 shows that for the condominium plan, relative to percent deviations in price and financed percent affect the return on investment goal far more than interest rate. From this graph, a user can quickly notice that a change of 5% in financed percent will affect rate of return more than a change of 20% in interest rate. Such information can be of great value in negotiations, such as the condominium investment and financing, and in focusing management attention on the factors that matter most to the goals.

The graphs deliver information on alternative ways to achieve various higher results for goals. For example, the plan-model for the condominium has a rate of return of about 23%, as represented by the plan dot at center of the FIG. 20 graph, which reflects the plan data as entered in the spreadsheet. However, assume that a rate of return of 25% is required. The graphic analysis has developed and delivered information on ways this higher goal could be met, namely, the points at which various graph lines rise above the height of 25% on the vertical axis scale. In this example, the higher goal can be met by price 5% below the entered plan data, or financed percent 4% above plan data, or rent 12% above plan data.

Similarly, the graphs convey information on deviations from plan data that would cause goal results to fall below values that users may consider thresholds of unacceptability. For example, certain condominium investors may consider the plan data goal of about 23% rate of return acceptable, but consider anything below 20% unacceptable. In producing the graph shown in FIG. 20, information is developed and delivered on what-if possibilities that would drive rate of return below that minimum, which the users can see by noting where various graph lines drop below the 20% level on the vertical axis, namely, rent 26% below entered plan data, or financed percent 13% below plan data, or price 12% above plan data.

Figure 21:
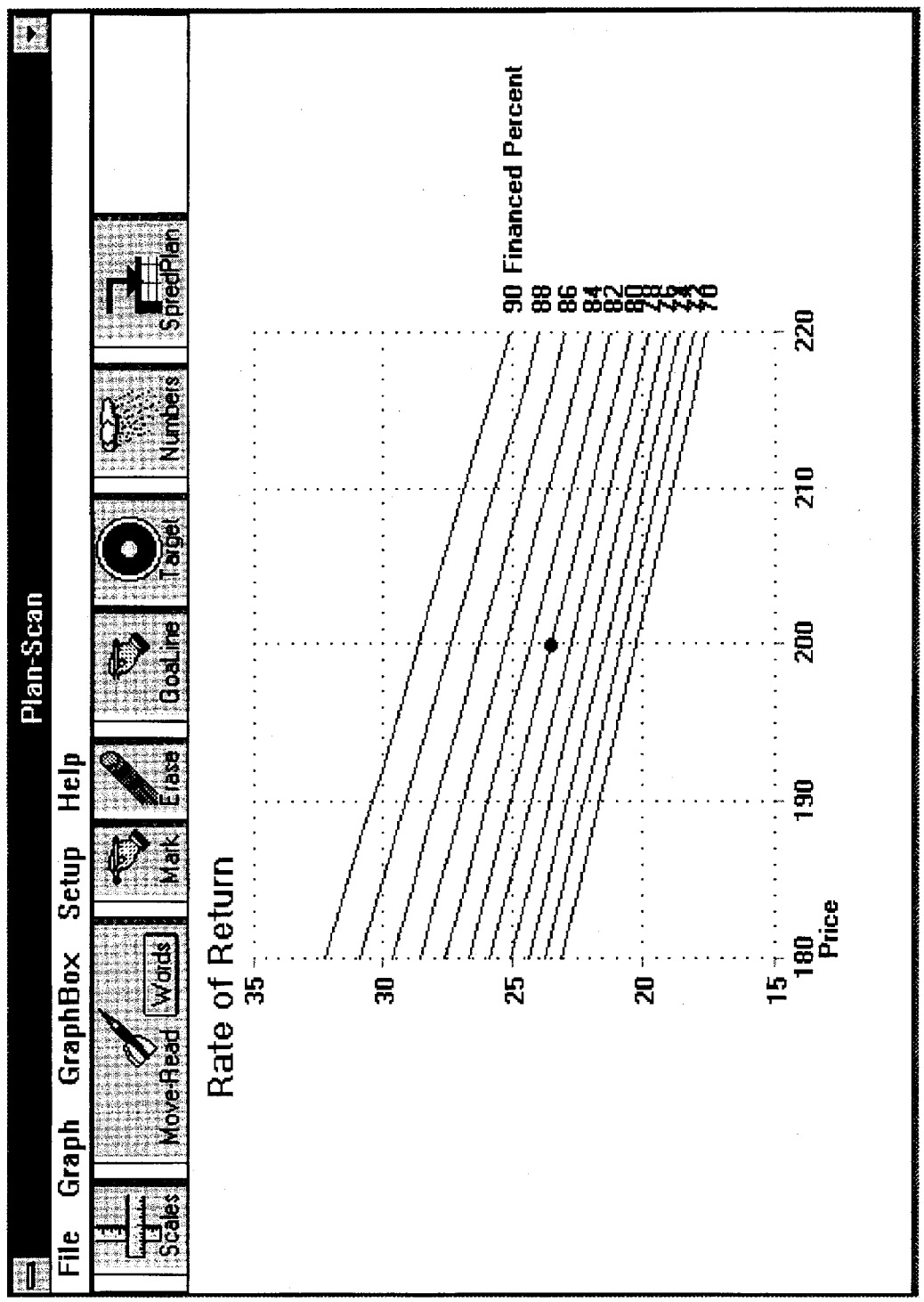
FIG. 21 illustrates a computer display screen having an optimizer type graphic analysis.

FIG. 21 shows an example of the second type of graphic analysis created and delivered by the invention, which are the optimizer graphs. This particular graph is also a graphic analysis developed from the condominium plan-model entered in the spreadsheet as shown in FIG. 7, specifically the graphic analysis chosen by the combination of optimizer graph menu selections shown in FIG. 18.

The optimizer graph design has a purpose complementary to that of the prioritizer graph design. Through a prioritizer graph, the invention develops and delivers information on effects on the goal of ranges of possibilities for each of any number of factors. That type of graphic analysis provides, among other things, information on which of many factors affect the selected goal the most and deserve priority attention. But the prioritizer analysis does not always provide precise information on combined effects of changes in interrelated pairs of factors. After receiving from a prioritizer graph information on which factors affect the goal the most, a user will logically want information on how the goal is affected if two important factors both deviate from plan. This is accomplished by the optimizer graphic analyses.

In the prioritizer graph that was shown in FIG. 20 for the condominium plan, the two factors to which rate of return is most sensitive are price and financed percent. Consequently, a user might logically want to see a graphic analysis showing effect on this goal for various combinations of what-if possibilities for data or values above and below plan data for both price and financed percent. The selections shown in the optimizer graph menu in FIG. 18 represent a request for such a graphic analysis, and the optimizer graph shown in FIG. 21 provides an example of the delivery of such an analysis.

In optimizer graphic analyses, as illustrated by the example in FIG. 21, the vertical axis is like that of a prioritizer graph—a scale for measuring the resulting data for the output goal. This axis measures resulting value for the goal for which the user selected a graphic analysis in the goals list of the optimizer graph menu. In the graphic analysis shown in FIG. 21, it measures goal data for rate of return as was selected in the goals list in the graph menu of FIG. 18.

In optimizer graphs, however, the horizontal axis and the various graph lines are defined for a different body of information than that in prioritizer graphs. An optimizer graph focuses on effects on the goal of only two factors, for which it shows effects of various combinations of values above or below plan data for both factors. In an optimizer graph, the horizontal axis is a scale of value possibilities for only one factor. Rather than showing a common-denominator scale such as percent deviation as in a prioritizer graph, an optimizer graph's horizontal axis scale is in the value units of the one factor for which it represents a scale of possible values. Specifically, the horizontal axis is a scale of values above and below plan data for the factor the user selected as factor1 in the optimizer graph menu. In the optimizer graph menu shown in FIG. 18, the user selected price in the factor1 list. In the resulting optimizer graphic analysis as shown in FIG. 21, the horizontal axis is a scale of possibilities for values above and below plan data for the price factor. In the spreadsheet plan-model, the value of price (in $000) is 200, and the scale runs from 180 to 220.

In an optimizer graphic analysis, the graph lines are a set, each representing a different value possibility for the other factor the user selected for the analysis, as factor2 in the optimizer graph menu. In the optimizer graph menu shown in FIG. 18, the user selection for factor2 is "financed percent." In the resulting optimizer graphic analysis, the set of graph lines represents various what-if possibilities for financed percent above or below the plan data, as indicated in the labeling of the graph lines at their right end in FIG. 21. For the plan data entered in the spreadsheet, in FIG. 7, the value of financed percent is 80 and the graphic analysis shows graph lines for a range of values below and above this value, from 70 to 90.

In an optimizer graphic analysis, each graph line represents the various value combinations and relationship of factor1 (on the horizontal axis) and the goal (on the vertical axis), at the value of factor2 represented by the labeling at that line's right end.

As in a prioritizer graphic analysis, a dot is shown for the plan data contained in the user entry of the plan-model. In FIG. 21, the dot represents the plan data as entered in the spreadsheet in FIG. 10, namely: price of 200, financed percent of 80, and resulting rate of return of 23.48%.

To read any possibility for combined values above or below the plan data for the two factors, the user goes to the point that is above the hypothesized value for factor1 and on the line of the hypothesized value of factor2, which is the graph point representing the hypothesized combination of values for the two factors. From that point, the user moves horizontally to the left to the vertical axis to read the goal result for that combination of factor values.

Compared to a prioritizer graphic analysis, an optimizer analysis provides the user information on even more possibilities. In the optimizer format, as in the prioritizer format, each graph line is a continuum of many possibilities, such as price=180, price=181, and so on. The scale for factor2 is also a continuum, of which the graph lines represent intervals, so in addition to all the graph points along all the graph lines, all the points between the graph lines also represent additional possibilities. On a prioritizer graphic analysis, the user can "read between the lines." For example, in FIG. 21, the user can read any combination of any price together with financed percent of 89, even though there is no graph line for financed percent of 89, by going to a point about halfway between the 88 and 90 financed percent graph lines.

With regard to creating the graphs, the graphic modeling software is used in determining the graph points and the ranges as well as the appropriate increments for the graph axes. In particular, the graphic modeling software finds the graph point representing the plan data. For the prioritizer graph, the graphic modeling software obtains the value of the selected goal from the entered plan data for this goal. For the optimizer graph, the graphic modeling software obtains values for the two selected factors and the one selected goal using the entered plan data for these factors and goal. In the described embodiment of the invention, the graphic modeling software obtains these values from the plan data entered in the spreadsheet using DDE or OLE to obtain the required values from the appropriate spreadsheet as specified in the linking information provided in the SpredLink window or other means as described previously.

In determining graph axes ranges and increments, the graphic modeling software uses the factor and goal plan data from the plan-model as a starting point to establish the low-to-high range for the axes. Specifically, the graphic modeling software 112 determines, for each graphic analysis, ranges and increments for the factors and goals for the particular plan-model, above and below the plan-point or plan data defined in the plan-model. Graph axes are also obtained that reflect these ranges and increments. The graphic modeling software 112 also determines related factor and goal data across the determined factor ranges, above and below the plan-model's plan-point, for graph lines reflecting what-if possibilities and underlying factor-goal relationships. From this, graph lines containing such information are displayed according to the determined axes. These basic steps are now discussed in more detail.

For determining, from an entered plan-model, (a) particular goals' relationships to particular factors and (b) particular goals' values at particular values of particular factors, in one embodiment, the graphic modeling software derives direct goal-factor formulas or equations, each directly relating a particular goal to one particular factor (or a few particular factors). For example, if the graphic analysis is to provide information on the relationship of the condominium plan's "rate of return" goal to the "price" factor, an equation is derived that determines rate of return as a direct function of price, with no other variables. Such an equation is then itself a mathematical expression of the goal-factor relationship to be shown graphically. This goal-factor relationship is translated from an equation or formula to a graph line. To determine the goal value for any particular factor value, with such a derived equation, the graphic modeling software enters the factor data and solves the equation for the goal data or value. More particularly, the graphic modeling software 112 takes the spreadsheet plan-model data (e.g., from FIG. 7) and varies the factor data for the plan-model to generate variant goal data, which deviates from plan data. The magnitude of the deviation may be expressed as an amount or a percentage. For example, for a selected factor, each variant data may differ from the plan data by a value of 0.01 or by one percent. From this factor variant data, goal variant data is calculated using an expression derived from plan-model formulas associated with the electronic spreadsheet software 108. The graphic modeling software 112 uses the processor 104 and memory 116 to generate factor variant data and goal variant data, such as by determining a few graph points and then creating continuous graph points between these determined graph points by means of determined line segments. Based on these determinations, the graphic modeling software 112 is able to generate the graph lines for the selected graph by displaying the selected goal as a function of the selected factor(s) using the calculated variant data for both the goal and the factor(s).

In user entry of plan-models, even in formats other than spreadsheets, it is common to not enter direct goal-factor formulas or equations, but rather to enter chains of relatively simple formulas or equations which represent little steps that cumulatively proceed from factors to goals. So the relationship between a goal and a factor is not expressed directly, but implied in chains and sets of formulas or equations, each referring to formulas or equations in other cells in the chains and sets. As has been previously noted, this practice is encouraged by the nature of spreadsheets and is standardly prevalent in spreadsheet plan-models.

However, the invention has the capability to trace relationships through such spreadsheet-formula chains of formulas, to derive a direct single formula or equation relating any selected goal to any selected factor. The following summarizes major steps in an exemplary process through which the graphic modeling software 112 (a) derives such a direct goal-factor formula from chains of formulas in a spreadsheet plan-model, and then (b) uses the derived direct goal-factor equation to develop and deliver a graph line depicting the goal-factor relationship.

Figure 22:
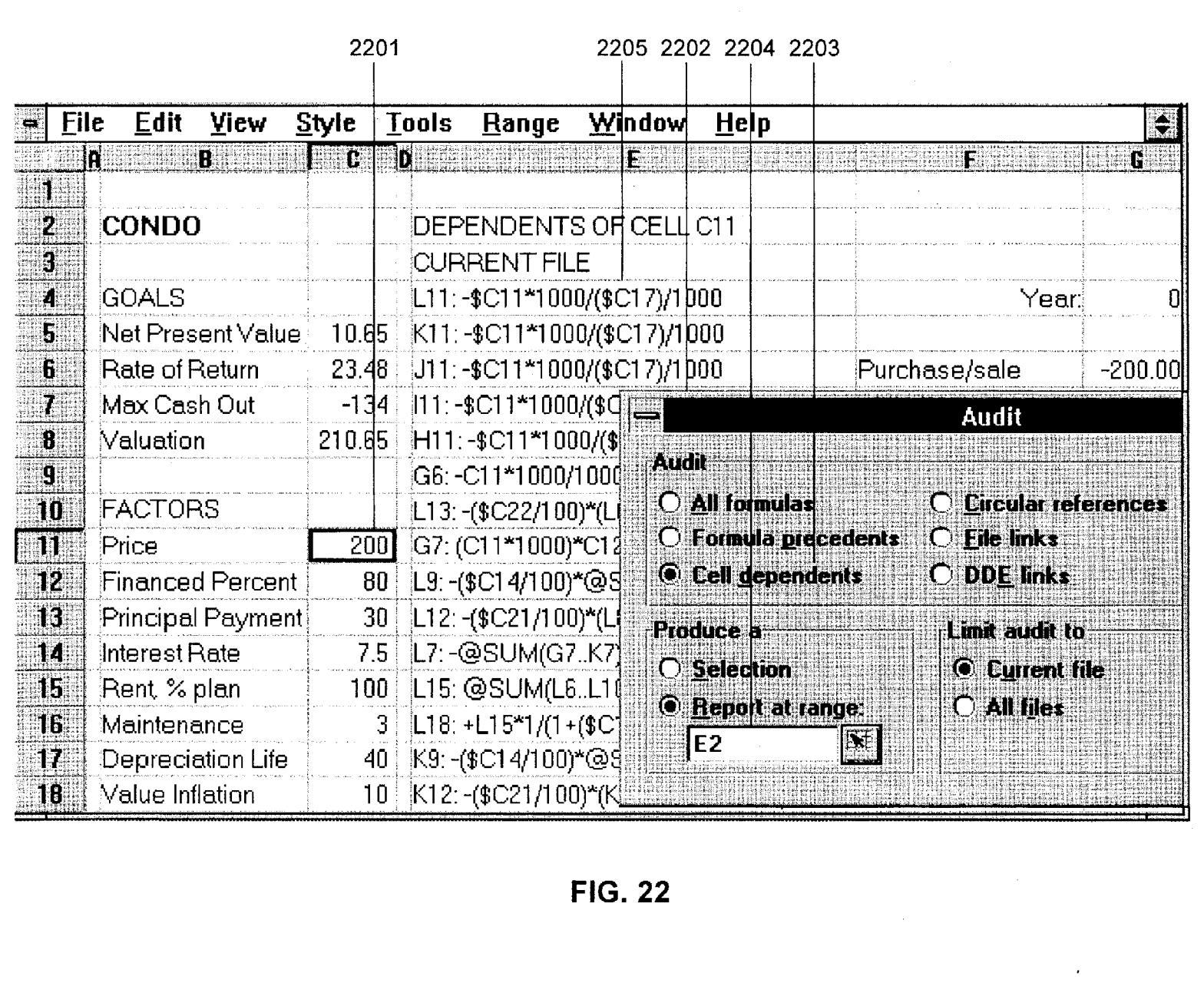

In particular, first the goal and factor to be related are determined, and then the derivation of a formula directly relating the goal to the factor is accomplished. To accomplish this, the first step is to use the spreadsheet audit feature to obtain a list of all cells dependent on the factor's value, specifying for each such cell both cell address (such as B2) and entered content (such as a formula). FIG. 22 illustrates an example of this step, using the Lotus 1-2-3® spreadsheet software's audit feature to obtain a list of all dependent cells for the price cell in the condominium plan. The factor cell for which dependents are sought, in this example the price cell 2201 (C11) is selected. Then the audit feature is selected via the spreadsheet software menu. In the audit box 2202, a request is indicated for cell dependents 2203 to be listed in a spreadsheet column starting at cell 2204 (E2). In response, in column E, the spreadsheet displays a list 2205 specifying cell address and entered contents for every cell in the plan-model that is affected by the value in price cell 2201 (C11).

The graphic modeling software 112 can command the spreadsheet to do what is shown in FIG. 22, and can then read and manipulate the list, using DDE or OLE. With this list, together with obtaining of the formula entered in the spreadsheet cell of the goal for which the formula is to be derived, in this example the "rate of return" cell (C6), the graphic modeling software can derive the desired formula. That is, for each reference contained in the formula for the goal, the graphic modeling software does the following: if the reference is simply the factor's cell, for that reference it substitutes X, representing the factor as a variable; if the reference is not in the factor's cell dependents list, for that reference it substitutes the referenced cell's value; and if the reference is in the factor's cell dependents list but is not simply the factor's cell, in which case it must be a formula, it repeats the above procedure for that referenced formula. Completion of this process, for the goal cell and for each formula that is referenced by the goal formula or any chain of reference therefrom, results in converting the equation or formula for the goal into a form in which every reference to any other cell is either (a) an X, representing the factor to which the goal is to be related, or (b) a value, representing plan data unrelated to the factor. In other words, the result of the process is an equation that expresses the goal directly in terms of the factor, with no other variables. For any individual value of the factor, the graphic modeling software uses this equation to determine goal data by substitution and solution.

Figure 23:
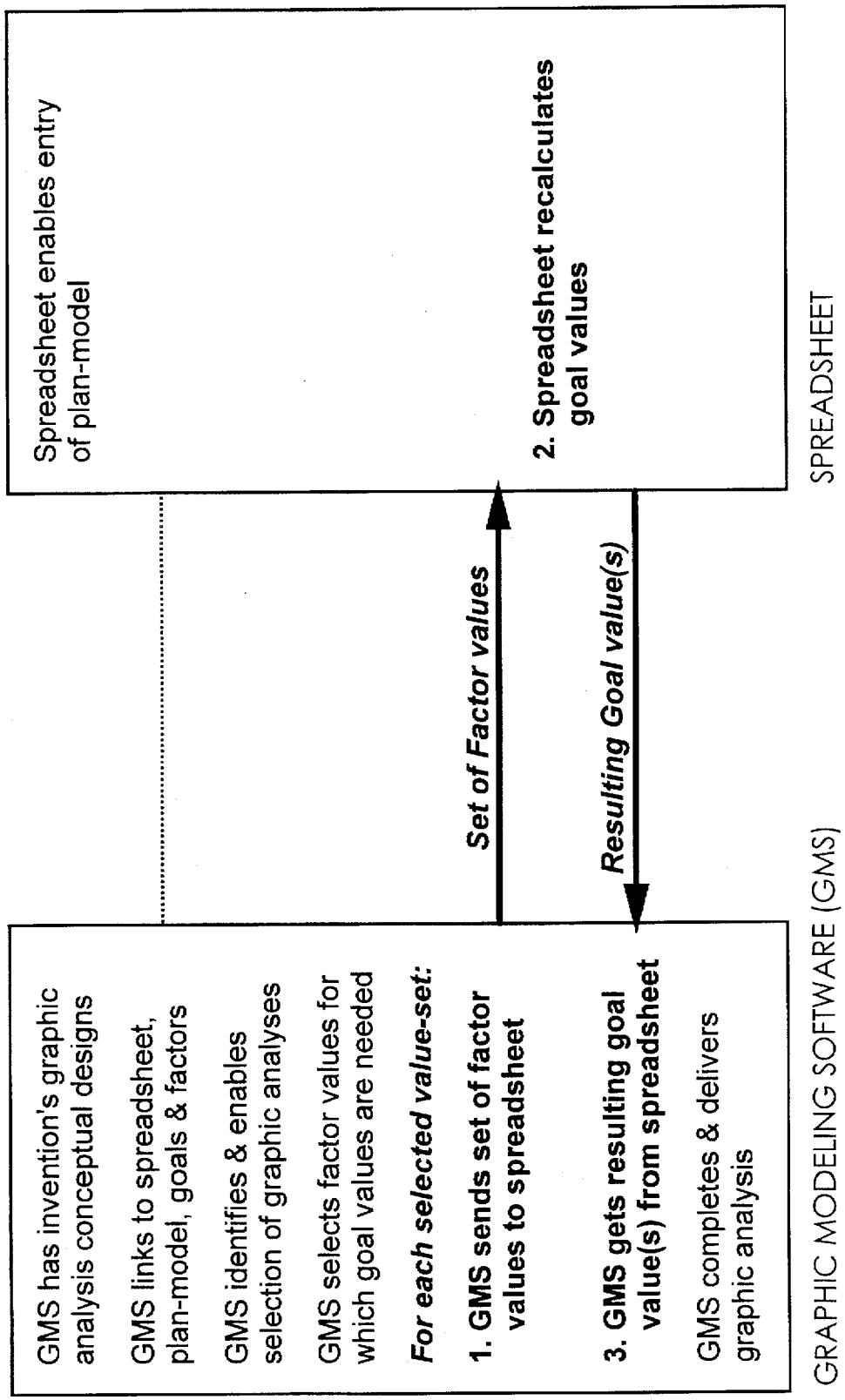
FIG. 23 illustrates a step diagram for determining goal data and producing a graphic analysis showing a goal-factor relationship without the intermediate step of deriving direct goal-factor formulas.

If the plan-model is contained in a software product that has the capability to calculate goal data for any particular defined set of factor data, as for example a spreadsheet does, the graphic modeling software 112 is able to develop and deliver the graphic analyses without deriving direct goal-factor equations as just described. This embodiment is illustrated in FIG. 23, in which two rectangles represent the roles in the graphic analysis development and delivery process of the graphic modeling software 112 and the spreadsheet software 108. The graphic modeling software proceeds to the point at which it has determined factor data for which it requires goal data for development of a graphic analysis. Then for the goal calculation step, for each set of factor data in translating all the selected factor data into the graphic analysis, the graphic modeling software uses the spreadsheet as a calculation slave. For each set of factor data for which goal data is to be determined, the graphic modeling software enters that set of factor data in the spreadsheet plan-model, and then reads the calculator's (spreadsheet's) automatically recalculated display of resulting goal data. Then the graphic modeling software continues to complete development and delivery of the graphic analysis.

Use of the graphic modeling software 112 to determine appropriate factor ranges and factor-axis increments is next described, with reference to the prioritizer graph. First, a common-denominator measure of value variations from plan data that is applicable to all factors is selected (such as percent deviation). Then, a range and axis-label increment for such variations is found. Subsequently, an axis reflecting these determinations is displayed, as exemplified by the horizontal axis in the prioritizer graphic analysis example shown in FIG. 20. For an optimizer analysis, plan data for factor1 and factor2 are obtained from the plan-model; for factor1, based on its value of the plan data, an appropriate combination of range and axis increment is determined; a horizontal axis for factor1 is developed and displayed reflecting these determinations, as exemplified by the horizontal price axis in the optimizer graphic-analysis example shown in FIG. 21. A preliminary determination is made of the range of factor2 values for which graph lines will subsequently be developed and displayed, as exemplified by the range of 70 to 90 for the financed percent graph lines in the optimizer graphic analysis example in FIG. 21.

The graphic modeling software then develops ranges, increments, and axes for goals. Factor values or data are selected for exploring ranges of resulting goal values. Each factor value is inserted into the spreadsheet plan-model or derived equation, and the resulting goal data for each insertion is stored in the memory 116. Based on the goal values obtained from these calculations, an appropriate combination of range and increment for the goal axis is determined. In a preferred embodiment of the invention, this determination is not made simply to cover the entire range of goal values for all of the factor ranges. In the invention's graphic analyses, it often occurs that some factor values result in goal values of a far wider range while most factor values produce goal values in a much narrower range. The determination of goal range and increment is based on selecting an appropriate balance between (a) displaying goal results for all or most factor values in the graphic analysis and (b) displaying goal values for most factor values with greatest clarity. For example, in the prioritizer analysis shown in FIG. 20, the vertical goal axis range selection sacrificed showing results for extreme positive deviations for the "percent financed" factor in order to show more clearly smaller variations of goal value from plan data for other variations of all factors.

For the optimizer graph, an increment for factor2 is determined (and if appropriate, range adjusted modestly to correspond to the increment) to provide the fullest set of graph lines consistent with their representing values that can be labeled with highest clarity.

For development and display of the graph lines, the graphic modeling software determines one more kind of incrementing. For each graph line, the horizontal axis values are determined and graph points defined and connected using well-known and conventional vector-graphic straight line segments. In doing this, in one embodiment, the pixel resolution of the computer display and the fraction of the display used for the graph range are found. A horizontal-axis factor increment is then used which is equivalent to one horizontal computer-displayed pixel increment.

For typical graphic analyses of typical business plans, most graph lines are straight, with no discontinuities. The graphic modeling software can develop and deliver such a graph line from only two graph points. For typical graphic analyses of typical business plans, most graph lines that are not straight lines are smooth curves with no discontinuities. The graphic modeling software can develop and deliver virtually any business-plan continuous curve from 10 to 20 graph points. The characteristics of a graph line that may require additional graph points are extreme curves, and graph lines with discontinuities, such as caused by sudden jumps in fixed costs as volumes rise or in tax rates as profits rise.

To detect these characteristics of goal-factor relationships, steps taken include the following:

(a) an analysis of the plan-model, to detect formula characteristics causing goal-factor curves, such as the factor being a denominator in the equation for the goal, and formula characteristics likely to cause goal-factor discontinuities, such as IF functions in the goal-factor equation;

(b) exploration of the graph line, through determination of selected graph points to test for straightness or curve pattern or existence of discontinuity; and (c) users are able to make entries indicating the nature of graph lines including indications of straight or curved and no or yes for discontinuities and, if yes, whatever information the user can provide to enhance the graphic modeling software's pinpointing of the discontinuities.

To complete this characterization of the goal-factor relationship to be depicted by a graph line, the graphic modeling software determines an appropriate set of horizontal-axis factor values for a set of graph points enabling efficient development and delivery of the graph line. For a straight line, the invention can develop and deliver the graph line by determining two graph points at left and right extremes of the graph area. For a continuous curve, the graph line is developed and delivered by determining a small number of graph points, typically at regular horizontal-factor increments across the graph area. For any discontinuity in the relationship between the goal and the horizontal axis factor, additional graph points are required at values of that factor immediately below and above its value at the discontinuity.

Once the ranges and increments have been determined for the axes, the graphic modeling software is used to develop and deliver the graph lines to complete the graphic analysis through a calculation-and-display process.

In the embodiment of the invention described herein, in which the plan-model is entered in a spreadsheet, the graphic modeling software uses the spreadsheet as a calculator as diagrammed in FIG. 23. The graphic modeling software develops and delivers a graph line by, for each successive factor data across the horizontal range, entering the factor data in the spreadsheet plan-model, reading the resulting goal data calculated by the spreadsheet, and combining the factor and goal data to define a graph point. That graph point is displayed and a graph line segment to it from the preceding graph point.

For a prioritizer graph analysis, the embodiment of the invention develops and delivers a graph line for one factor, such as the graph line for "price" in the pribritizer analysis shown in FIG. 20, to the left, and then to the right, from the planpoint. This process is repeated for each other factor's graph line. For an optimizer graph analysis, for the first graph line (such as the graph line for financed percent of 70 in the optimizer analysis of FIG. 21), the graphic modeling software enters, in the spreadsheet plan-model, the factor2 value for that graph line and then, to complete development and delivery of that graph line, for each of the appropriate factor1 increments, the graphic modeling software enters the appropriate factor1 value in the spreadsheet plan-model. After this, the graphic modeling software reads the resulting recalculated goal data or value from the plan-model, combines the factor1 and goal values to determine a graph point, and then causes the computer display to show a line segment to that graph point from the preceding graph point. Then for each additional graph line in the optimizer analysis, the graphic modeling software repeats this procedure, starting with entry in the spreadsheet plan-model of the factor2 value for that graph line.

The invention's graphic analyses are not limited to those exemplified by FIGS. 20 and 21 and the preceding descriptions of them. The invention can develop and deliver graphic analyses for any ranges, increments, and axes, can develop and deliver graphic analyses of types other than the prioritizer and optimizer types illustrated herein, and can simultaneously develop and deliver multiple graphic analyses either separated or combined.

As has been described, the invention has the capability to automatically determine, for each individual graphic analysis of each plan-model, ranges, increments, and axes. The invention also includes the capabilities by which users can change any or all of these characteristics for any graphic analysis, and by which users can adjust the invention's general system for its initial determination of these items in its initial development and delivery of graphic analyses.

Figure 24:
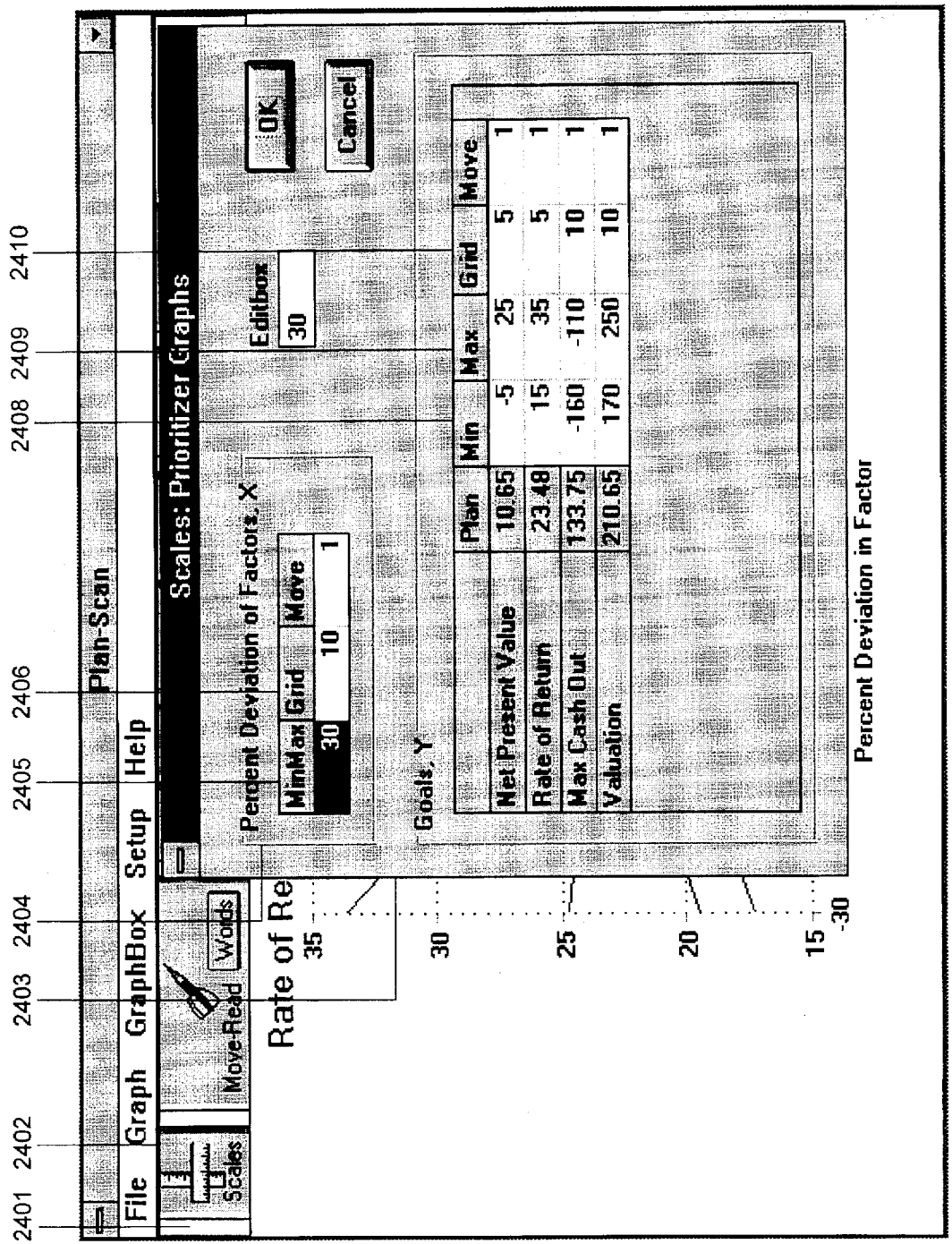
FIG. 24 illustrates a computer display screen having a window for obtaining desired axes ranges and increments for a prioritizer graph.

A design for implementing this capability is shown in FIG. 24. In the embodiment of the invention illustrated, whenever a graph analysis is delivered, above the graphic analysis, a row of icon-buttons 2401 appears across the display. With a prioritizer graph analysis displayed, when the user selects the Scales icon-button 2402 at the left end of the icon-buttons row, a Scales prioritizer graphs window 2403 appears, containing tables in which the user can change values of ranges and increments for the graphic analysis axes.

In the table shown at upper left 2404 in this window, the user can change range and increment for the horizontal axis used for all factors in a prioritizer graph analysis. This table's first box 2405, labeled MinMax, and now containing 30, determines the prioritizer graphic analysis horizontal percent deviation range for factors, above and below plan. In the initial development and delivery of the prioritizer graphic analysis shown in FIG. 20, the horizontal axis range is −30 to +30 as determined by the 30 now in this box 2405. The user can change the number in this box from 30 to another number, after which new development and delivery of the graphic analysis will be carried out according to the newly entered range. For example, if the user changes the 30 to 15, a new development and delivery of the prioritizer analysis will extend across a horizontal axis percent deviation range of −15 to +15.

In FIG. 24, the upper-left table's second box 2406, labeled Grid, and now containing 10, determines the increment for the horizontal-axis scale labels and grid lines (vertical lines corresponding to horizontal-axis scale labels). In the prioritizer graph analysis shown in FIG. 20, the 10 in this box guided the system to produce horizontal axis scale labels and vertical gridlines at intervals of 10 to right and left of plan along the horizontal axis—at +10, +20, and +30 to right, and −10, −20, and −30 to left. If after changing MinMax to 15, the user changes the 10 in the Grid box 2406 to 3, then new development and delivery of the graphic analysis will have horizontal-axis scale labels and vertical grid lines at intervals of 3, from plan out to the right and left extremes. Starting at 0 for plan, there will be scale labels and vertical grid lines at +3, +6, +9, +12 and +15 to right, and −3, −6, −9, −12 and −15 to left.

The Scales prioritizer graph window in FIG. 24 also shows a second similar table for user change of ranges and increments for the vertical goal axis of the prioritizer graph. In this table there is a row for each goal in the plan-model, specifying that goal's name, and also specifying the goal's plan data to help the user make sure his settings for goal axis range encompass the plan-point. In each goal's row, there are boxes labeled Min 2408 and Max 2409 for changing the axis-range and Grid 2410 for changing the grid increment. The prioritizer graph analysis shown in FIG. 20, in which the goal is rate of return, the goal axis reflects the setting numbers now shown in the rate of return row 2411 of the table: from 15 to 35 in grid increments of 5. If the user changes these settings to 20, 30, and 2 respectively, new development and delivery of the graphic analysis will have a vertical goal axis from 20 to 30 in grid increments of 2.

Figure 25:
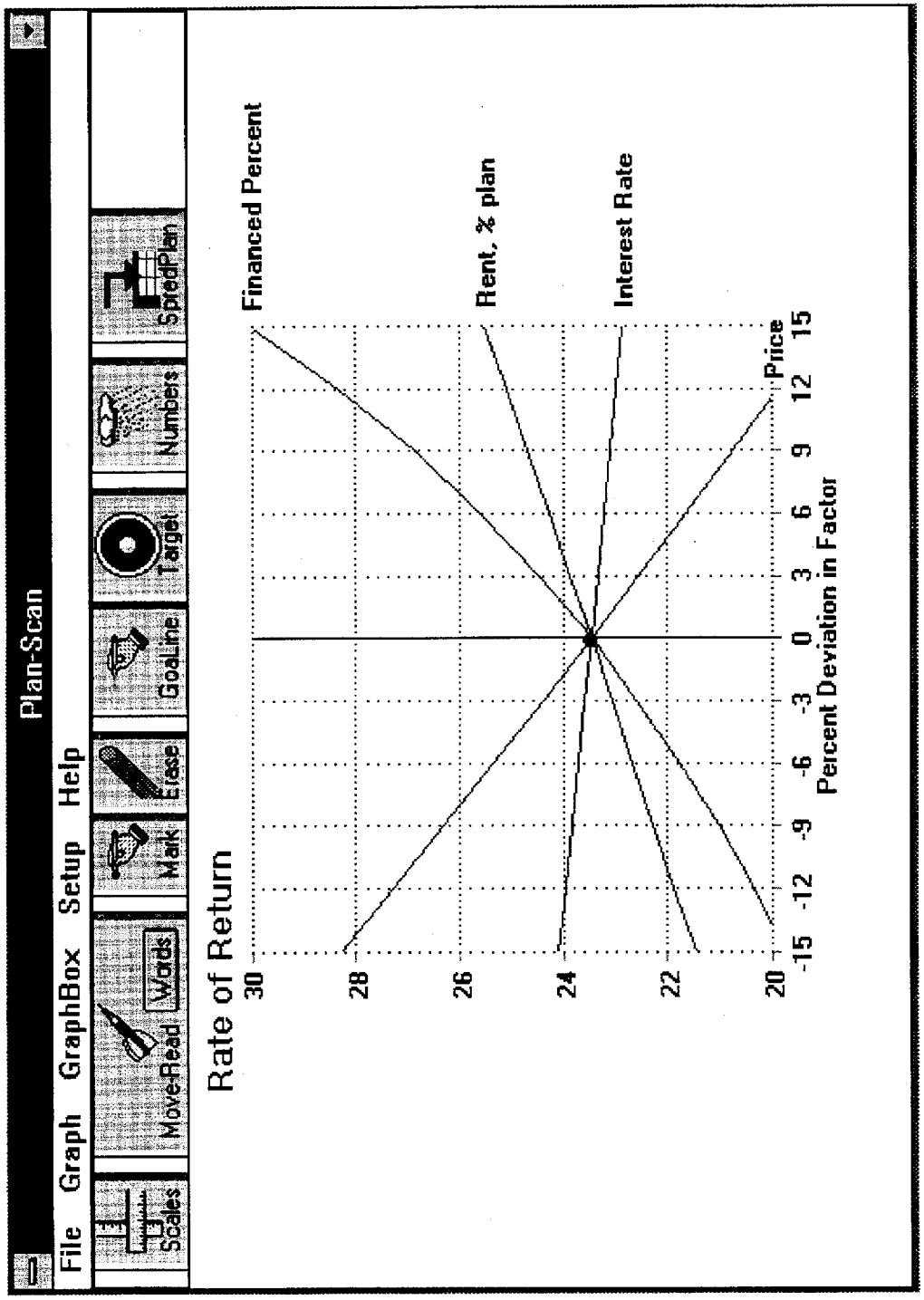
FIG. 25 illustrates a computer display screen having the prioritizer graph lines of FIG. 20 but with different axes, ranges and increments.

FIG. 25 provides an illustration of the ability to develop and deliver prioritizer analyses according to ranges and increments specified by the user. This figure shows the same prioritizer graphic analysis as FIG. 20, changed to reflect all changes of ranges and scale-and-grid increments for both axes mentioned in the preceding two paragraphs. The horizontal factor percent deviation axis extends from −15 to +15 with scale labels and vertical grid increments above and below plan at increments of 3, and the vertical rate of return goal axis extends from 20 to 30 with scale labels and grid increments of 2. The graph lines have been developed and delivered anew for these new ranges.

Figure 26:
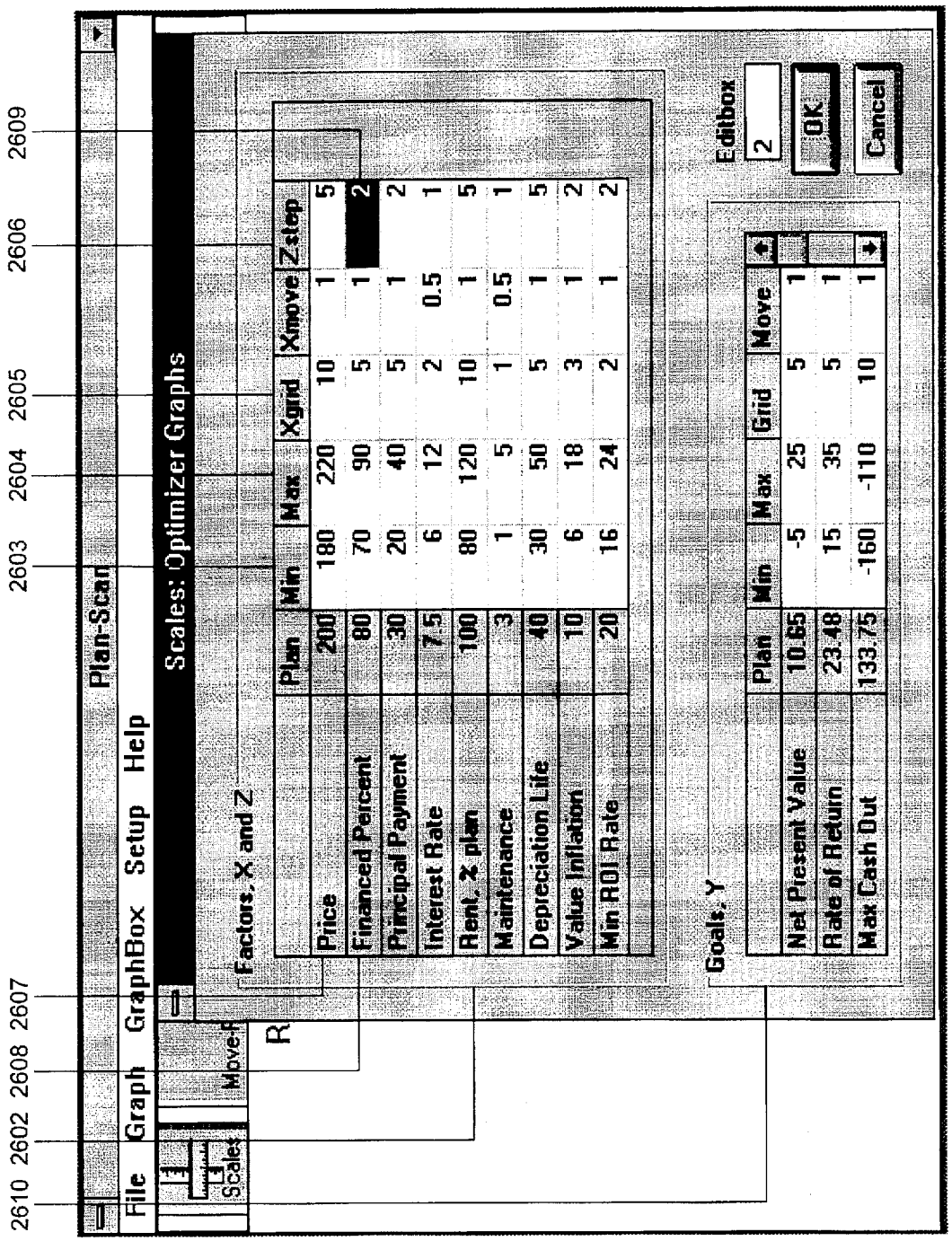
FIG. 26 illustrates a computer display screen having a window for obtaining desired axes ranges and increments for an optimizer graph.

FIG. 26 shows a window for user change of ranges and increments for axes of optimizer graph analyses, analogous to that for prioritizer graph analyses shown in FIG. 24. In this embodiment of the invention, whenever an optimizer graph analysis is displayed, user selection of the Scales icon-button causes display of this window. In the upper table 2602 of this window, for changing ranges and increments for factors, there is a row for each factor in the plan-model showing factor name, and also the factor's plan data to help the user set ranges that encompass the factor plan data. For each factor, there are Min 2603 and Max 2604 boxes to define factor range; an Xgrid box 2605 to define the scale labels and a grid increment used for the horizontal axis when that factor is factor1, and a Zstep box 2606 defining the increment between adjacent graph lines when that factor is factor2. In the optimizer graph analysis shown in FIG. 21, ranges and increments reflect settings shown in this table. The horizontal price axis has range of 180 to 220 with increments of 10, as specified in the table's price row 2607 for Min, Max, and Xstep. And the financed percent graph line set has range of 70 to 90 at intervals of 2, as specified in the table's financed percent row 2608 for Min, Max, and Zstep.

Figure 27:
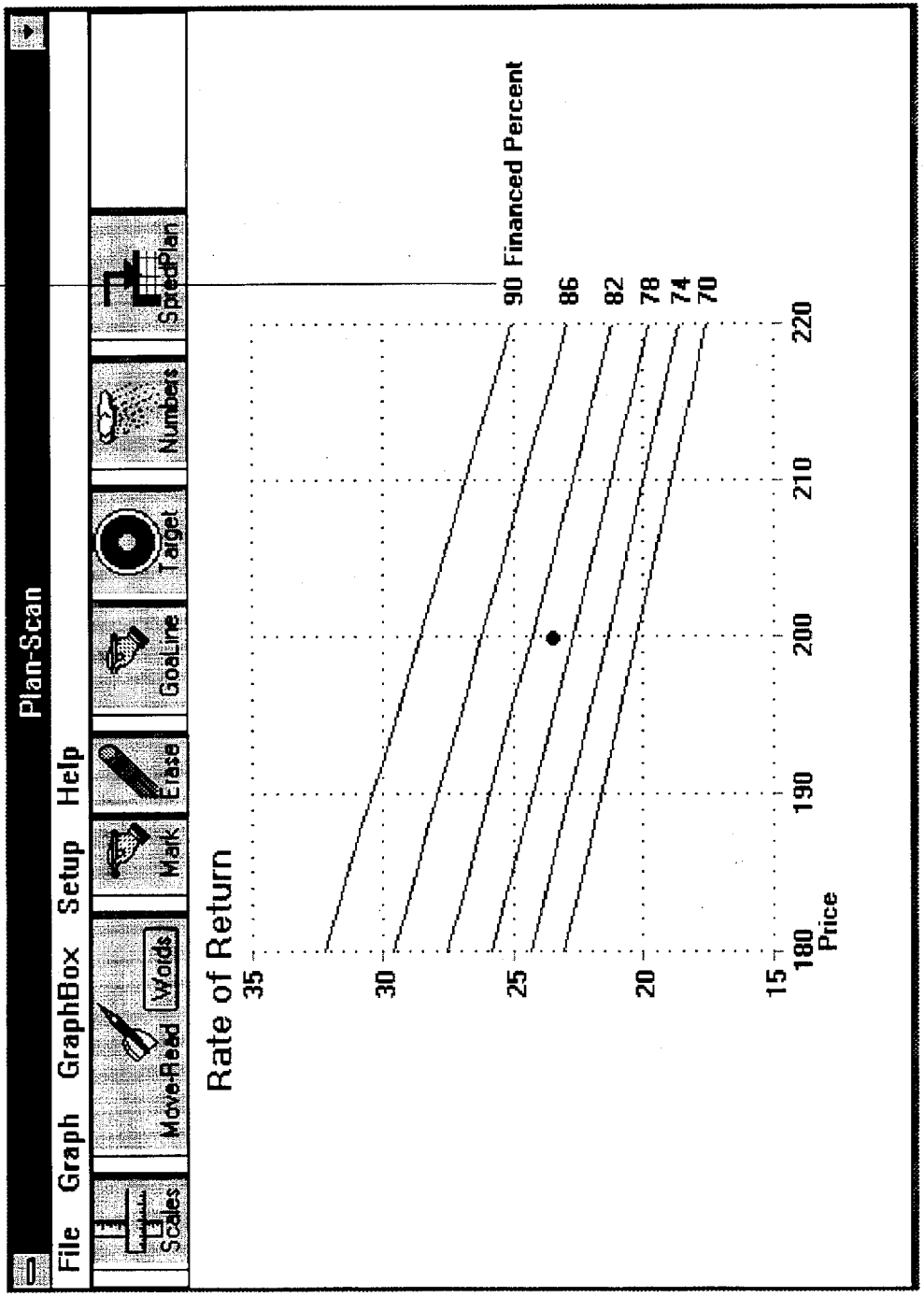
FIG. 27 illustrates a computer display screen having the optimizer type graph lines with the graph lines increment changed by the user from that illustrated in FIG. 21.

If in this table the user changes the number in the financed percent row's Zstep box 2609 from 2 to 4, to make the graph lines a little further apart and thus improve legibility of their value labels, new development and delivery of the same graphic analysis will appear as shown in FIG. 27. This optimizer analysis is identical to that in FIG. 21 except that the interval 2701 from one graph line to the next has been changed from 2 to 4.

The window for user change of optimizer ranges and increments also has a lower table 2610 for changing range and increment of the vertical goal axis, which works like the goal-axis table for prioritizer analyses described previously.

In the described embodiment of the invention, the user can save on disk his changes in range and increment settings. When he saves a graphic modeling software file, which as described previously is plan-model specific and includes all current information for the plan-model linking, the file also can include the user's current settings for graphic analysis ranges and increments. After such a file-save, in future use of the graphic modeling software, the user can establish all information on both linking and range-and-increment settings that was current at time of file save by simply opening the file in which it was saved.

More fundamentally, the invention includes capabilities for specifying and changing ranges of individual graph lines in any graphic analysis. While changing axis range alters only the ranges over which graphic analysis information is developed and delivered, specifying or changing ranges of individual graph lines makes the graphic analyses develop and deliver fundamental additional information.

To provide an example, consider the condominium plan's prioritizer analysis introduced in FIG. 20. Assume that the users considering the condominium investment think that the rent and interest rate factors could well vary from plan by as much as 30% above or below plan, across the full range of the horizontal factor deviation axis -but they are sure price cannot be below 180 ($000), which is below plan by only 10%; and that financed percent cannot be above 90 (%), which is above plan by only 12.5%. The invention includes systems and methods to make the graphic analyses reflect these factor range limits.

Figure 28:
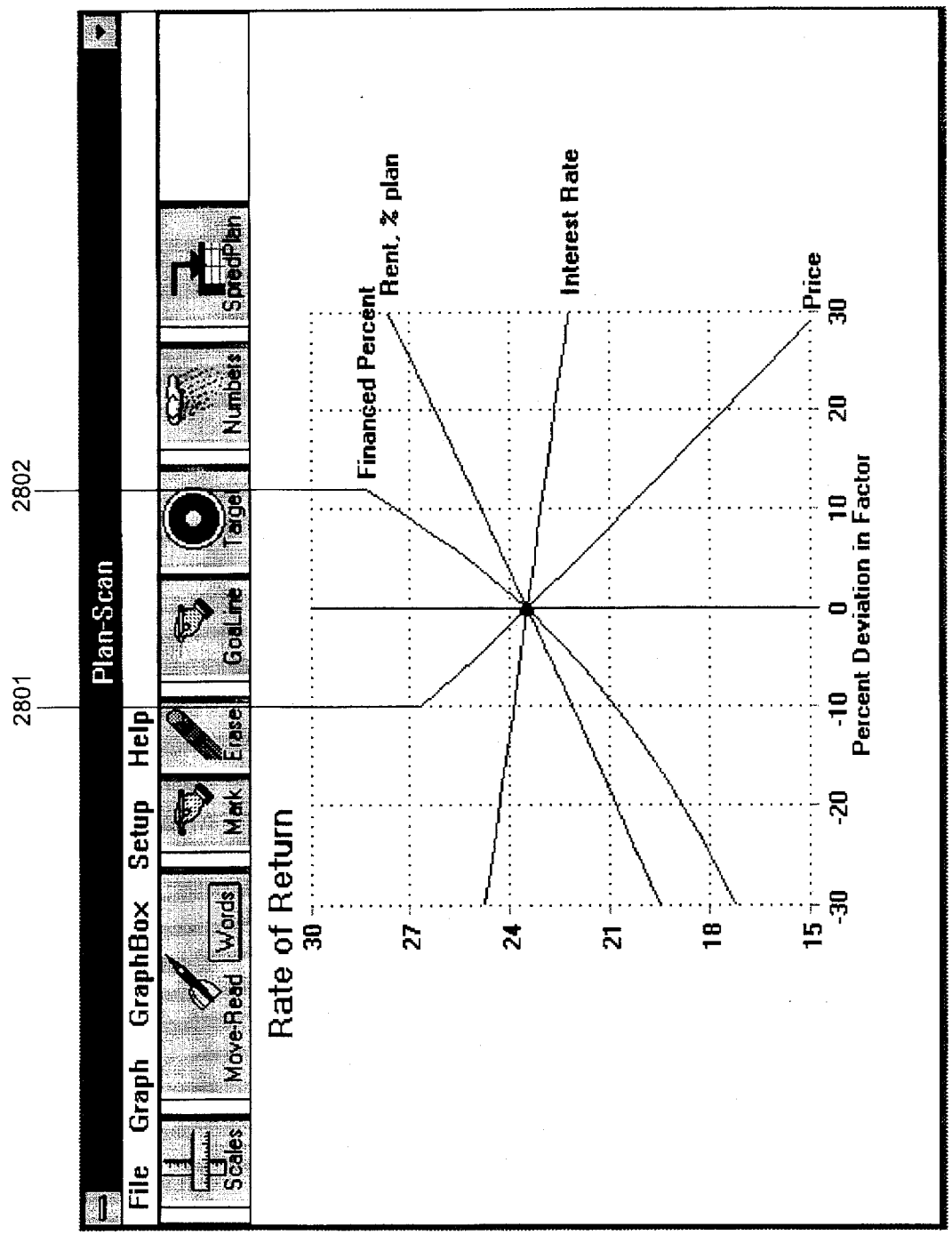
FIG. 28 illustrates a computer display screen having a prioritizer type graphic analysis illustrating range limits for certain individual factor graph lines.

FIG. 28 shows an example of a prioritizer graph analysis developed and delivered by the embodiment of the invention with such information on factor range limits. This graphic analysis is identical to the first prioritizer graphic analysis of the condominium example, introduced earlier in FIG. 20, except that ranges of individual graph lines are revised to reflect the user judgments of variation limits of individual factors as described just above. Specifically, the graph line for price extends below plan only to −10 percent 2801, and the financed percent graph line extends above plan only to +12.5 percent 2802. A comparison of this graphic analysis with that in FIG. 20 shows the advantages of analysis with such factor-by-factor ranges: it not only contains and delivers additional information on the factor-range limits, but also shows to any observer that while the price and financed percent graph lines are the steepest, the limits on their favorable deviations from plan mean that variation of either one cannot raise the rate of return goal above the high-twenties.

Figure 29:
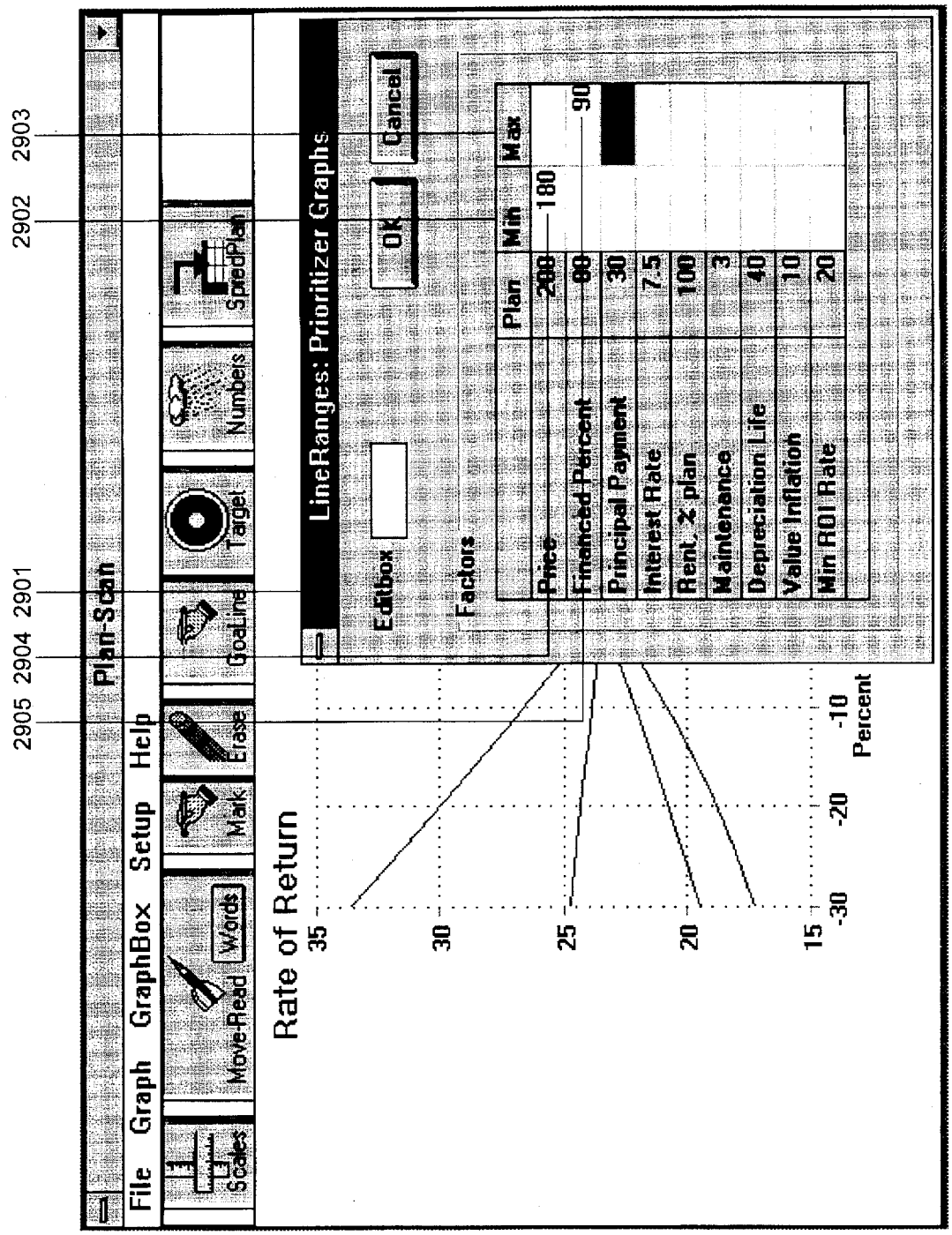
FIG. 29 illustrates a computer display screen having a window for user entry of factor ranges for prioritizer graphic analyses.

In the embodiment of the invention being described, an example of a graphic modeling software user interface window for indicating such factor range limits is shown in FIG. 29. In the LineRange prioritizer graphs window 2901 in this illustration, a list of all factors in the plan-model is displayed, with two boxes beside each factor labeled Min 2902 and Max 2903 in which the user can enter numbers for lower and upper limits. This window shows user entries for the limits described above: for price, Min 2904 is 180; and for financed percent, Max 2905 is 90. With these entries made, new development and delivery of the prioritizer graphic analysis will show the graph lines for these factors ending at these limits as shown in FIG. 28.

Figure 30:
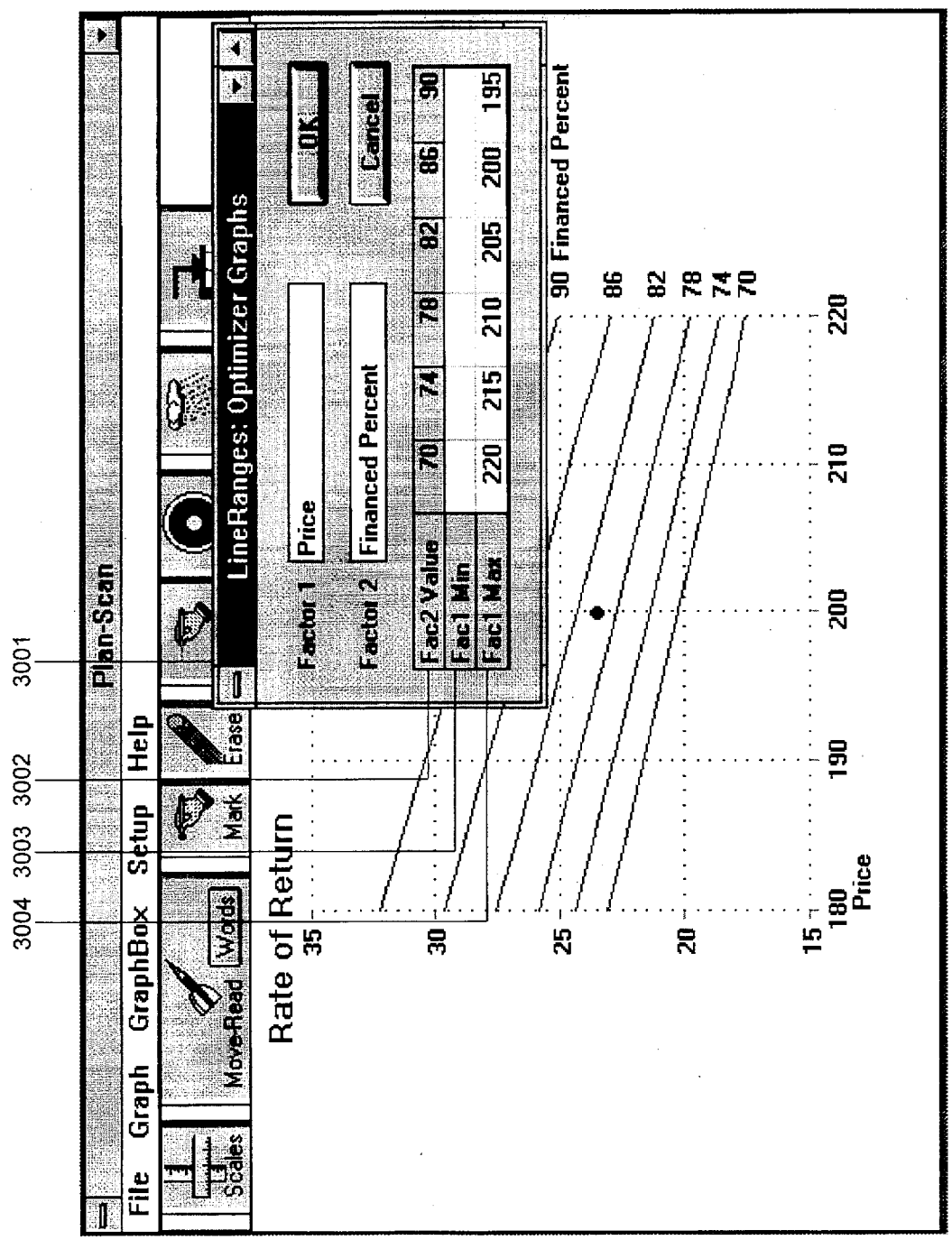
FIG. 30 illustrates a computer display screen having a window for user entry of particular graph line ranges for optimizer graphic analyses.

With respect to optimizer graphic analyses, a graphic modeling software user interface for specifying graph line range limits is shown in FIG. 30, for the optimizer analysis shown earlier in FIG. 27 (which is like the optimizer analysis first introduced in FIG. 21 except that the graph line-set increment is 4 instead of 2). In the LineRanges optimizer graphs window 3001 in FIG. 30, there is a column for each graph line, identified in the top row 3002 by the Fac2 Value that graph line reflects, with two boxes beneath for user entry of Fac1 Min 3003 and Fac1 Max 3004 values limiting horizontal range for that graph line. In the example shown in FIG. 30, there are user entries only for the Max ends of the graph lines. The invention's graphic analyses can reflect these limits by ending the graph lines at their respective Max limits, in the same manner as shown in the prioritizer analysis in FIG. 28. Or, in an optimizer analysis, in which the limits represent the upper (or lower) limits of factor1 at a sequence of values of factor2, a set of upper or lower limits can be delivered in the graphic analysis as a limit line, as shown in the optimizer analysis in FIG. 31 by the curved line reflecting the Max limits entered in FIG. 30.

Figure 31:
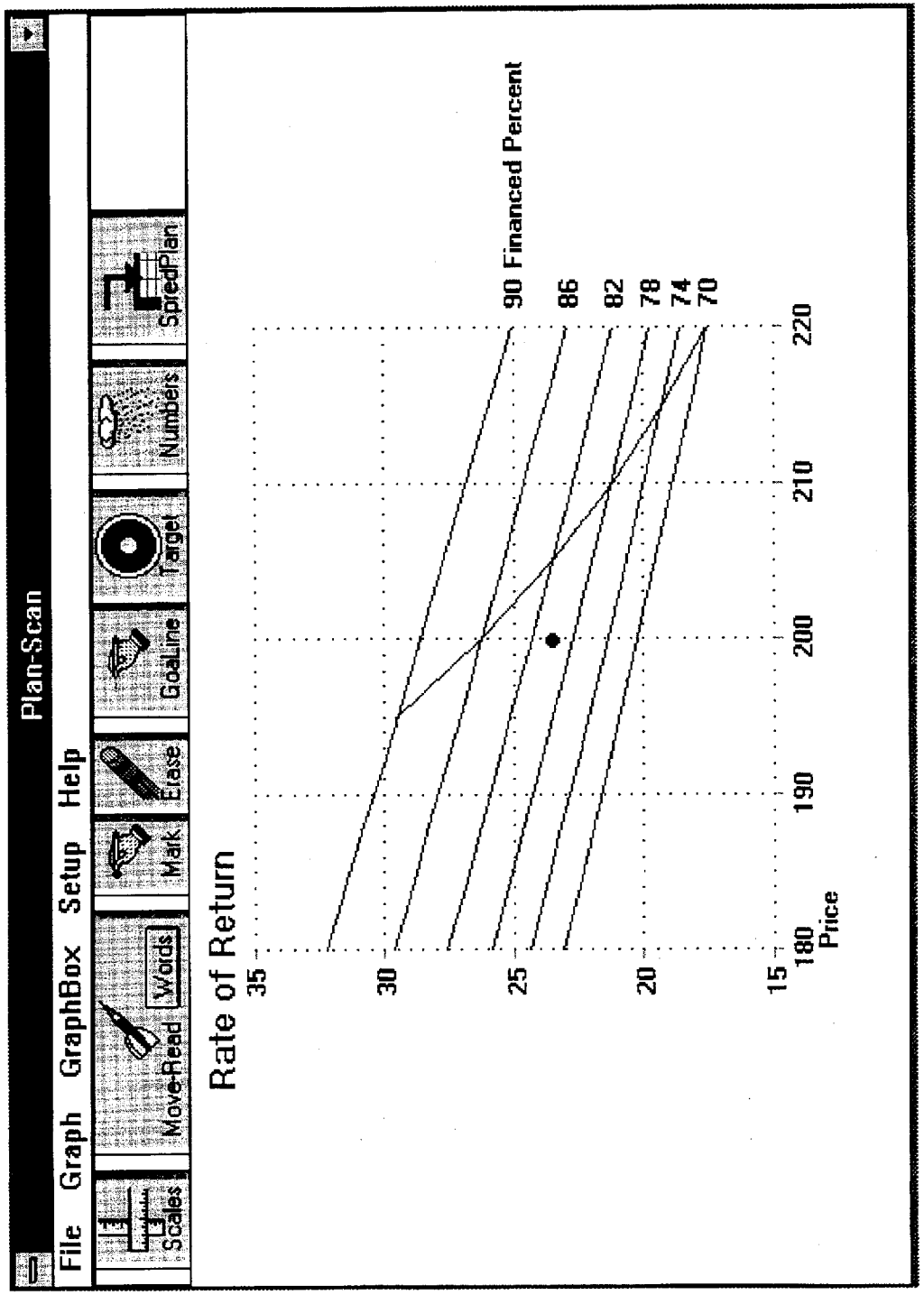
FIG. 31 illustrates a computer display screen having an optimizer graphic analysis with factor1 range limits affected by factor2 values.
Figure 32:
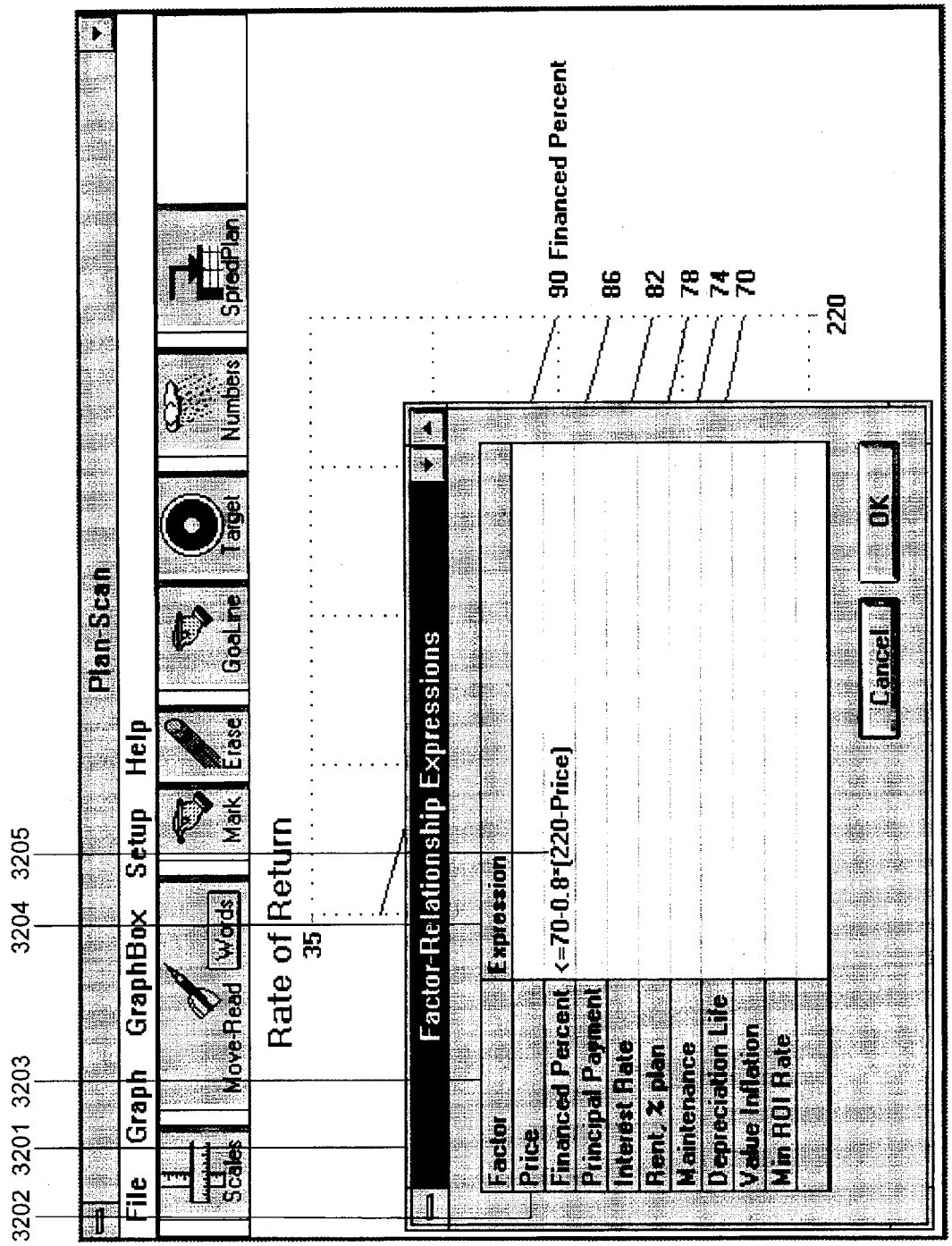
FIG. 32 illustrates a computer display screen having a window for entering expressions relating one factor to other factors.

In an optimizer graphic analysis, a set of upper or lower limits for a set of graph lines represents a limit of factor1 as affected by the value of factor2, as the limit line in FIG. 31 suggests. Such a set of limits are commonly points along a line that is straight or a curve or other pattern that can be expressed or approximated by an algebraic-logical expression. The invention includes, in addition to the point-by-point method of specifying such a set of limits shown in FIG. 30, systems and methods for user entry and the invention system's graphic-analysis use of factor limits specified as algebraic-logical expressions. An example of a user interface window for such factor-limit expressions is shown in FIG. 32. A window 3201 contains a table with a row 3202 for each factor containing a box 3203 with the factor's name, and a second box 3204 under the column-heading Expression in which the user can enter algebraic-logical expressions defining that row's factor in terms of values of one or more other factors.

The price row of FIG. 32 contains a user-entered expression 3205 consistent with the set of individual limit points entered in FIG. 30. From this expression, the invention will produce the limit line shown in FIG. 31.

By enabling and using in the graphic analyses entries of limits defined through factor-factor relationship expressions, as exemplified by FIG. 32, a much more powerful system is provided for incorporating limits in the graphic analyses. A single expression can define values for a factor for a full continuous range of values of another factor. For example, the expression in FIG. 32 defines a value for price at every financed-percent point along the curved line in FIG. 31, not just at points where graph lines intersect this curved line.

Furthermore, such an expression can define the upper or lower limit of a factor in terms of values of two or more other factors, or all the other factors in the plan-model. Thus, by entering one expression for each factor, a user can specify upper or lower limits for every factor, in every optimizer graphic analysis of the plan-model. Alternatively, the user is able to enter several simpler limit expressions for a factor, for example, on different rows in a table like that in FIG. 32, each defining a factor's limit relative to one other factor.

In addition, through the invention's capability to accept specification of factor-to-factor relationships expressions as illustrated in FIG. 32 and use them in its graphic analyses as illustrated in FIG. 31, the invention can perform graphic optimizing.

More broadly, the invention is not limited to the two types of graphic analyses described and illustrated herein as prioritizer and optimizer graphic analyses. Other graphic analyses can be developed and delivered with other axis or scaling systems and other graph lines depicting other relationships. The limits line shown in FIG. 31, as a depiction of the factor relationship expression entered in FIG. 32, provides an illustration of one aspect of the graphic-analysis universality of the invention. In the prioritizer and optimizer analyses introduced in FIGS. 20 and 21, every graph line depicts a relationship, implicit in the plan-model, of a goal to one or more factors. By contrast, the limits line in FIG. 31 depicts a relationship, related to but not implicit in the plan-model, between two factors.

Figure 33:
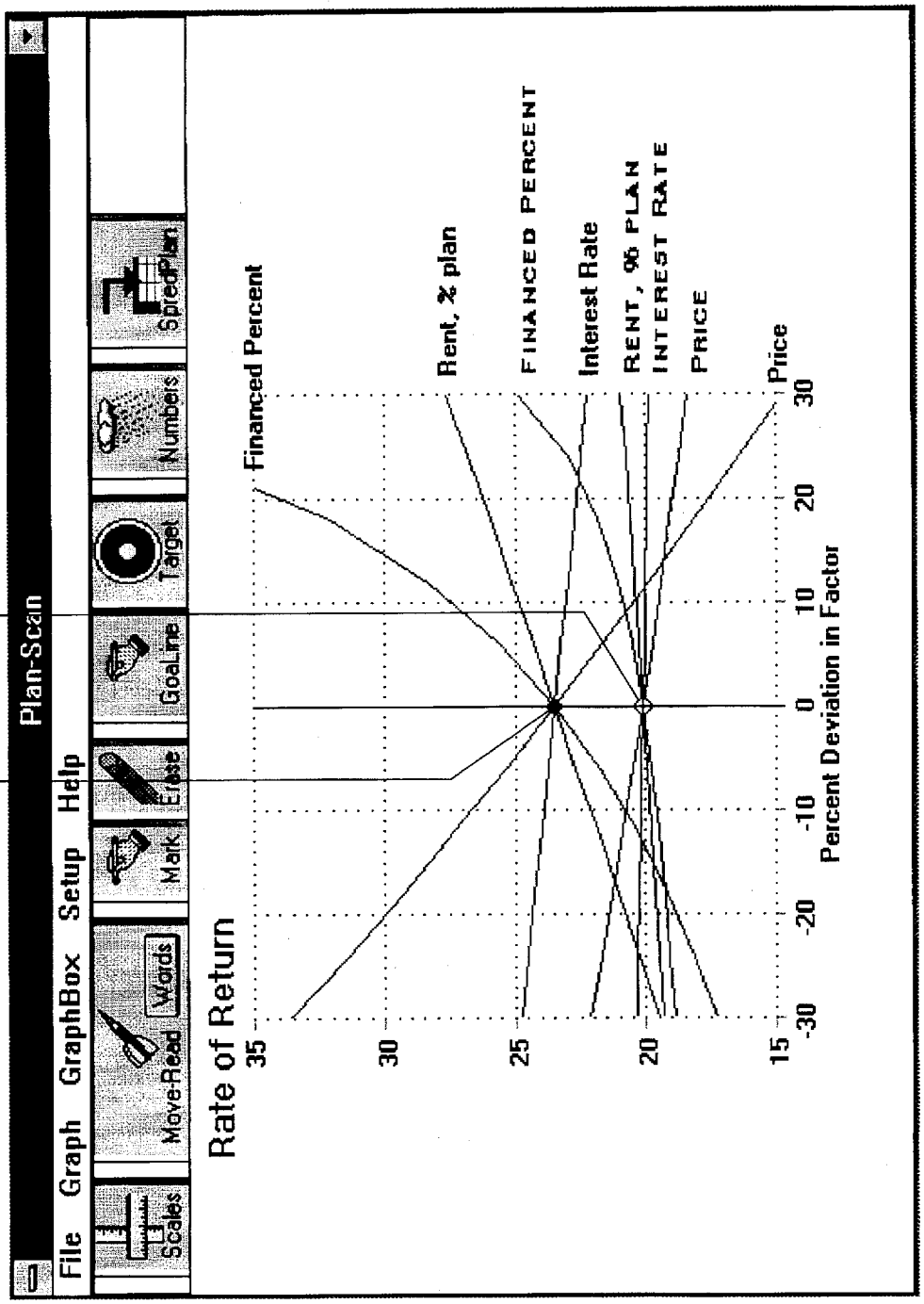
FIG. 33 illustrates a computer display screen having graphic analyses of multiple plan-models in a single graph.
Figure 34:
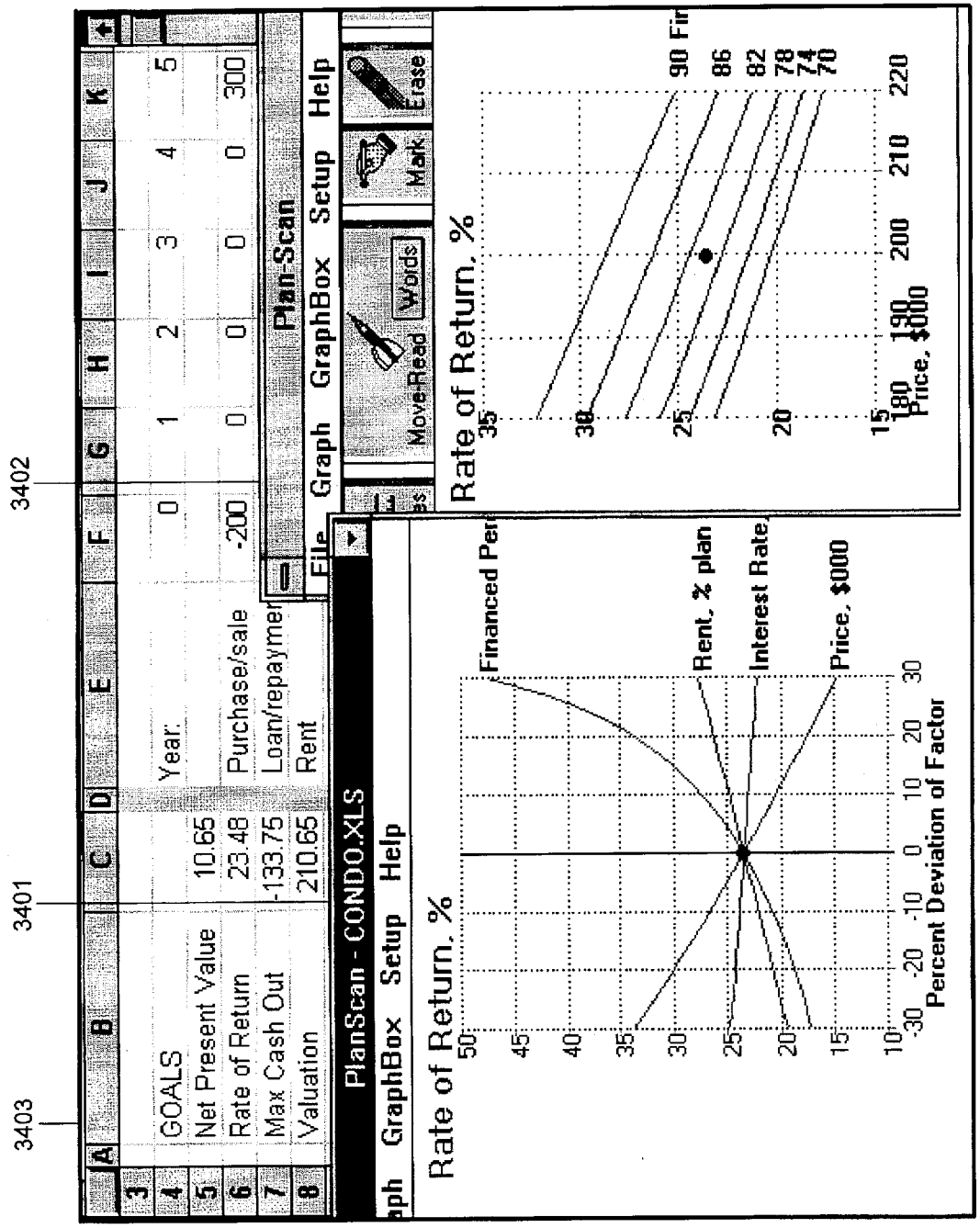
FIG. 34 illustrates a computer display screen having multiple windows for simultaneously displaying multiple graphic analyses.

Furthermore, the multiple graphic analyses can be simultaneously developed and displayed. Each prioritizer or optimizer analysis is itself graphic analyses and comparisons of several relationships, each across a range above and below plan data, in a single framework of axes. Beyond this, the invention can simultaneously develop and deliver multiple sets of analyses, such as two or more prioritizer and/or optimizer analyses, superimposed or in separate areas of the computer display. FIGS. 33 and 34 provide two examples.

In FIG. 33, the graphic modeling software has developed and delivered prioritizer analyses of two plan-models superimposed in the same graph area, delivered according to common axis scales. The set of graph lines extending right and left from a first plan-dot 3301 is the analysis of the condominium plan-model as discussed and illustrated on prior pages. The set of graph lines extending right and left from a second plan-dot 3302 is an analysis of another investment plan-model. In addition to showing for both plans all the information a prioritizer analysis can produce for a plan, this kind of superimposed pair of analyses provides an extensive comparison of the two investment plans. For example, it shows that while the second investment promises a slightly lower rate of return if plan data is met, its flatter graph lines reveal that across the ranges shown, factor deviations from plan data will cause smaller deviations from planned rate of return.

FIG. 34 is an illustration of the graphic modeling software simultaneously delivering in separate windows two different graphic analyses of the same plan, the prioritizer graph 3401 and optimizer graph 3402 analyses of the condominium plan, along with the spreadsheet plan-model 3403 from which both analyses are developed.

Compared to conventional formats of quantitative information on business-financial plan, such as ubiquitous spreadsheet tables, each of the invention's graphic analyses represents development and delivery of a vast amount of planning and decision-making information and value in concise visual format. To achieve this result, the information is developed and delivered in a format that, while clear and easy to read quickly once fully understood, is nontraditional. In addition to the systems and methods of the graphic analysis process described previously, systems and methods are provided for interactive exploration of each graphic analysis, which is intended to enable users to learn, see, and use the information and planning value of the graphic analyses more quickly, easily and fully.

After developing and delivering a graphic analysis, the invention enables the user to move to various points or what-if possibility positions on the graphic analysis, and at each graph point possibility moved-to, develops and delivers information on that graph point possibility.

Figure 35:
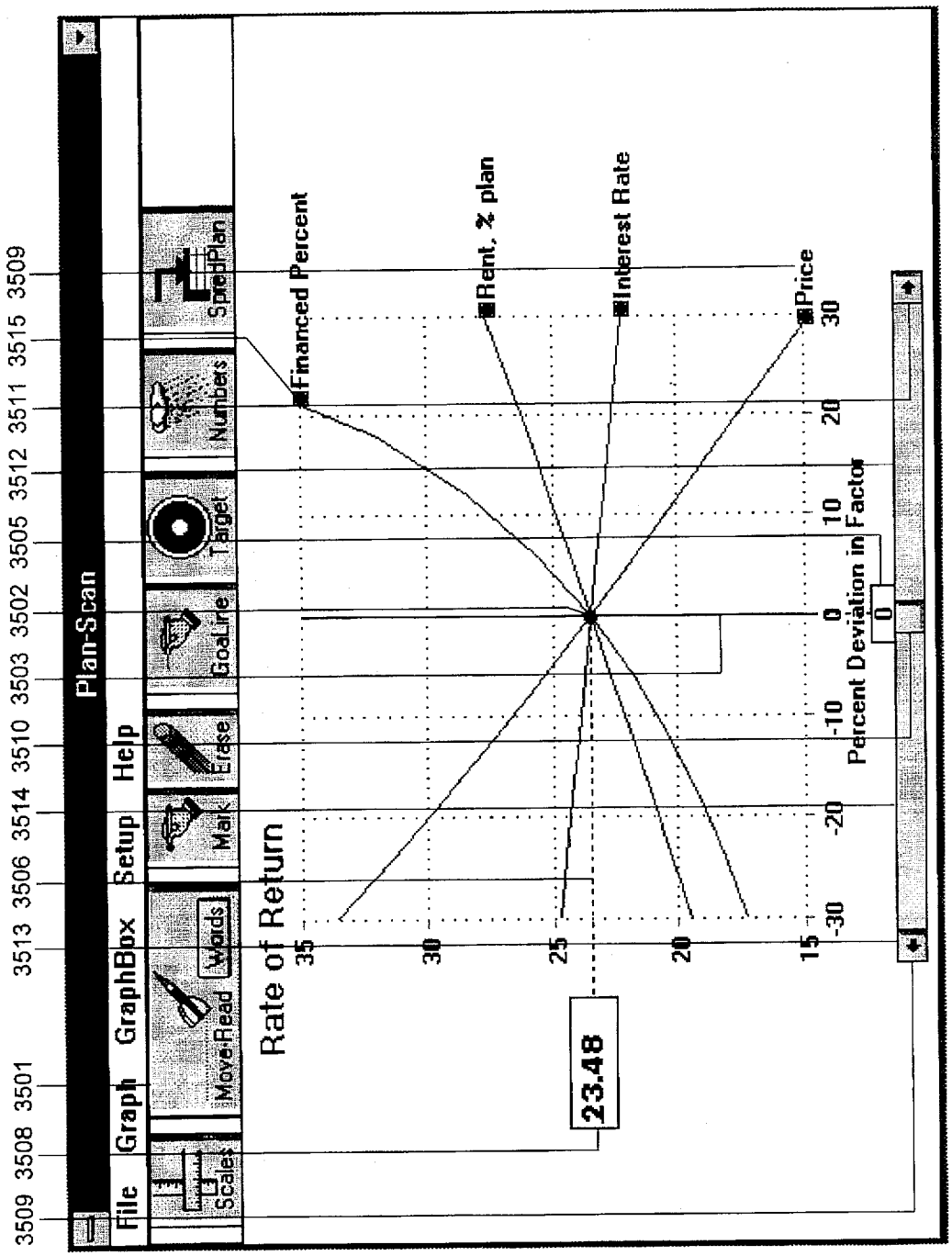
FIG. 35 illustrates a computer display screen having a prioritizer type graphic analysis with tools for interactive analysis exploration.

An embodiment of the invention's fundamental graphic analysis exploration system is illustrated in FIG. 35. In this embodiment, in the row of icon-buttons that is displayed above every graphic analysis there is an icon-button labeled Move-Read 3501. When the user selects this icon-button, in the graphic analysis a display appears for user moves to graph points and a display of information on each point moved-to, as illustrated in FIG. 35.

The dot that was at the central planpoint is still at that position 3502, but it is now a user movable graph point, as will be shown in subsequent illustrations.

From this movable marker, a display of dotted lines and numbers provides information defining the marker's current graph position, both graphically and text-numerically. From the movable graph point, a vertical line 3503 extends down to the horizontal factor-deviation axis, providing a graphic indication of the movable graph point's position relative to the factor deviation axis, currently 0. At the bottom end of this dotted line just below this horizontal axis, a box ("axismeter") 3505 containing a number displays in text the number of this factor deviation axis position. Similarly, from the movable graph point a horizontal dotted line 3506 extends left to the goal axis, providing a graphic indication of the movable graph point's position relative to goal data, currently about 23 to 24, and at the left end of this dotted line just to the left of the vertical axis another axismeter 3508 displays in text the number of the current goal-value position of the movable graph point, i.e., 23.48. This system of dotted lines and axismeters describes what the current position of the movable graph point represents: factor at plan data and resulting goal data of 23.48.

The invention's methods for user moves on a graphic analysis and display of information on each graph point moved to are not limited to the particular symbols and formats illustrated.

When the user selects the Move-Read icon-button, the user can move the movable graph point to various horizontal-axis percent deviation positions, along any of the graph lines. Under the horizontal factor deviation axis appears a horizontal scroll bar 3509, through which the user can move the movable graph point right or left along a graph line. This scroll bar has a movable button 3510 below the current position of the movable graph point. The user can move the movable graph point to the right by selecting this scroll bar at the right of this movable button. Selecting the right-arrowbox 3511 at the right end of the scroll bar will move the movable graph point to the right along a graph line a small distance. Selecting the scroll bar track to the right of its movable button 3512 will move the movable graph point to the right along a graph line a greater distance. Similarly, selecting the left-arrow box 3513 at the left end of the scroll bar will move the movable graph point a small distance to the left along a graph line. Selecting the scroll bar track at the left of its movable button 3514 will move the movable graph point to the left a greater distance along a graph line.

When the user selects the Move-Read icon-button, the user is also able to select which graph line to move to. At the right end of each graph line, a small box 3515 appears. When the user selects the box 3515 for any graph line, the movable graph point moves to that graph line. Then, as the user makes selections on the horizontal scroll bar, the graph point will move along that graph line. When the user selects the Move-Read icon-button, the initial current graph line is that of the selected and graphed factor listed first in the user's list of factors, which in the current example is price. The graph line that the user is currently on is indicated by its label 3516 being more prominent than the labels of the other graph lines.

Figure 36:
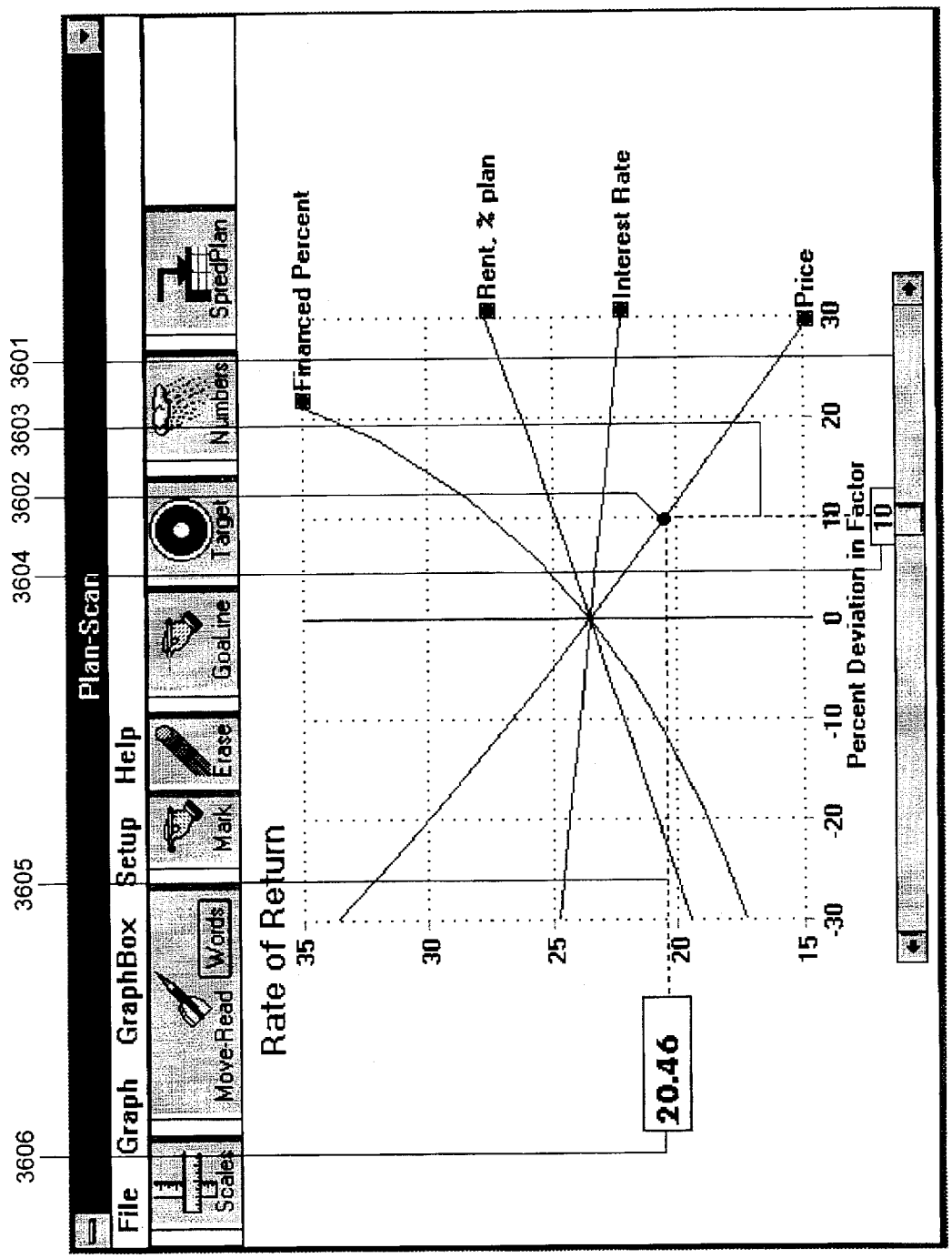
FIG. 36 illustrates a computer display screen in which movement along a prioritizer graph line is indicated and information on the current graph point position is displayed.

A horizontal move along the currently selected graph line price is shown in FIG. 36. The user has selected the horizontal scroll bar to the right of its movable button in the track 3601, which constitutes a request to move to the right a greater distance (compared to selecting the right-arrow button). In response, the movable graph point moves to a new position further right 3602 along the price graph line. The dotted lines and axismeters which indicate graphically and text-numerically what the movable graph point currently represents, move and change to describe the new positions. The vertical dotted line 3603 and its axismeter 3604 show that the movable graph point now represents a point along the price graph line at 10 percent deviation. The horizontal dotted line 3605 and its axismeter 3606 show that the graph point's height on the graph, representing resulting goal value, now representing a 20.46 rate of return.

Figure 37:
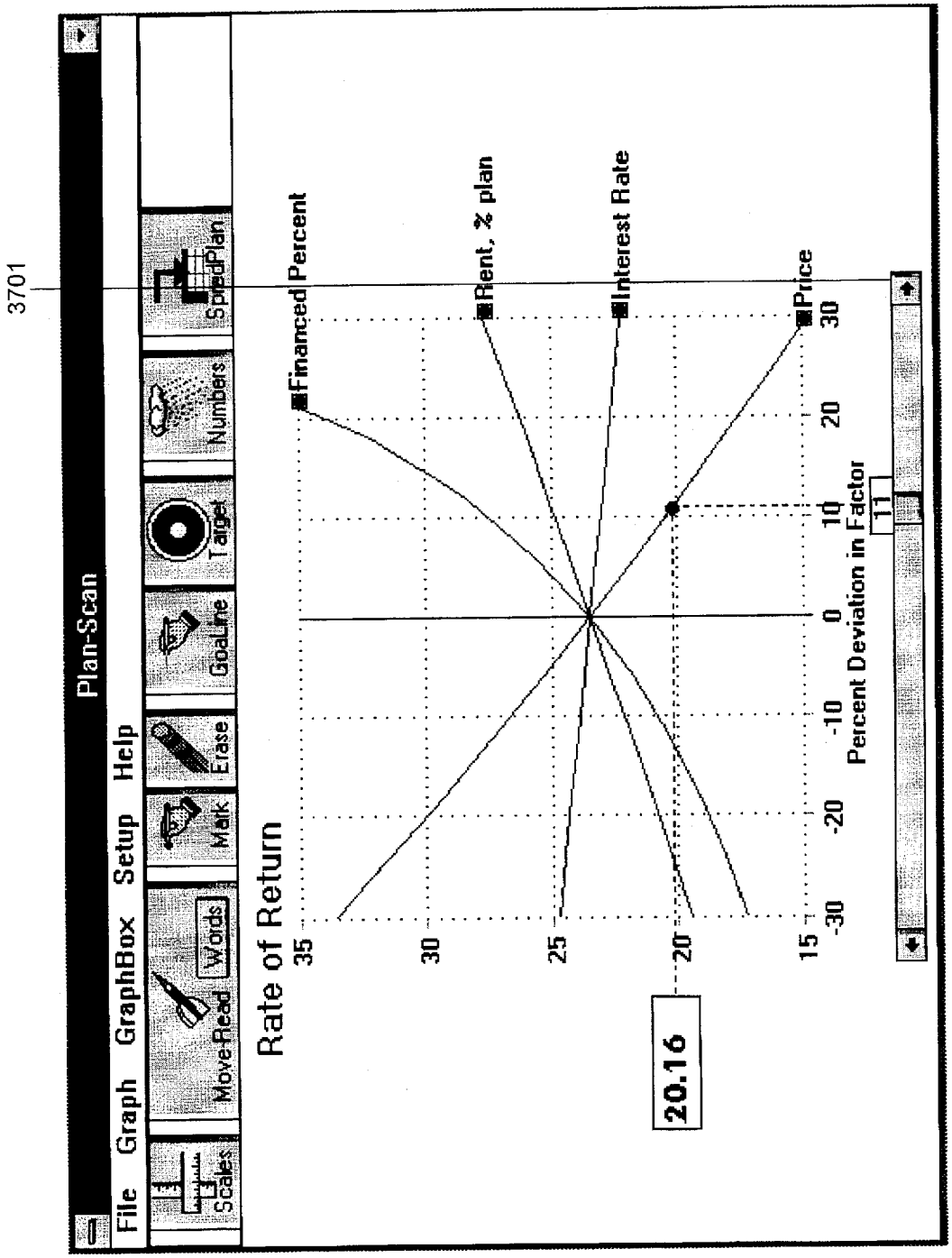
FIG. 37 illustrates a computer display screen similar to that of FIG. 36, but in which a smaller movement along a graph line is indicated.

FIG. 37 shows a further move to the right along the same graph line caused by the user selecting the horizontal scroll bar's right-arrow button 3701. The selection of the scroll bar track in the preceding FIG. 36 caused a move of 10 percent deviation, but the selection of the arrow button shown in FIG. 37 causes a much smaller move of 1, from 10 to 11. With this move, as with any move of the movable graph point, the dotted lines and axismeters move and change to reflect current position. Together with the more-prominent labeling of the current graph line, the movable graphpoint's moved-to current position is identified graphically and text-numerically, i.e., the factor of price is at percent deviation of 11, and the resulting goal is 20.16.

Figure 38:
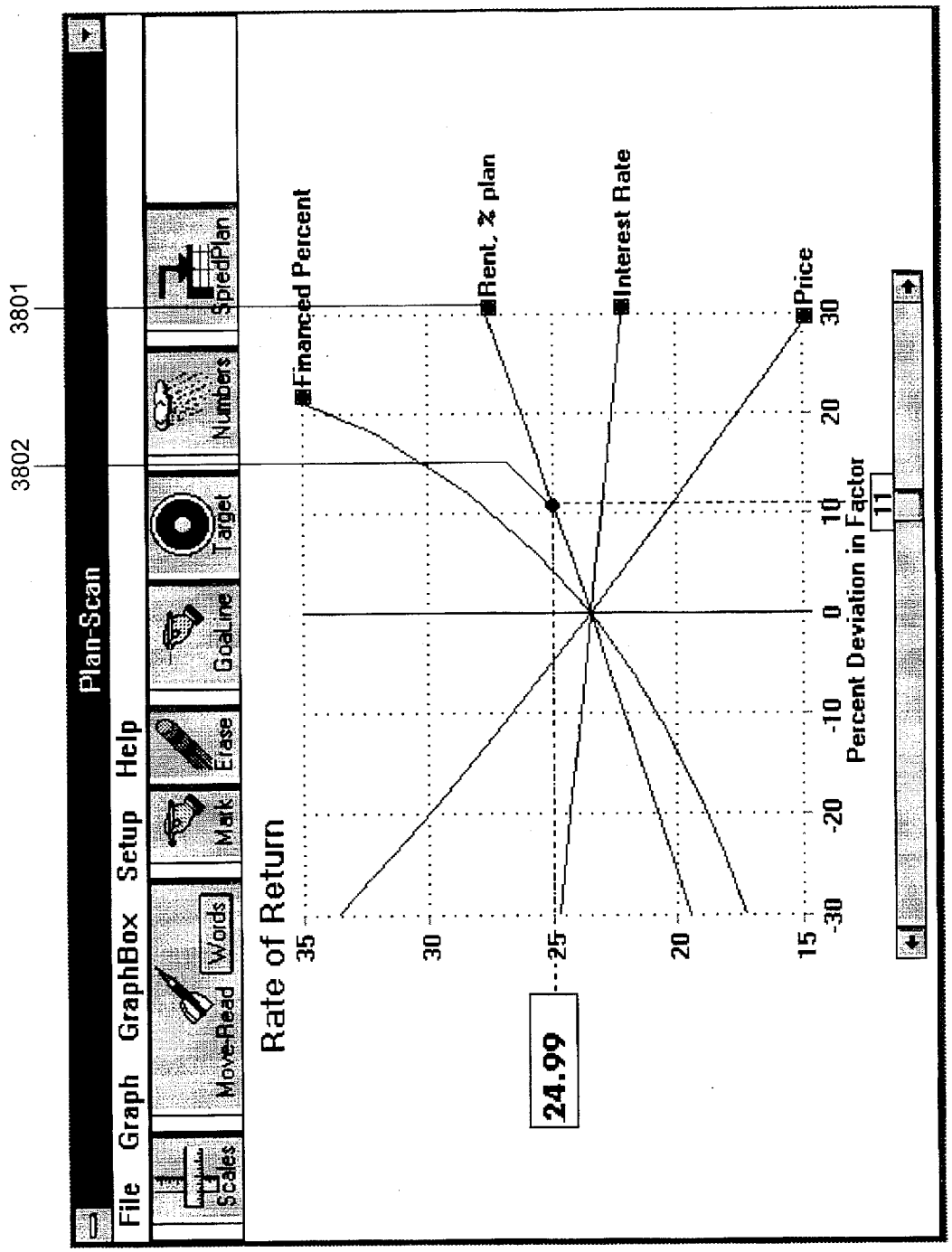
FIG. 38 illustrates a computer display screen having prioritizer graph lines in which movement is made from one graph line to another.

FIG. 38 shows an example of a user move of the movable graph point to another graph line. The user has selected the small box 3801 at the right end of the rent graph line. In response, without changing the movable graph point's horizontal position, the graph point is moved to the user-selected rent graph line 3802. Again, dotted lines and axismeters move and change as appropriate to provide information on what the graph point now represents at the moved-to position. In FIG. 38 it shows that the position moved-to, rent above plan by 11 percent, has a corresponding rate of return goal value of 24.99.

Figure 39:
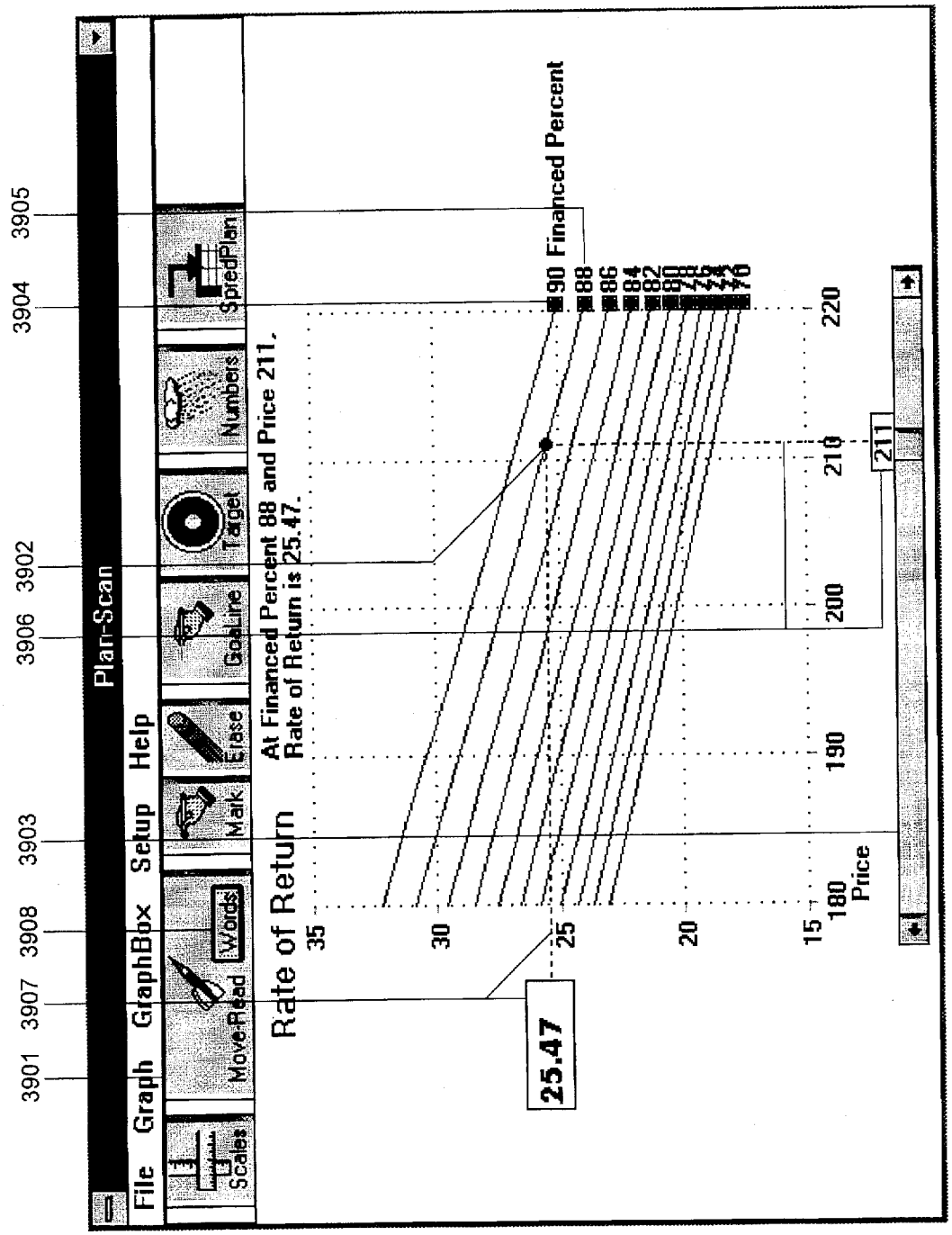
FIG. 39 illustrates a computer display screen having optimizer graphic analysis on which interactive exploration is conducted.

Graphic analysis exploration, as described above, is available for every graphic analysis developed and delivered. While the preceding figures illustrate these exploration systems using a prioritizer graph, FIG. 39 illustrates this capability for an optimizer graph. On this graphic analysis, selection of the Move-Read icon-button 3901 causes appearance of a movable graph point 3902. A horizontal scroll bar 3903, with which the user has moved the graph point along the horizontal factor1 price axis is also shown. A set of small boxes 3904 at right ends of the graph lines is provided through which the user has moved the graph point to a factor2 data different from plan data. A more prominent line-labeling is shown to indicate the factor2 financed percent value or data 3905 of the moved to graph line. A vertical dotted line and horizontal-axismeter 3906 show graphically and text-numerically the moved to price data. A horizontal dotted line and vertical-axismeter 3907 show graphically and text-numerically the resulting goal value of the moved to graph point.

To develop and deliver goal data for each factor data the user moves to on any graphic analysis, goal data is calculated using the plan-model or equation derived therefrom. In the embodiment described herein, the plan-model is entered in a spreadsheet, and the graphic modeling software 112 uses the spreadsheet as a calculator to determine goal data required to develop the graphic analysis. In this embodiment, each time the user moves the graph point, the graphic modeling software 112 uses the spreadsheet for a new calculation for the graphpoint the user moves to in order to determine the corresponding goal data for each factor data the user has moved to.

Therefore, even if the user has elected to use line segments to develop graph lines faster, causing the graph lines to be displayed a little less exactly than the computer could display them by developing each graph line more slowly, the goal data displayed for each graph point moved-to is not made less precise by that user choice for faster graph line development. For every factor data the user moves to, the goal data is determined using a new plan-model calculation for the specific moved-to factor data.

The graphic analysis exploration exemplified by the preceding illustrations has several advantages. For any what-if possibility moved-to, the goal value is determined and displayed with more precision than users can see or the computer can display graphically. For users who may be less than fully skilled at reading such graphic analyses, education is provided in understanding and reading the analyses. A single graphic analysis summarizes hundreds of what-if possibilities associated with the plan data, each in terms of factor data and resulting goal data. User controlled movements and display of information for each moved-to possibility helps users grasp this information and planning benefit.

The exploration part of the invention can also present information regarding each what-if possibility the user moves to in the form of an explanatory statement. FIG. 39 shows such an embodiment. Within the Move-Read icon-button there is a smaller Words button 3908. Whenever the Move-Read button is activated by selecting this Words button 3908, the user can see a sentence above the center of the graphic analysis defining the information provided by the current graph point position 3902. Whenever the user moves the graph point, the sentence changes to state the information represented by the moved-to position. Successive selections of the Words button causes this function to be turned on and off so that a user can activate this feature for a period and then turn it off if preferred.

Figure 40:
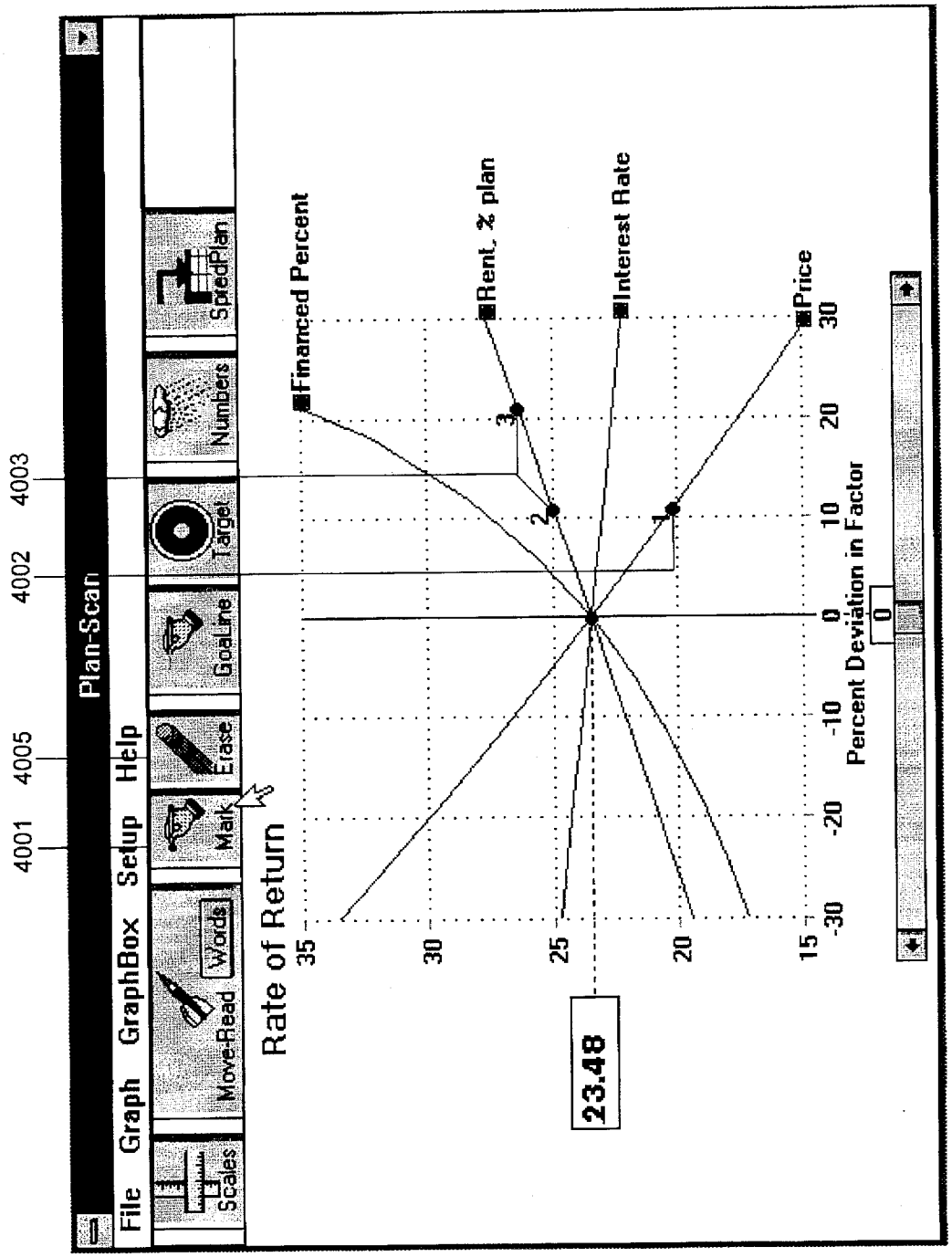
FIG. 40 illustrates a computer display screen having prioritizer graph lines with graph point markers.

Labeled markers can also be provided and left at each of a plurality of moved-to positions. Each marked graph point can include notes of information on that graph point for later use. FIG. 40 illustrates an embodiment for marking and identifying various graph points. Whenever the user has moved to a graph point to be marked, the Mark icon-button 4001 is selected, and a number marker 4002 appears at that point and stays there when the user moves on. The user can move to other points and deposit more numbered markers 4003 and then move on. The user can remove these markers by selecting the Erase icon-button 4005.

Figure 41:
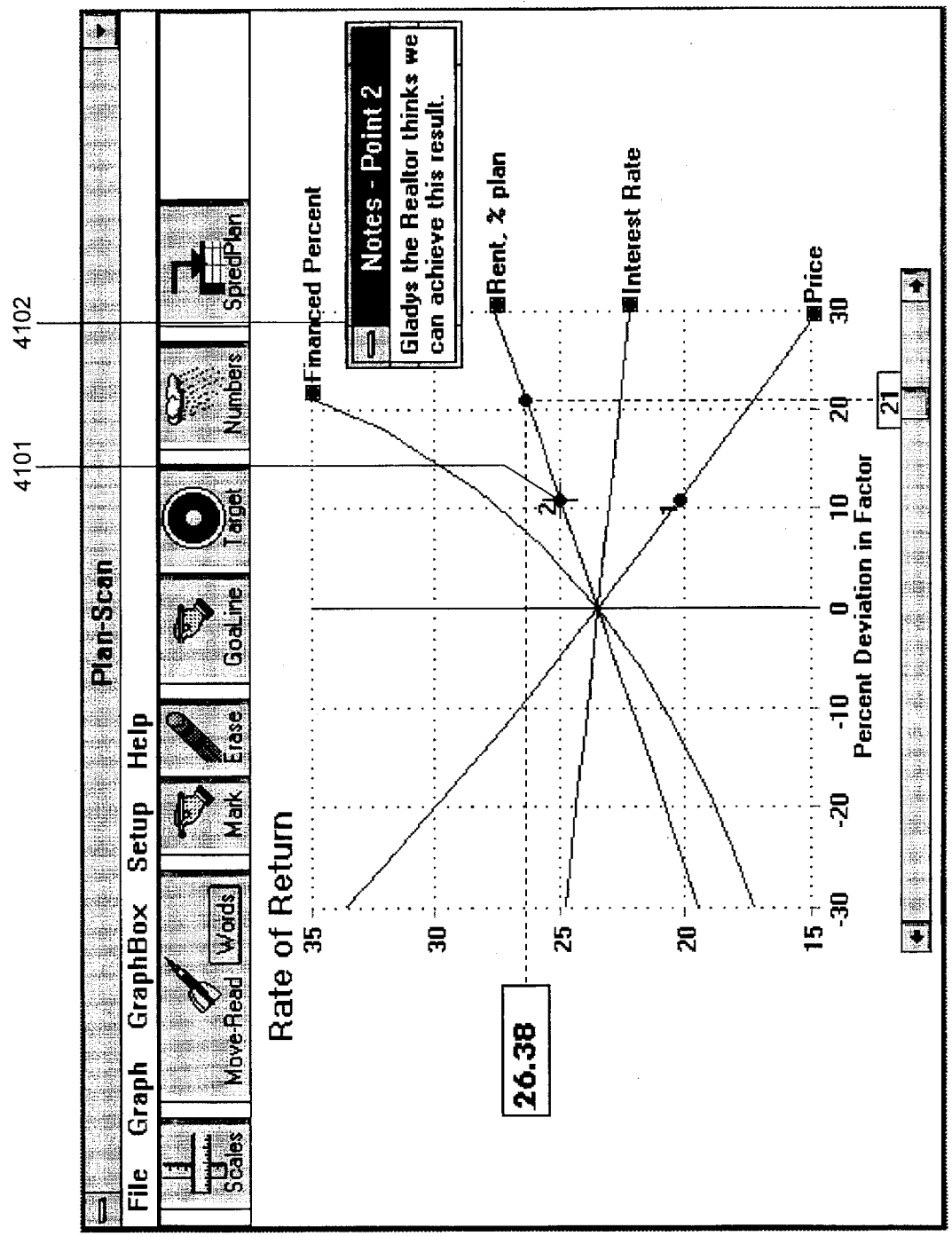
FIG. 41 illustrates a computer display screen having prioritizer graph lines, markers and a note referring to a particular marker.

FIG. 41 illustrates an embodiment of the invention for the user's provision of information on various graph points. In this embodiment, by selecting any of the numbered markers, the user can cause display of a Notes window for that particular marker, in which the user can enter notes relevant to that marked graph point, as shown in FIG. 41. For any one marker, successive selections cause its Notes window to appears and disappear. In the illustration, the user has selected graph point marker (2) 4101, which has caused a Notes window 4102 for that graph point marker to appear, which contains information previously entered by a user. Each of these Notes windows can be resized and moved on the graphic analysis display, using standard Microsoft-Windows methods for such resizing and moving windows, to enable seeing more than one at a time and to enable seeing a key part of the graphic analysis while Notes windows are displayed.

Figure 42:
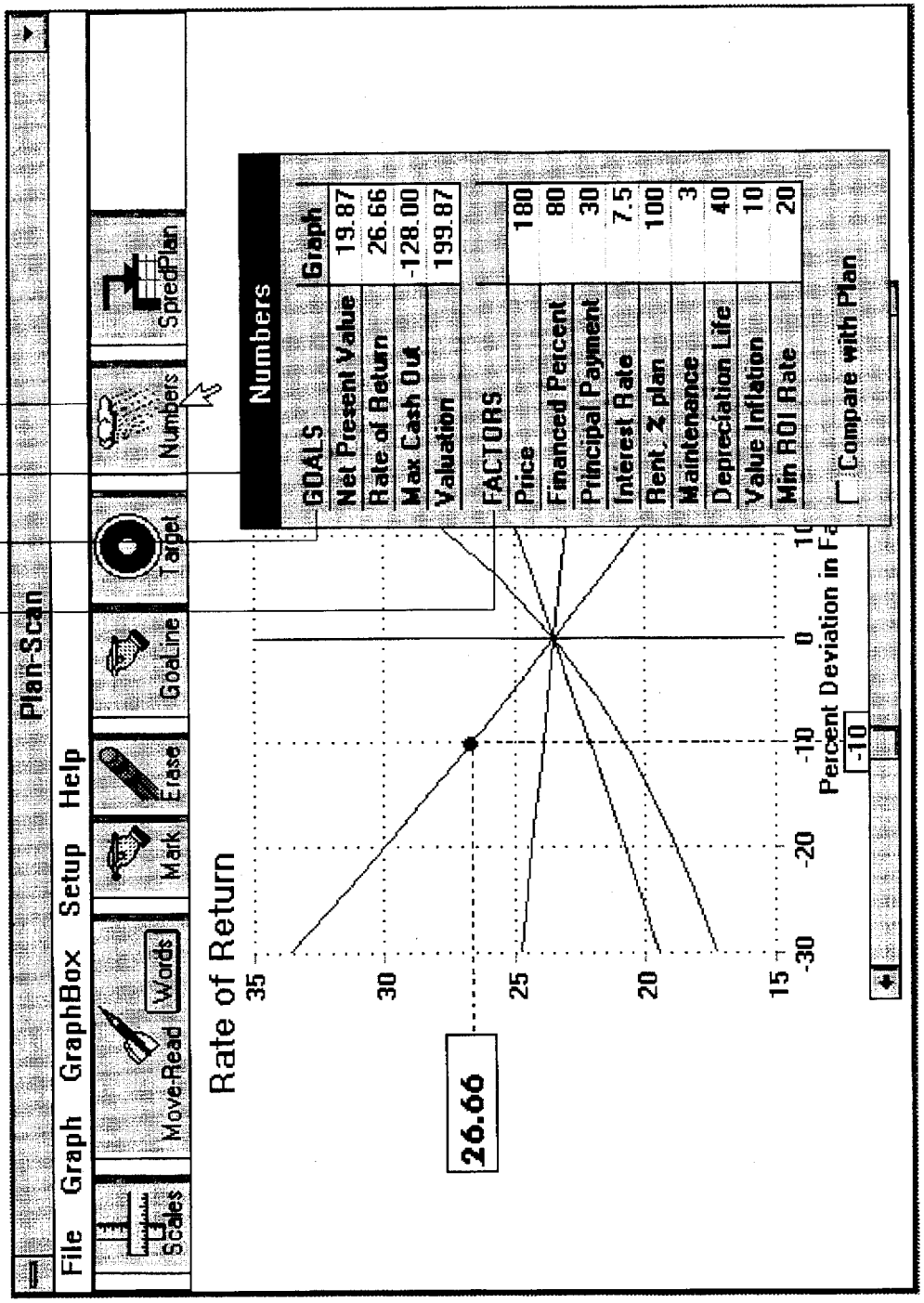
FIG. 42 illustrates a computer display screen having prioritizer graphic analysis with data displayed for all goals and factors relative to current graph point location.

For whatever position or possibility the user moves to on a graphic analysis, the invention also offers more information on what each graph position moved-to represents, including information on values of all factors at the graph point, and information on values of all goal results at that graph point. FIG. 42 provides an illustration of an embodiment for providing such information. With the movable graph point at any position, the user selects the Numbers icon-button 4201, in response to which a Numbers window 4202 is produced. This window provides name and value at the current graph point position for every factor 4203 and for every goal 4204. Note that values in this window for the price factor and rate of return goal match those shown for the current position of the graph point for the graphic analysis, and that values or data for all goals are changed reflecting effects of the change in the value of the price factor.

To generate all goal data as shown in the Numbers window, for each graph point for which such data is to be found and displayed, each goal data is calculated at that point's factor values using the factor data for that graph point. This is accomplished by using the plan-model or equation derived therefrom in the same way goal data is calculated for graph points in development of the graphic analysis. In the embodiment of which FIG. 42 is an illustration, the plan-model is entered in a spreadsheet, and to develop the graphic analysis the graphic modeling software 112 uses the spreadsheet as a calculator. For the Numbers window too, to develop goal data at each graph point, the spreadsheet is used as a calculator.

Figure 43:
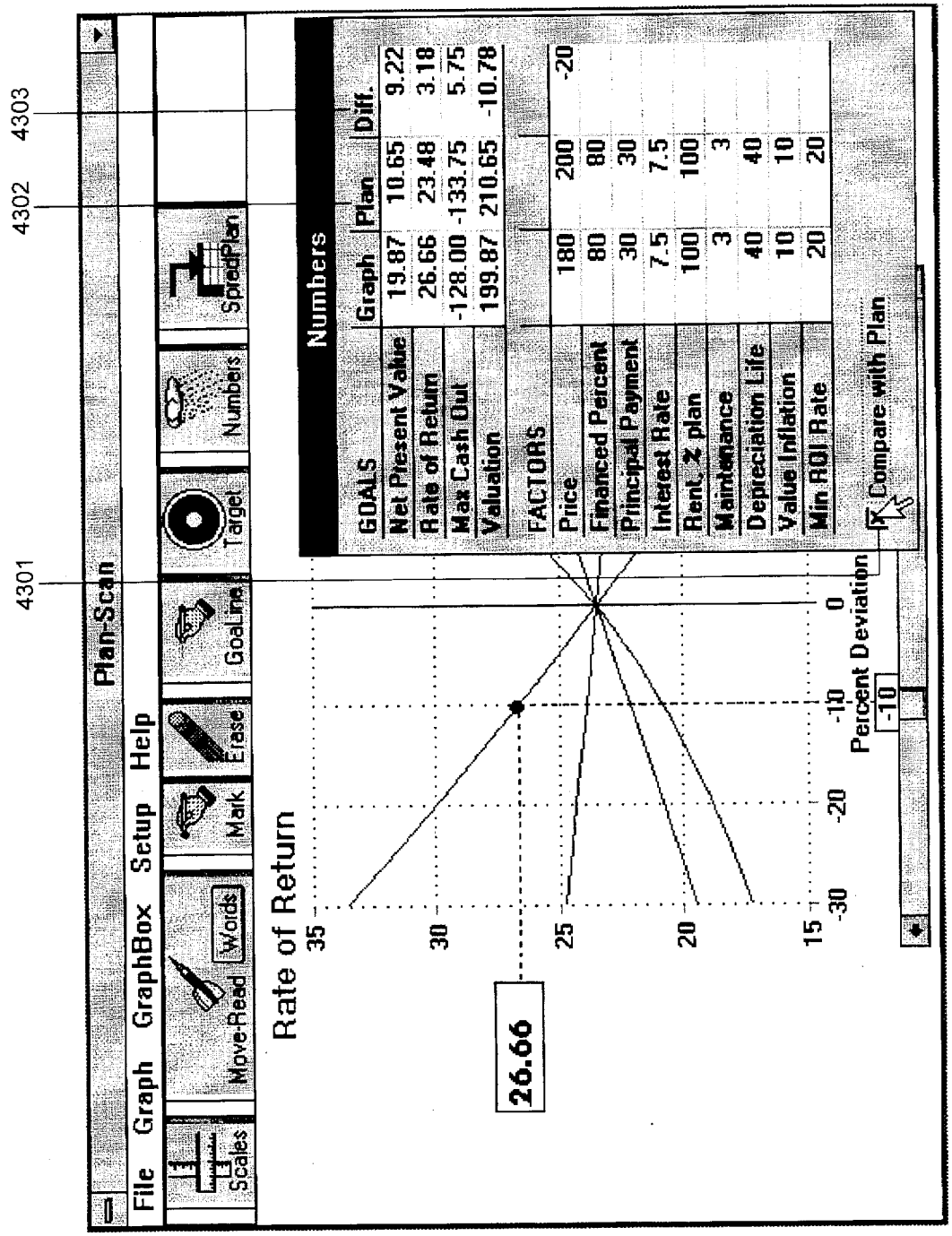
FIG. 43 illustrates a computer display screen similar to FIG. 42 but also displaying values for plan data and differences for goal and factor data based on current and plan data.

The present invention also provides corresponding values for the original plan-model and all differences between the plan-model data and the graph point data. As seen in FIG. 43, the Numbers window contains a checkbox 4301 labeled Compare with Plan, which the user has selected. In response in the Numbers window, two additional columns are produced. Next to the column headed Graph containing values for the current graph point, a Plan column 4302 is provided in which user-entered base-plan factors data and resultant goal data is provided. A column 4303 labeled Diff. is also provided in which a figure showing the amount of every difference between graph point data and plan data for each factor and each goal is produced.

With respect to graph points users move to on any graphic analysis, representing factor data that produce goal data, the invention is not limited to the embodiments and illustrations presented above in either what information it develops and delivers or the format in which it delivers such information. As one example of additional information that the invention can develop and deliver on such graph points, it can provide a further-expanded version of the Numbers window with columns of information showing factor data and goal data for every graph point on which the user has positioned a marker. For each of these columns, a second column can be provided that contains information on each value difference compared to the base-plan data of that factor data or goal data.

Figure 44:
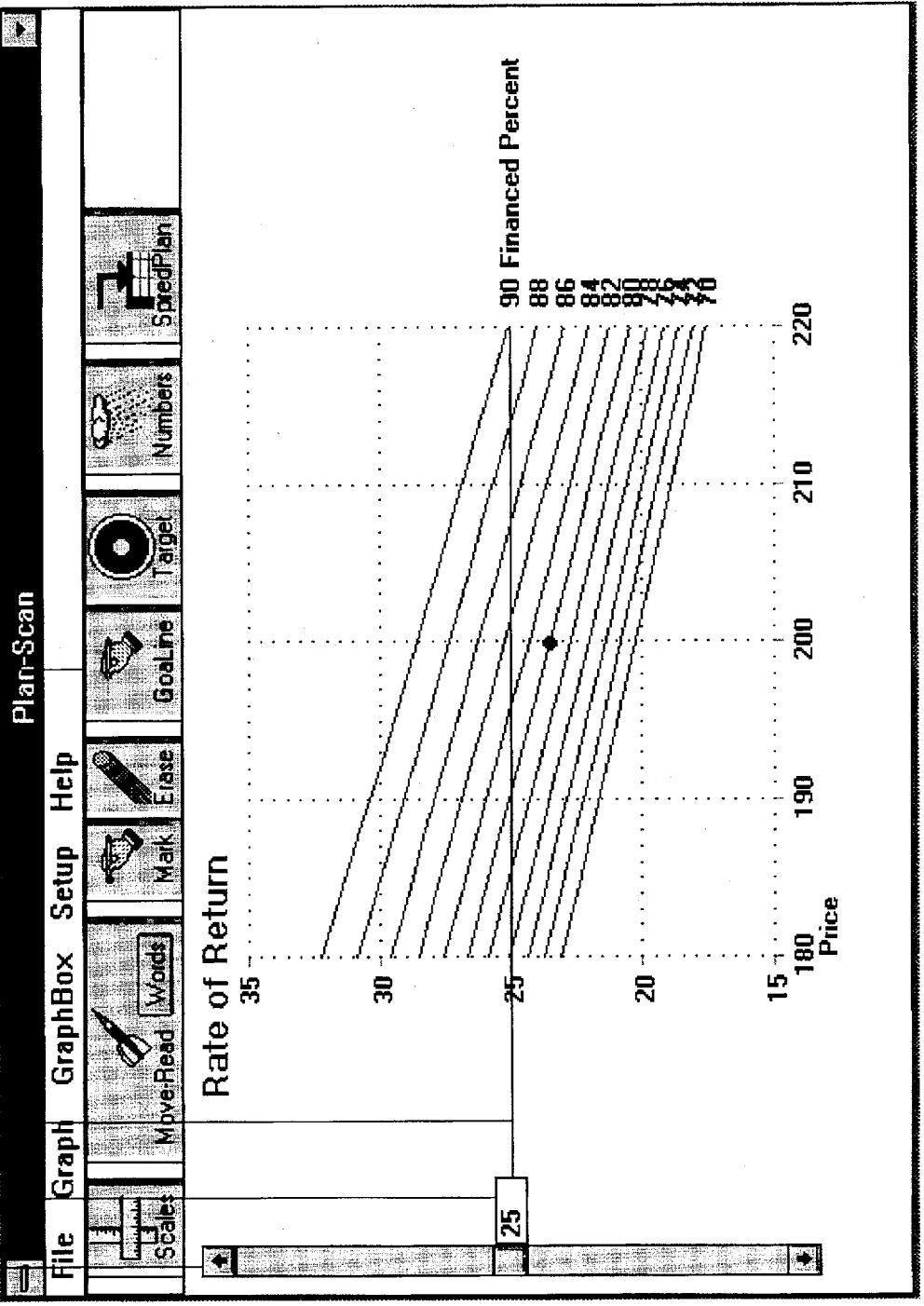
FIG. 44 illustrates a computer display screen having optimizer graphic analysis with a goal-line indicator.

On its graphic analyses, in addition to enabling users to move to various graph points using factor data and developing and delivering information on such graph points, the invention also includes analogous capabilities to enable users to move to various goal data, and to develop and deliver information on each goal data moved to. An embodiment of such capabilities is shown in FIG. 44. In this embodiment, the user has selected the Goal-Line icon-button 4401, in response to which a horizontal "goal-line" 4402 is displayed across the graphic analysis, at a given height representing the goal value at that height on the vertical goal axis scale. At the left end of this goal-line 4402, an axismeter 4403 containing a number indicating the goal value represented by the current height of the goal-line is provided. At far left in the computer display, a vertical scroll bar 4404, which works analogously to the horizontal scroll bar and enables the user to move the goal-line to various heights along the vertical axis scale representing various goal values, is also provided.

For any target value a user has in mind for a goal, he can use this line to quickly see multiple combinations of factor data or values that will produce that goal value and thus represent alternative ways to meet the goal. An example of such use of the goal-line can be seen in FIG. 44. Assume that for the rate of return goal, the user has in mind a target goal of 25%. In FIG. 44, using the vertical scroll bar 4404, the user has moved the goal-line to this target height, as indicated by the goal-line's axismeter 4403. By showing where the various graph lines cross the goal-line, the graphic analysis now provides, graphically, information defining several factor data combinations that each meet the target goal value.

For example, at far left on the graph, one graph line crosses the goal-line at price about 180, and that graph line depicts financed percent 76. One way to meet the goal target, therefore, is shown by the graphic analysis with the goal-line: price about 180 and financed percent 76.

Similarly, the next higher graph line, depicting financed percent 78, crosses the goal-line at price about 186, which represents another combination to meet the target goal. Similarly, the next higher graph line represents financed percent 80 and crosses the goal-line at price about 190, which is another combination of factor data to meet the target goal. By positioning the goal-line at a target height on the graphic analysis and then observing where the graph lines cross it, the user is able to rapidly see nine different ways to meet the target, as a basis for applying his judgment to choose the most feasible and practical route to the target goal.

Figure 45:
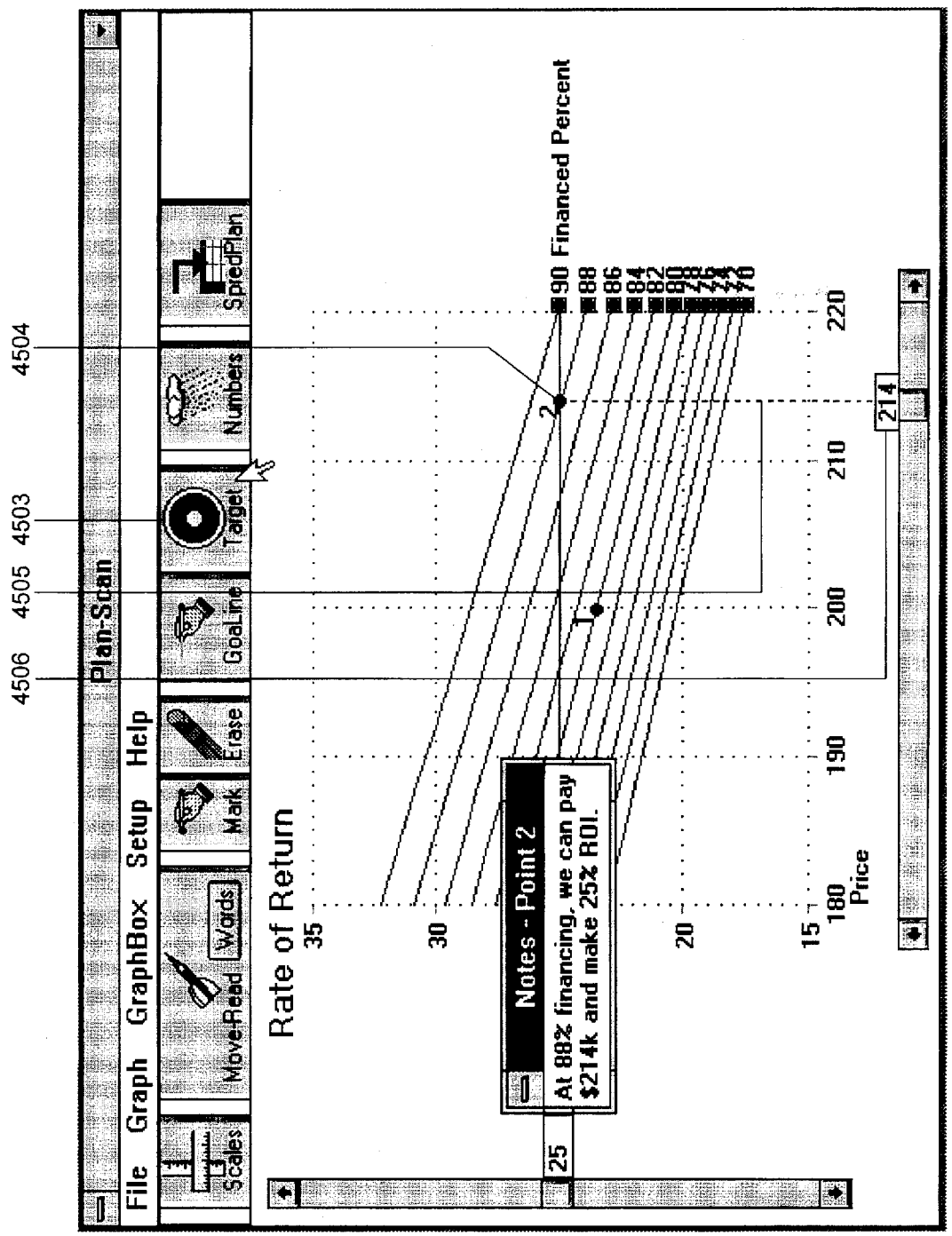

FIG. 45 includes an illustration of a special kind of information that can be developed and delivered in relation to goal values a user moves to. After moving the goal-line to a target rate of return goal of 25, and selecting a graph line defining value for factor2 (in this case financed percent 88) the user selects the Target icon-button 4503. In response, the graphic modeling software 112 moves the movable graph point to the point 4504 where the selected graph line intersects the goal-line at its user-positioned goal value of 25. (In the FIG. 45 illustration, at this graph point position, the user has deposited a marker numbered 2.) Then, the graphic modeling software 112 provides a vertical dotted line 4505 from this graph point straight down to the horizontal factor1 price axis, showing graphically the price value that, at the user-selected financed percent value, will deliver the user-selected goal value. At the bottom of this dotted line, the graphic modeling software produces a horizontal-axismeter 4506 showing text-numerically this price value of 214. For a user-selected goal value, rate of return =25, and a user-selected value for one factor, financed percent=88, the value of the other factor required to meet the goal value is determined and shown, namely price=214.

In the development and delivery of information relative to goal values the user moves to, one aspect of the development of information such as that just described and illustrated in FIG. 45 is of particular note. That is, calculations to determine a factor data that will meet the selected goal data. Consequently, the plan-model is entered to calculate factor data for given goal data.

In the present embodiment of the invention, in which a spreadsheet is the plan-model entry vehicle and is used by the graphic modeling software as a calculator, the graphic modeling software commands the spreadsheet to use a special spreadsheet feature generally called goalseek or backsolve. These spreadsheet features can, given a formula (output) value and given values for all inputs but one, calculate the value of the remaining input required to deliver the given formula value.

Figure 46:
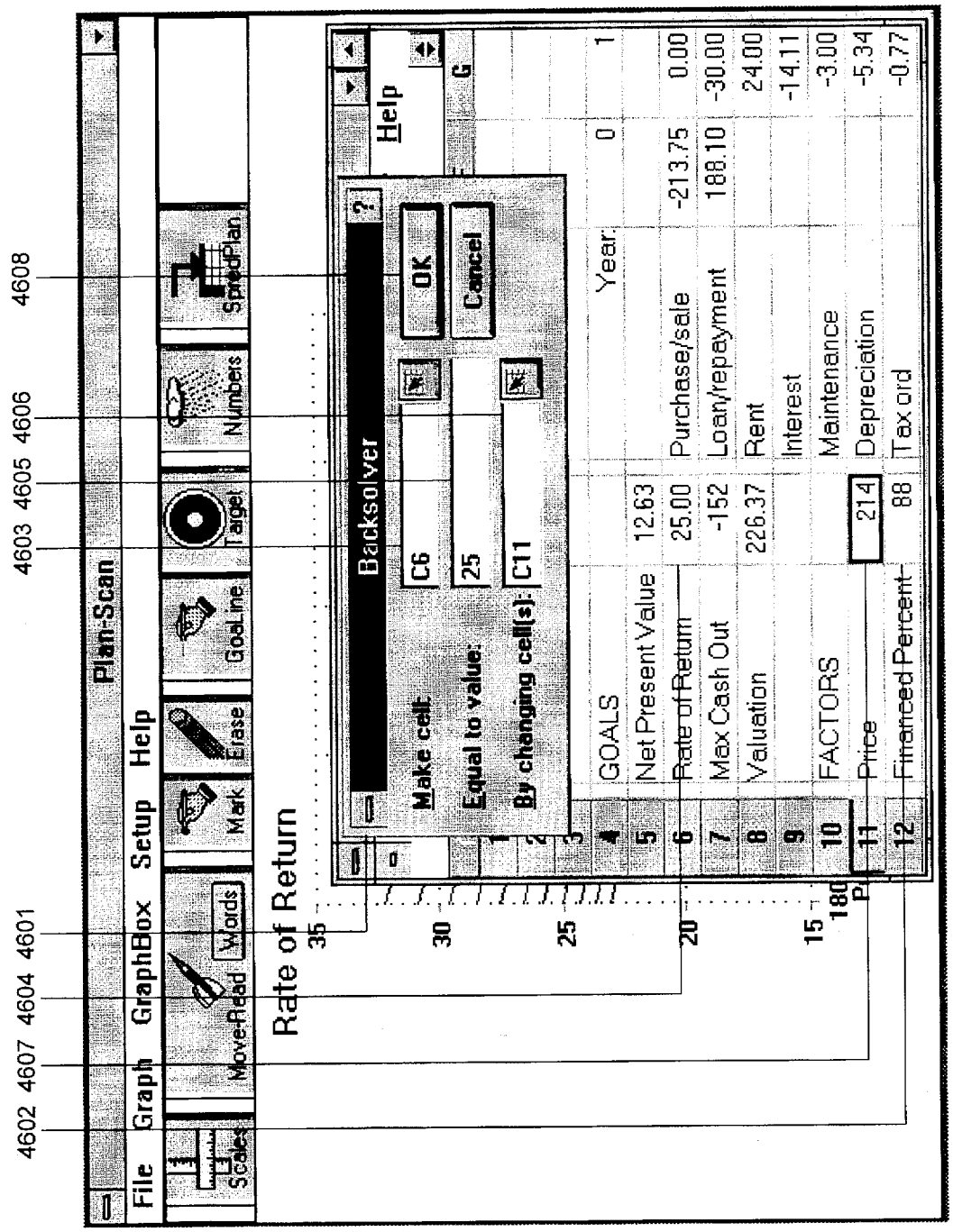

FIG. 46 shows some aspects of how the embodiment of the invention uses this feature of a spreadsheet to carry out such a calculation for one graphic goal point, with this point being illustrated in FIG. 45. As seen in FIG. 46, the Lotus 1-2-3® spreadsheet offers its calculate-backward feature by displaying a window 4601 named Backsolver. To use this feature for the desired backward calculation—in this example, to find the price value or data that together with financed percent=88 will deliver rate of return=25—the graphic modeling software 112 issues to the spreadsheet a series of commands equivalent to a spreadsheet user doing the following: first, in cell 4602 (C12), the financed percent cell, enter 88; next, activate the Backsolver 4601; in Backsolver's top textbox 4603, enter C6, which is the rate of return cell 4604; in Backsolver's second textbox 4605, enter the desired value for that rate of return cell, i.e., 25; in the bottom Backsolver textbox 4606, enter C11 which is the price cell 4607; select OK 4608. In response the Lotus spreadsheet calculates the value for C11 (price), which, when C12 (financed percent) contains 88, will make C6 (rate of return)=25. This calculation results in price=214. After this calculation, C11 is changed to that value of 214, which causes C6 (rate of return) to become the desired value of 25. Then the graphic modeling software 112 reads from the spreadsheet the price value of 214 that the spreadsheet has calculated backward, and uses this value along with the others in developing and delivering the graphic analysis information shown in FIG. 45.

In this process, the graphic modeling software 112 does not cause the Lotus spreadsheet to appear to the user, as in FIG. 46. To develop information delivered in its graphic analyses, the graphic modeling software uses various tools to carry out steps and processes "behind the scenes," invisible to the user, and this use of the spreadsheet is just part of what is done behind the scenes. The spreadsheet is shown in FIG. 46 only to illustrate the spreadsheet feature that the graphic modeling software 112 commands the spreadsheet to use and what the graphic modeling software 112 tells the spreadsheet to do with this feature.

While the preceding illustration shows the invention using a spreadsheet's backward-calculation feature as one step in developing and delivering graphic analysis information on a single combination of factor values for meeting a goal target, the invention can simultaneously develop and deliver such graphic analyses for multiple factor-value combinations that represent alternatives for meeting the user's goal target.

Most commonly, the invention will develop and deliver such graphic targeting information for all factor data combinations shown by all the intersections of graph lines with the goal-line and, as one step in development and delivery of each combination, will use the spreadsheet as a backward calculator.

For any graph point the user moves to for any graphic analysis, a full new plan-model reflecting that graph point can be created. This new plan-model includes the factor value(s) represented by that graph point. This new plan-model also displays all goals values reflecting the graphpoint's factor value(s), including the value for the goal represented by the graph point.

Once the user has, on any graphic analysis, found and moved to a graph point for which he would like a full spreadsheet plan-model, from a single user action the invention will create a complete plan-model reflecting the selected graphpoint. The user can then produce copies of detailed tables of numbers of that new plan, for detailed budgeting and other uses of such tables. And the user can use the new plan-model as the basis for a new cycle of graphic analysis using the invention again, for further work to obtain an improved plan-model.

Figure 47:
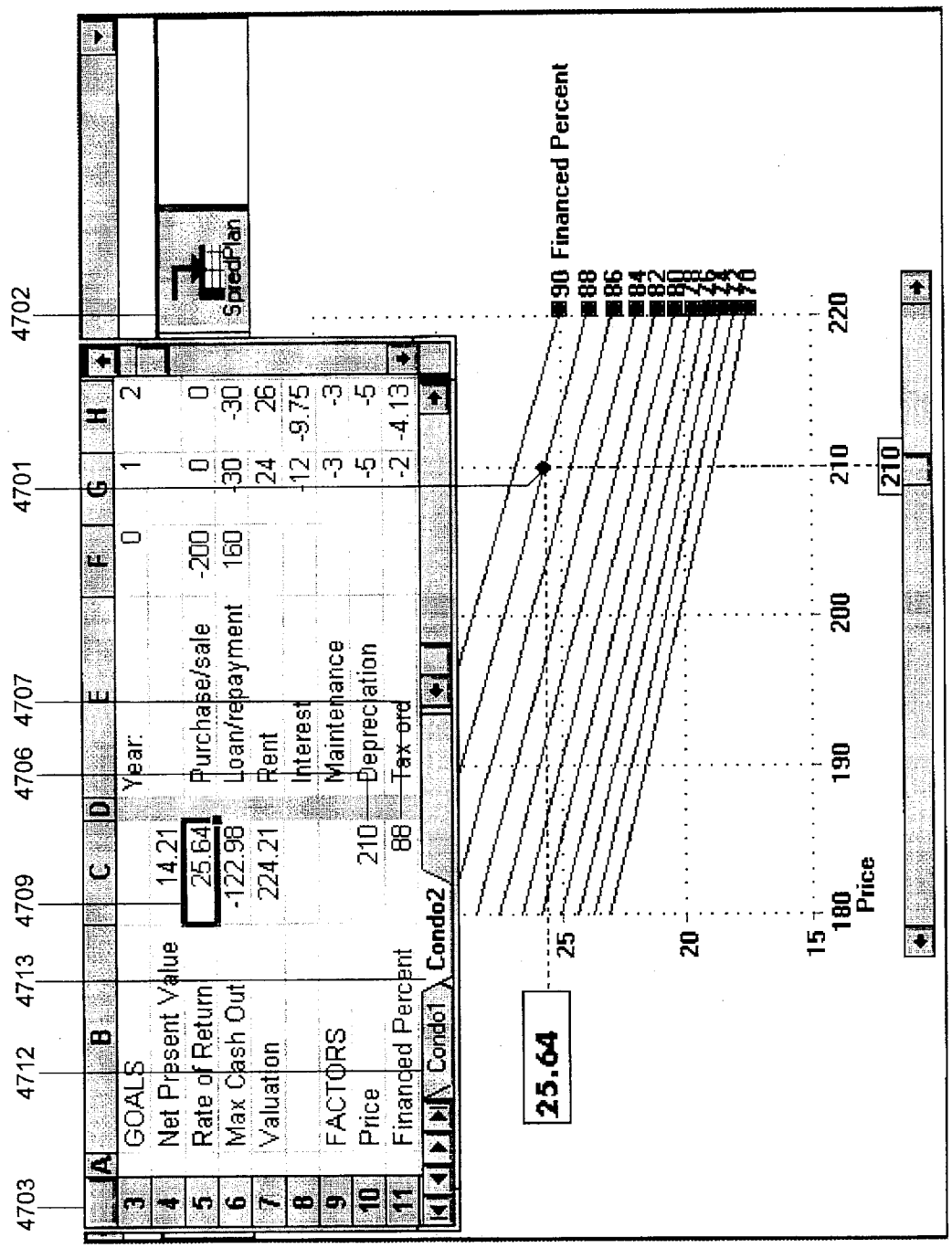
FIG. 47 illustrates a computer display screen having a new spreadsheet plan-model created from a selected graph point from an optimizer type graphic analysis.

FIG. 47 provides an illustration of an embodiment of the creation of a new plan-model from a graph point the user has moved to. In this embodiment, the original plan-model was entered in a spreadsheet, and therefore the invention creates the new plan-model in the same spreadsheet, in this example the Microsoft Excel® spreadsheet. Using a graphic analysis, the user has moved the graph point to a position 4701 for which he wants a new plan-model. To have the invention create the new plan-model, the user selects the graphic modeling software's SpredPlan icon-button 4702. In response, the spreadsheet plan-model or a copy thereof receives data that reflects the factor values of the graph point and values of other factors as in the prior plan-model, and displays goal values changed from the prior or original plan-model to reflect the new factor values of the graph point, as shown in the portion of the spreadsheet plan-model 4703 of FIG. 47.

In the graphic analysis from which the user requested the new plan-model, the current graphpoint 4701 represents price =210 and financed percent=88. The newly created spreadsheet plan-model reflects these new factor values with its price cell 4706 (C10) containing the value of 210, and the financed percent cell 4707 (C11) now containing the value of 88. And, in the new spreadsheet plan-model, all of cells C4 through C7, which have associated plan-model formulas and have values for the plan-model goals, now show different numbers from those in the prior or original plan-model. This is due to the changes in price and financed percent values, which affect values for all four goals. The new plan-model's goal value in cell 4709 (C6) for rate of return matches the graph point goal that the new plan reflects. Columns D through J in the new spreadsheet plan-model show a complete projection table for the new plan-model, containing all the same information as the original plan-model except that in this new plan-model, all the numbers in the projection table represent the new plan based on the graph point from which the new plan-model was created.

To create a new plan-model in a spreadsheet, the graphic modeling software inserts the appropriate new factor data into either the original or a copy of the entered plan-model, in the same manner that it uses to insert factor data into the spreadsheet plan-model in using the spreadsheet as a calculator in developing graphic analyses. Automatic spreadsheet recalculation makes the goal data reflect the new factor data.

The appropriate changes in the original user-entered plan-model can be changed to convert it into the new plan-model reflecting the current graph point. Alternatively, if the user wishes to preserve the original user-entered plan-model without these changes, the graphic modeling software 112 can create the new plan-model in a new spreadsheet page or worksheet. To do so, the graphic modeling software commands the spreadsheet to make a copy of the original plan-model in a new worksheet, and then inserts the appropriate changes in this copy. FIG. 47 illustrates this latter procedure in the context of a Microsoft Excel® spreadsheet. Prior to creation of the new plan-model reflecting the current graph point, the spreadsheet's Condo workbook/file had a single user-entered plan-model with original plan data. But now in FIG. 47, the graphic modeling software has created the new plan-model reflecting the current graph point. The spreadsheet's Condo workbook file now has two worksheets, identified by worksheet tabs at the bottom of spreadsheet window. The worksheet tab labeled Condo1 4712 identifies the worksheet with the original user-entered plan-model with original plan data, which is currently "behind" the new second worksheet for the new plan-model now displayed and identified by the Condo2 tab 4713.

The sequence of the five major steps described thus far constitutes multistep process C shown in the overview diagram of the invention of FIG. 6. To reiterate, the user begins with entry of a plan-model, then proceeds through linking, graphic analysis selection, creation and delivery of graphic analyses, exploration of graphic analyses and, from a selected graph point, creates a new plan-model reflecting an improved plan. In the embodiment of the invention in which a spreadsheet is used for plan-model entry, the user enters an original plan-model in the spreadsheet, then uses the graphic modeling software to see and explore the possibilities and select an improved plan which the graphic modeling software can then enter in the spreadsheet.

In enabling the user to carry out these steps, the user is able to proceed repeatedly through the cycle diagrammed in FIG. 6. After entering a plan-model, the user proceeds to use the invention's graphic analysis to find a better plan and create a new plan-model of it. Then the user can cycle back to apply the graphic analysis to the improved plan-model to find an even better plan.

Figure 48:
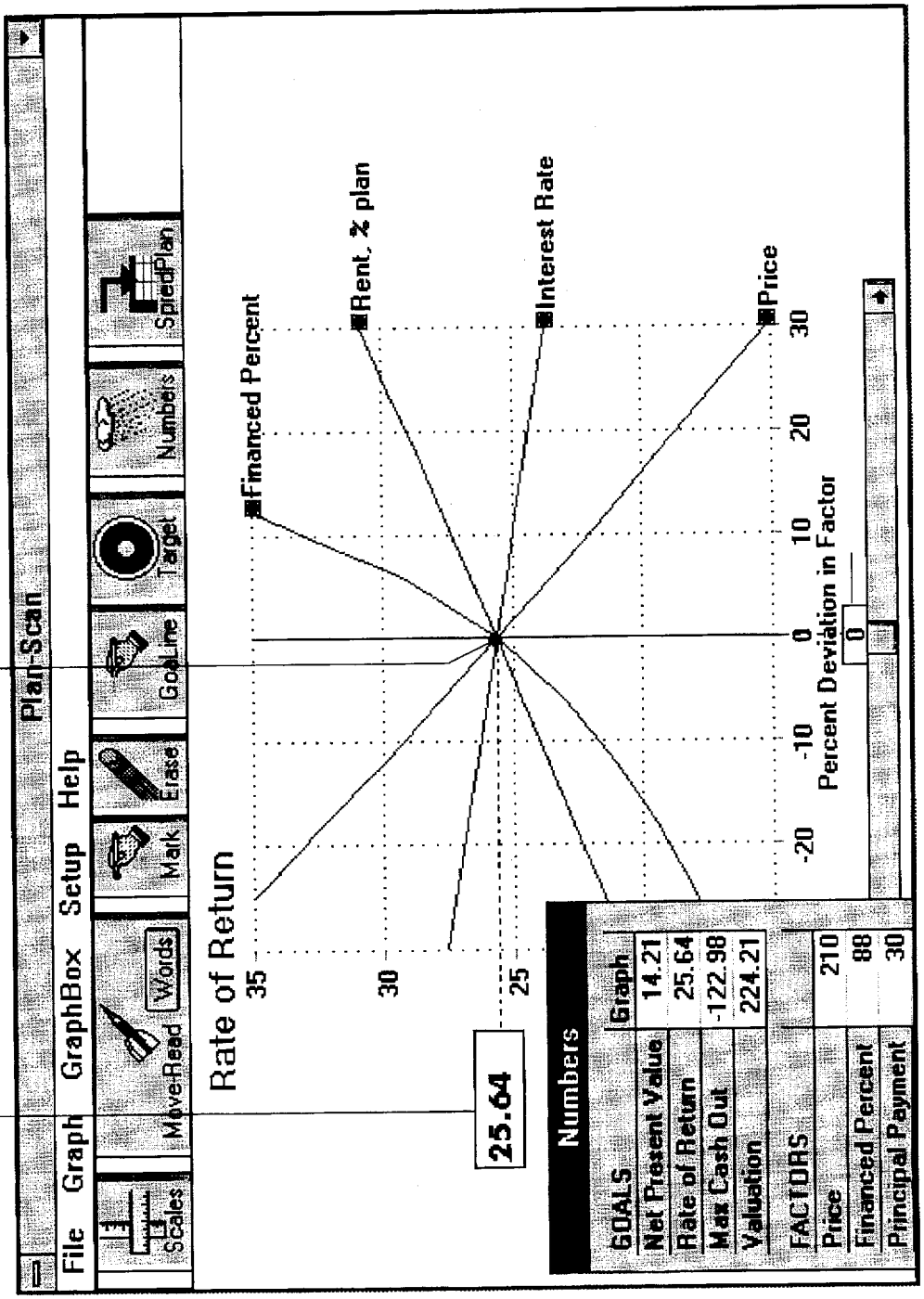
FIG. 48 illustrates a computer display screen having prioritizer graphic analysis developed from a new spreadsheet plan-model.

Following the illustration of FIG. 47, an illustration of a graphic analysis for the next cycle is shown in FIG. 48. In the original plan-model, the user entered price=200 and financed percent=80. The goal values reflect these factor values including rate of return=23.48. In FIG. 47, the user has proceeded through the first four major steps and moved to price=210 and financed percent=88, which produced a rate of return of 25.64. Then, at the user's request, a new plan-model was created reflecting this graph point. Now, the user can cycle back to the second major step to select graphic analyses based on the new plan-model. When the user does this, the graphic modeling software develops and delivers graphic analyses centered on the plan point of the new plan-model, as illustrated in FIG. 48.

FIG. 48 shows a prioritizer graph analysis just like the analysis of the original plan-model, except that this FIG. 48 analysis is based on the new plan-model. Note that, compared to the prioritizer analysis of FIG. 20, this new analysis is centered on a plan data 4801 reflecting a higher rate of return. The FIG. 20 graphic analysis plan data has a rate of return of 23.48. The new FIG. 48 graphic analysis, having the central plan point from which all the graph lines extend, has a rate of return of 25.64, as shown by the exploration axismeter 4802 beside the vertical goal axis. In the FIG. 48 graphic analysis, the movable graph point is at the central plan point and the Numbers window showing all values at that point is displayed, showing that the factor values of the central plan point include price at 210 and financed percent at 88.

Now the user can proceed to use graphic analyses of this improved plan to find better plan-values for other factors. For example, for the condominium plan, instead of focusing on price and financed percent factors, as was done previously, in the next graphic analysis cycle, the user might focus on other factors such as rent and maintenance. After exploring graphic analyses of the improved plan-model to find another better graph point, the user can control the creation of another even better plan-model The user can apply the graphic analysis capabilities to keep refining the plan-model.

The invention also enables users to customize its graphic analyses of particular plan-models or sets of plan-models and to create files of such customized analyses.

These customization capabilities offer the following benefits for the user:

(a) After a user has done initial work in graphic analysis, by creating a customized file the user can later repeat, resume, or continue the analyses far more quickly and efficiently.

(b) A user can create a polished, organized graphic analysis presentation.

(c) A user can prepare analyses for the easiest and fastest use by others, including others less skilled in computer use or in the analysis.

(d) A user is able to create and deliver a combination of decision power and ease of access to that power and its use, e.g., the user can create a customized file through which other users can develop the best and most valuable of the graphic analyses of a plan-model through a single user selection of a button.

In the following discussion, customization is accomplished partly through description and illustration of an embodiment of the invention in which the plan-model is entered in a spreadsheet and the graphic modeling software links to the spreadsheet plan-model and performs most of the necessary functions.

Figure 49:
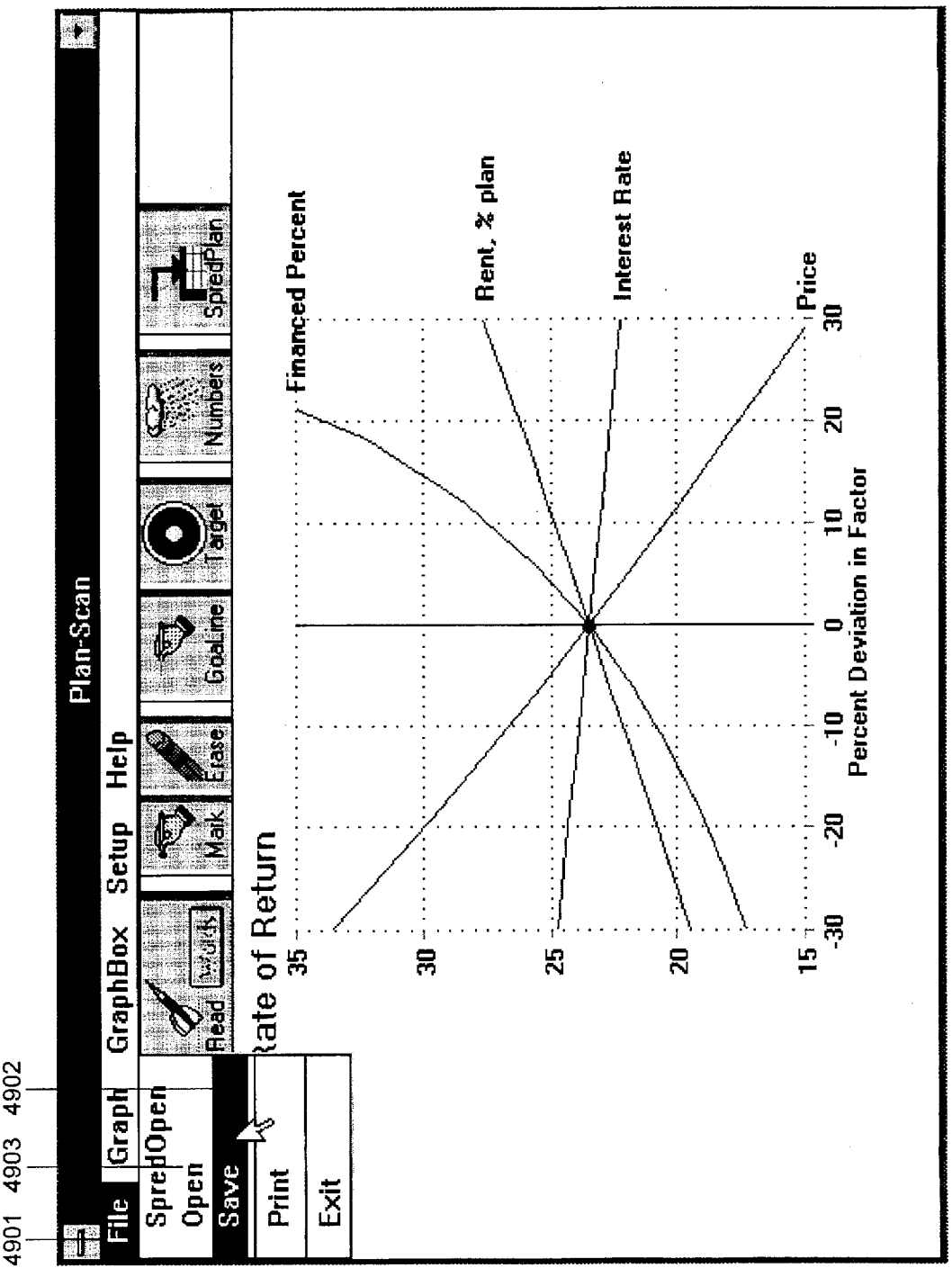
FIG. 49 illustrates a computer display screen having a "save" indicator for saving and opening a file of a user's graphic analysis work.

To save or open a file of graphic analysis work, the user uses methods that are standard for software products used with Microsoft Windows, as illustrated in FIG. 49. To save work, the user selects File 4901 in the menu and then Save 4902 in the resulting dropdown list, which causes display of a dialog box in which the user enters a file name and indicates the desired disk-directory for location of the file.

To recover the work for use, the user again selects File. This time in the dropdown list, the user selects Open 4903, which causes a display of a dialog box in which the user can find the file-directory and then the file.

In the graphic modeling software, the user can save in file all current entries and setting for graphic analyses so that, when the file is later opened, the user is at the same point of progress in the graphic analyses as when the file was saved. For example, if the user completes linking of the graphic modeling software with an external software product containing the plan-model (or elements thereof), as illustrated in FIGS. 8, 10 and 11, and then saves his work, the file will include the user's linking entries and selections. Later, when the user (or another user) opens that file, the same linking will automatically be restored. If the user modifies the goal and factor lists, as illustrated in FIG. 9, and then saves the file, the file will include the user's list modifications. Later, when the file is opened, these modifications will again be applied. When the file is opened, the graphic modeling software 112 will be ready to offer graphic analyses of the plan-model just as it was when the save was made.

If the user changes settings for graphic analysis ranges, increments, and axes, as illustrated in FIGS. 24 and 26, a subsequent file save can include those changed settings, and then later, when the file is opened, those settings will be restored.

A user can also include in a saved file a particular selection of one or more selected graphic analyses. With each, the user can include whatever exploration additions the user prefers—such as graph point markers and goal-line at a particular goal value. This is of major practical significance because for a typical plan the invention offers thousands of graphic analyses, and each could have thousands of different combinations of exploration additions. The invention's customizing capabilities enable the user to create special menus of user-selected graphic analyses.

In addition to the display of the graphic analysis itself, the full capability for interactive graphic-analysis exploration can be saved and restored. This total capability includes the interactive operations previously described, such as the user moving the graph point to various what-if possibilities and the developing and delivering of information on each possibility moved to.

Figure 50:
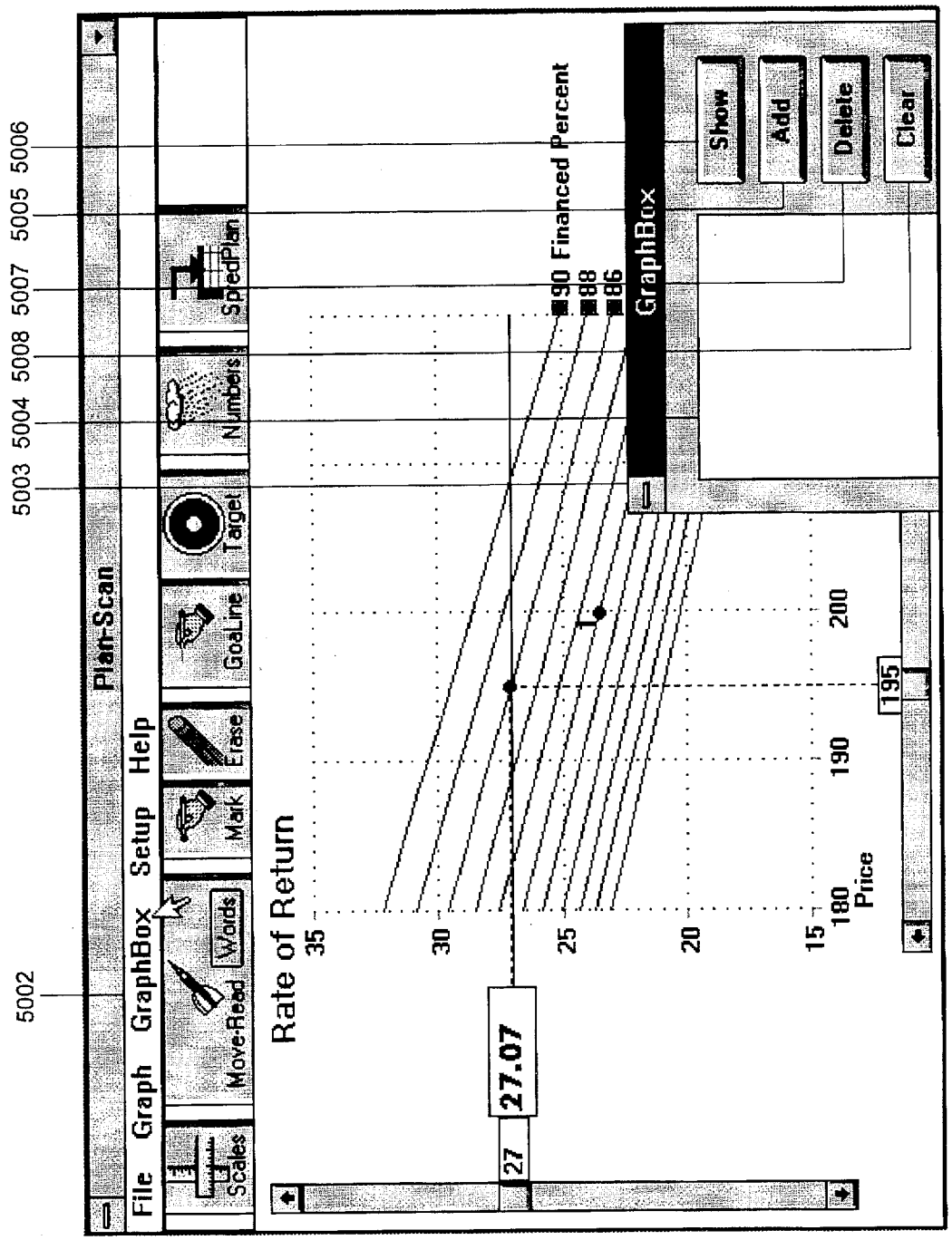
FIG. 50 illustrates a computer display screen having a window for creating a customized menu of selected graphic analyses.

In the embodiment of the invention described herein, the graphic modeling software includes a system for user creation of a menu of selected graphic analyses, named GraphBox, illustrated in FIG. 50. To add a graphic analysis to the GraphBox menu, the user first achieves display of the graphic analysis the way the user wants it, including if he wishes various additions such as the Move-Read function, the Words function and the GoalLine function, as exemplified by the graphic analysis displayed in FIG. 50. Then in the menu the user selects GraphBox 5002, which causes display of the GraphBox window 5003. The GraphBox window 5003 contains space for a menu list of selected graphic analyses 5004, and several buttons: an Add button 5005 for adding the currently displayed graphic analysis to the menu, a Show button 5006 for displaying whatever graphic analysis the user has currently selected in the GraphBox menu list, and Delete 5007 and Clear 5008 buttons for eliminating from the list the currently selected item or all listed items.

Figure 51:
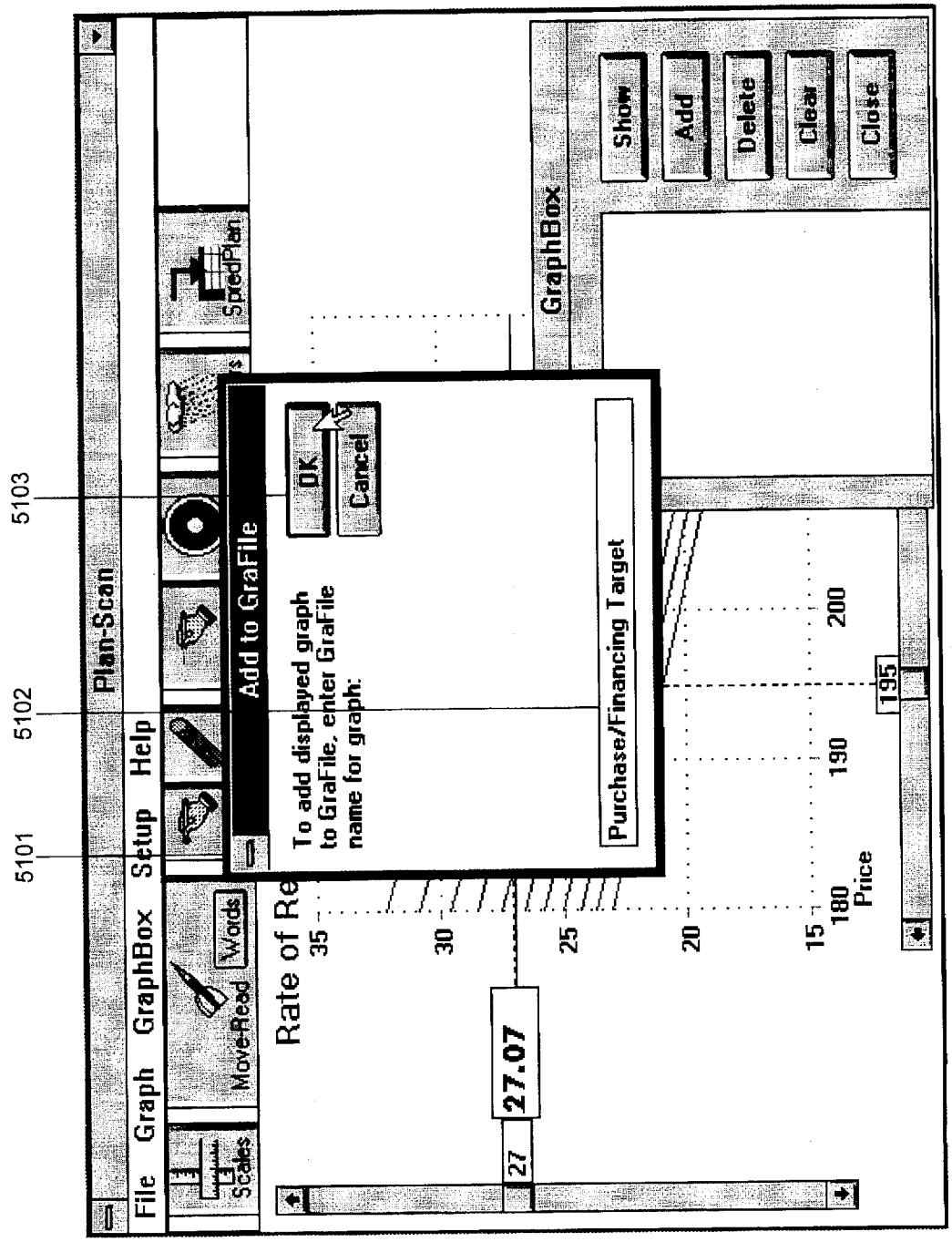
FIG. 51 illustrates a computer display screen having a window for assigning a selected graphic analysis a name and adding it to a customized menu.

With the graphic analysis displayed as the user wants it added to the list, in GraphBox the user selects the Add button, as illustrated in FIG. 51. Selection of the Add button causes display of an Add to GraFile dialog box 5101 which contains a text-entry box 5102 in which the user can enter any name he likes for the graphic analysis. In the illustrated example, for the graphic analysis name the user has entered "purchase/financing target." After entering the desired name, to add the currently displayed graphic analysis to the GraphBox menu list the user selects the OK button 5103.

Figure 52:
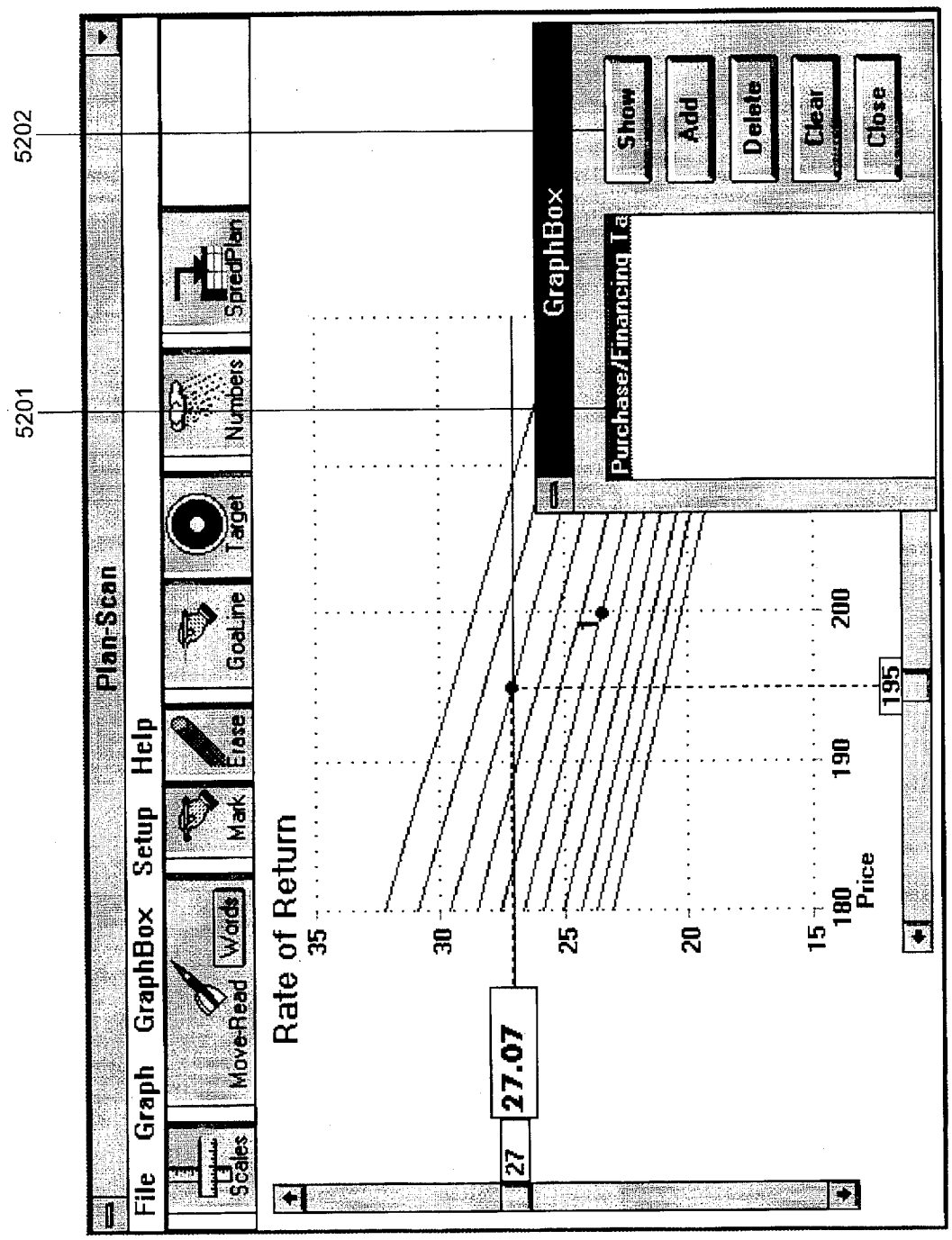
FIG. 52 illustrates a computer display screen having a customized menu for use in redeveloping a selected graphic analysis.

The result is shown in FIG. 52. The user-entered name has been added to the GraphBox menu list 5201. Regardless of which graphic analysis is displayed, if the user opens the GraphBox, in the menu list selects a graphic analysis name, and selects the GraphBox window's Show button 5202, the graphic analysis is displayed as indicated by the selected name in the GraphBox menu list. Such a display includes all graphic exploration additions that were displayed when the graphic analysis was added to the GraphBox menu list. The graphic analysis displayed from GraphBox has full capability for all of the invention's explore capabilities, just as it had when first developed and delivered. On a graphic analysis displayed from GraphBox, the user can, for example, select the Move-Read icon-button and then move the graph point and obtain information on each possibility moved to.

To provide this capability, when the user adds a graphic analysis to the GraphBox menu list the invention does not store the display of the graphic analysis—instead, it stores sufficient information to again develop and deliver the original graphic analysis. That is, it stores sufficient information so that, together with information available from the plan-model through current linking, the invention can again develop and deliver the graphic analysis in the same manner as in the initial development and delivery of the graphic analysis. To do so, through the entire process of graphic analysis of the plan-model, the following procedures are followed. Whenever a graphic analysis is developed and displayed, it can be stored so long as that graphic analysis displays all information specific to that graphic analysis that the invention contained when the user requested the graphic analysis and was required for the development and delivery of the graphic analysis 5301. This information does not include the plan-model, but the current linking is sufficient for the graphic modeling software to access the plan-model. During the time the graphic analysis is displayed, the graphic modeling software also acts to store, and retain so long as current, all information that is (along with information obtainable from the plan-model through current linking) required to define current status of all exploration of the graphic analysis, such as current horizontal position value of the movable graphpoint 5302. When the user completes the action to add the graphic analysis to the GraphBox menu list, by selecting the Add to GraphBox OK button 5103 shown in FIG. 51, the GraphBox stores, with the user-assigned name for that graphic analysis, all the information currently stored by the graphic modeling software 112. Sufficient information is also stored so that, whenever the user so requests, the graphic analysis is redeveloped and redelivered using the plan-model information accessible through current linking, just as currently displayed, including currently displayed exploration additions and also including full capabilities of the invention for all interactive exploration of the graphic analysis.

Figure 53:
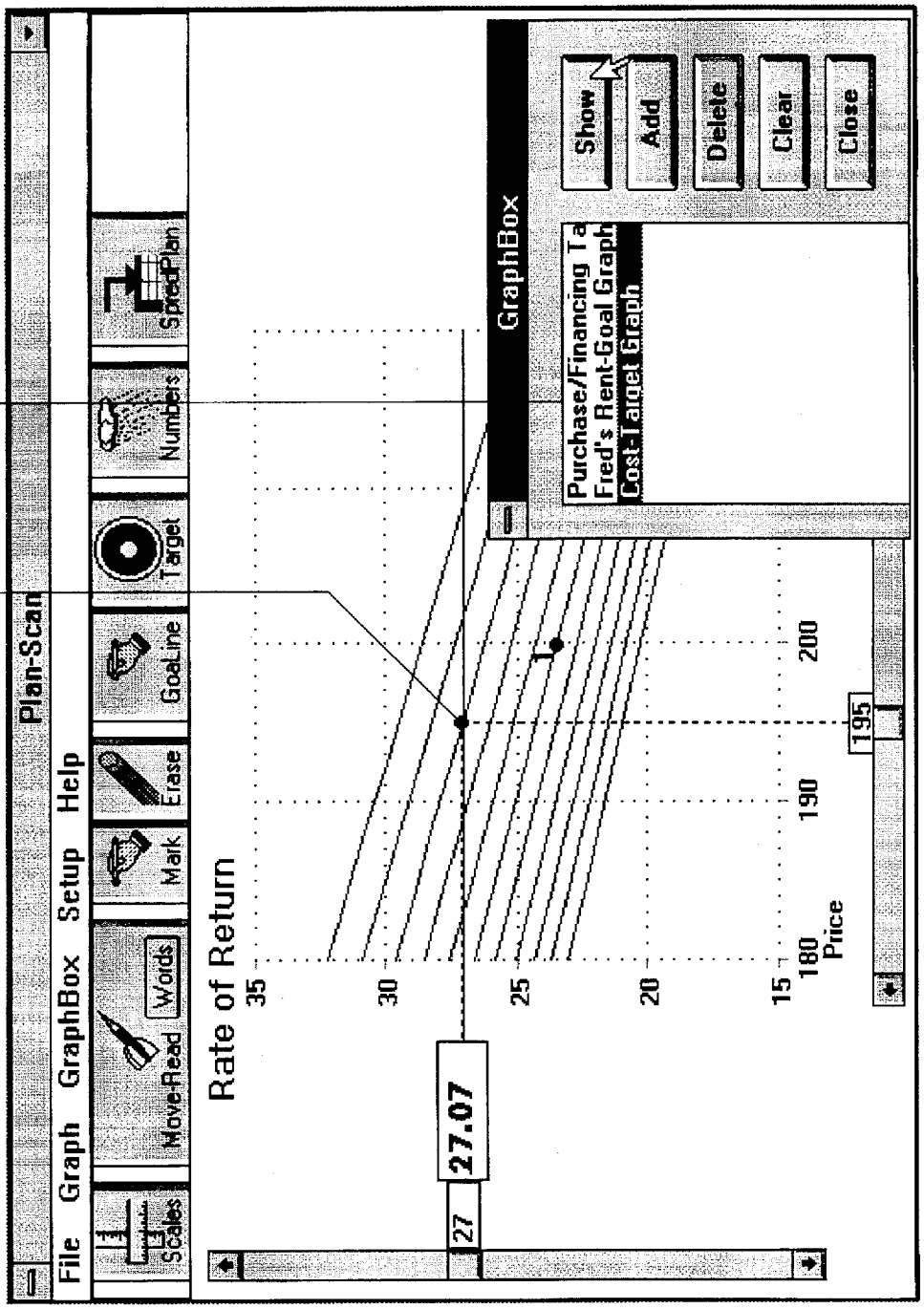
FIG. 53 illustrates a computer display screen having a menu of multiple graphic analyses selected and named by the user.

As FIG. 53 shows, the GraphBox enables the user to add more graphic analyses to the GraphBox menu list 5301. There is no limit on the number of graphic analyses that can be added to this list and redeveloped from it. If the user adds more analyses than can be shown in the list at one time, the GraphBox menu list displays a vertical scroll bar enabling the user to move up and down to any section of the list of all graphic analyses added to the menu list. The GraphBox menu list length is limited only by the capacity of the user's computer.

Figure 54:
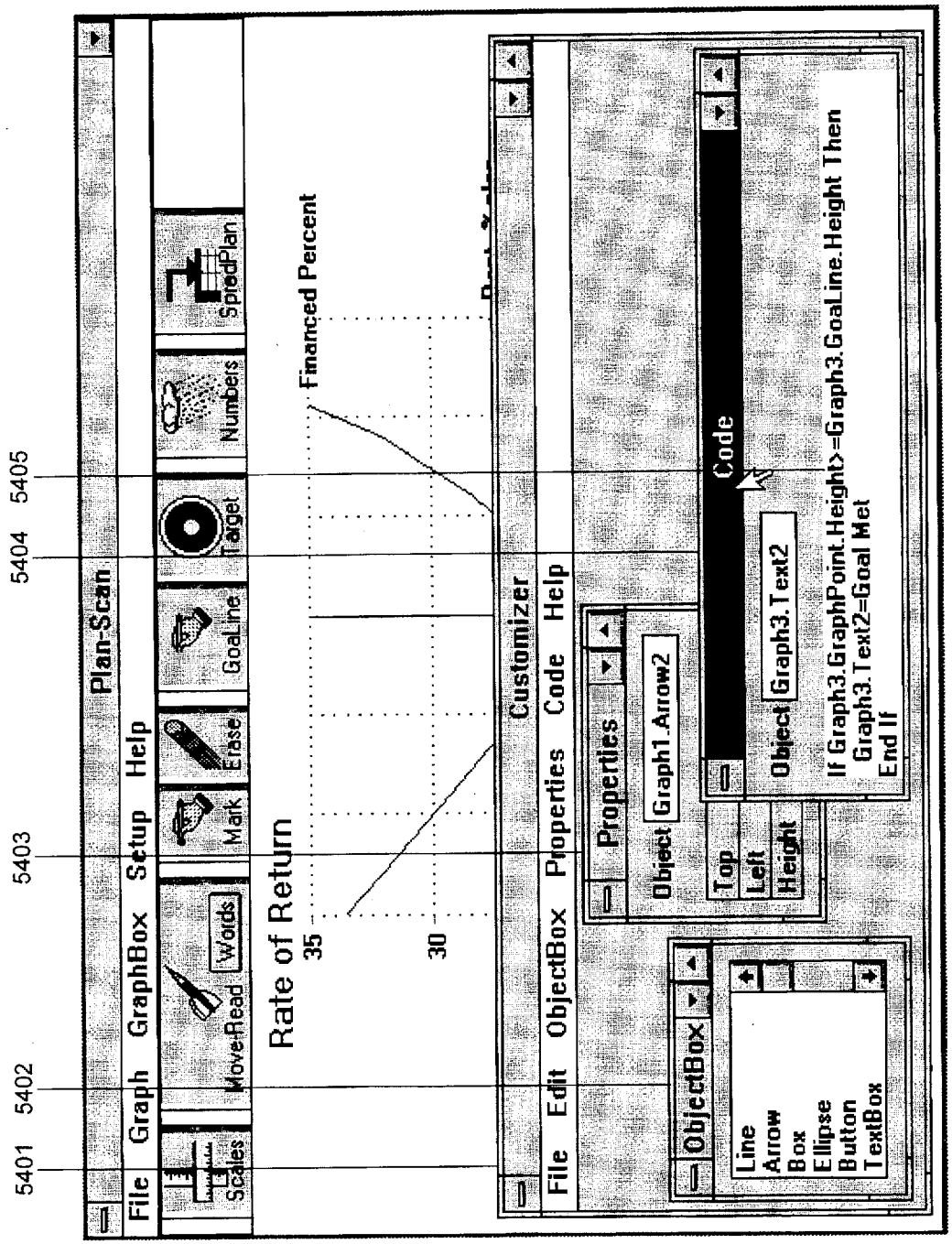
FIG. 54 illustrates a computer display screen having a customizer window for developing objects, properties and code.

As FIG. 54 and preceding figures show, for the GraphBox menu list, the invention enables the user to choose any name he desires for each graphic analysis. Through this capability, a user who is relatively skillful can develop and explore many graphic analyses, select those of greatest value to others, and in GraphBox prepare a customized menu of selected graphic analyses, with each identified with the name the skilled user considers most informative for other users who may have lesser familiarity with or expertise in the full capabilities of the invention.

In a file saved on disk for future use, or for use by others, the user can include GraphBox with its capability to redevelop each graphic analysis it currently contains. Stated more specifically, once the user has added graphic analyses to the GraphBox menu list, when he saves his work in a file 4902 as illustrated in FIG. 49, the file system enables the file to include, along with other information on current work such as current settings for automatic linking to the plan-model, full current contents of GraphBox. This includes all information required to redevelop and redeliver the graphic analyses in the GraphBox menu list, each just as it was when added to the GraphBox and then a save was executed. At any future time the user or other users can obtain any of the graphic analyses that were in GraphBox at the time of the save. This is accomplished by opening GraphBox, selecting the desired graphic analysis, and selecting the GraphBox Show button. For each graphic analysis thus obtained, information from the file can be used to develop and deliver the graphic analysis in the same manner as its original development and delivery, including linking as necessary and use of the plan-model, so that the graphic analysis has the same full capabilities for all of the invention's interactive graphic analysis exploration.

In addition, the graphic modeling software is able to customize the user interface associated with any graphic analysis or file, including: user creation of objects such as lines, arrows, texts, and command buttons; user setting of properties of these objects and of objects of the invention's graphic analysis (such as the movable graph point); and user writing of code or script associated with particular objects and particular events such as user selection. In the embodiment of the invention described herein, these systems and methods are provided to the user through the Customizer window 5401 illustrated in FIG. 54. The Customizer window 5401 contains an ObjectBox 5402 in which the user can select various objects for addition to whatever is currently displayed, such as an arrow for addition on a graphic analysis; a Properties window 5403 through which the user can set properties or characteristics of any object, such as location, length, and color of the arrow; and a Code window 5404 through which the user can define how the customized software responds to particular user actions applied to particular objects, such as, when the user selects the arrow, an item of text appears explaining what the arrow is pointing to.

Through the customizing capabilities, the user can define properties and write code to define responses to user actions not only for new objects the user creates, such as an arrow or unit of text added to a graphic analysis, but also for objects that are parts of the rest of the invention, such as graphic analysis axes and graph lines, exploration objects such as movable graph point, goal-line, and deposited markers, and elements of the invention's command system such as the overall menu and the buttons.

This integrated combination of the invention's customizing together with its graphic analysis provides the user a vast array of capabilities and possibilities for development of customizations to improve ease and clarity for widest use of and fullest benefit from the invention, especially for particular plan-models, particular analyses, and particular types of applications. In FIG. 54, the Code window contains an example of a bit of customization code 5405 that suggests the possibilities. With this code entered, every time a user moves to a graph point above the current height of the goal-line, words appear saying "Goal met." While this addition itself is modest, it illustrates the capability for any user to make a customization of the software do various tasks in relation to the graphic analysis and interactive exploration. Creative users can apply such capabilities to develop customizations that can multiply effectiveness in making more of the invention's vast graphic analysis power and planning value come across more fully, quickly, and clearly to wider populations of people less skilled or experienced in its graphic analysis power.

Figure 55:
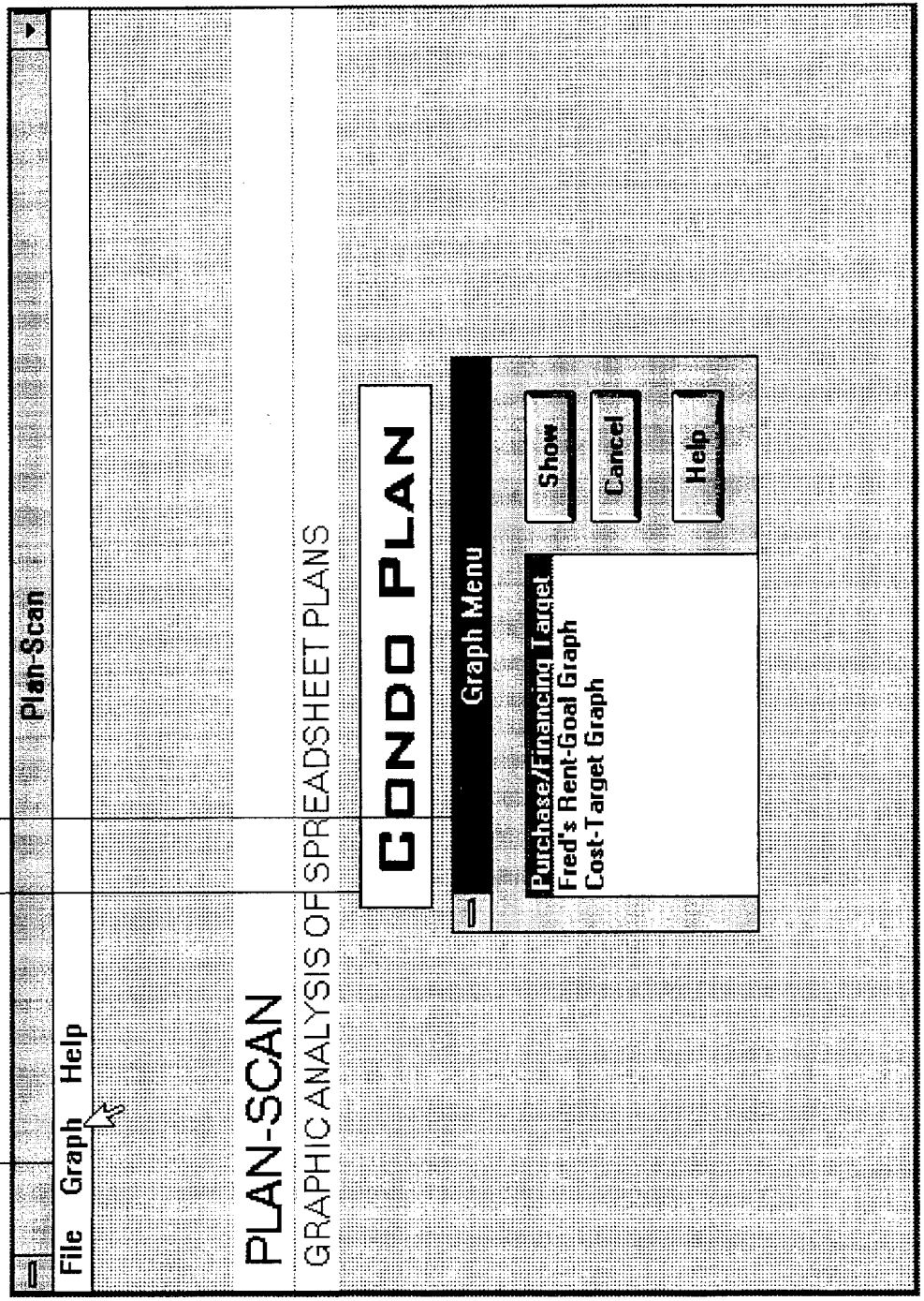
FIG. 55 illustrates a computer display screen having an example of an initial display when the customization feature is invoked.

FIG. 55 provides an illustration suggestive of the capabilities the customization adds, as an integrated part of the total invention, for enabling relatively skilled users to make it easier for others to get to the most valuable graphic analyses of a plan as quickly as possible. A user has, after using the invention for his own full graphic analysis of the condominium plan, used the invention's customization capabilities to prepare a customized file for easiest condominium analysis by others. With this customization, when the invention's graphic modeling software is initially opened, a condominium customization file is automatically opened too. It makes the initial display show that what this customization offers is focused on the condominium plan 5501. It also automatically opens the full file that establishes linking, scaling, and GraphBox for the condominium analysis. In the menu at the top, items are eliminated from the standard menu, such as Setup and GraphBox, that are not necessary because the analysis is already set up. When in this menu at top the user selects Graph 5502, the display further shows the GraphBox 5503 with its menu list of graphic analyses which the skilled user selected as most valuable for the other users. By selecting any of the graphs listed in the GraphBox, any user can go directly to that graphic analysis of the condominium plan, which has full exploration capabilities, and can also have special additional features the skilled user added to help others fully and quickly see the most valuable planning implications of each graphic analysis.

The description of the customizing step completes the description of the six major steps as noted in FIG. 6. The user initiates the implementation of steps 1–5 to find and select improved plan-models, and then culminates the use of the invention through customizing that will help the user (a) make his own further use of the work in the future, (b) deliver effective presentations on the analyses and their planning value, and (c) provide analysis files customized to enable others to get fullest value from his analyses more quickly, clearly, and fully.

Through its major six-step process, the invention provides capabilities, for its wide use in the cycle diagrammed as cycle d in FIG. 6. In other cycles diagrammed in FIG. 6, it is likely to be typical that a particular user proceeds through the full cycling. But cycle d is different in a fundamental way. In particular, after one user proceeds through the invention's six steps culminating in customizing, the cycles of subsequent use are likely to be followed by wider populations of additional users for whom the customizing can make it easier to see more of the vast power and value of the graphic analyses more quickly and fully.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments discussed hereinabove are further intended to explain the best mode known to practicing the invention and to enable others skilled in the art to utilize the invention in such, or in other embodiments, and with the various modifications required by their particular application or uses of the invention. It is intended that the appended claims be construed to include alternative embodiments to the extent permitted by the prior art.

What is claimed is:

1. A method that relates to graphic analysis of variation of economic plans, comprising:

accessing a plan-model having variables including inputs defined to have externally entered input values and outputs defined to have output values determined through plan-model processes affected by one or more of said input values, said plan-model being changeable into any of a number of what-if states, each of said what-if states being a particular combination of particular values for said inputs and any change in any of said input values being a change of said plan-model from one what-if state to another what-if state;

choosing at least a first goal from said outputs and at least a first factor from said inputs, said first factor being chosen based on said first goal and being an economic parameter, that is useful to a user in planning and managing said first goal and based on desire for information associated with a functional relationship between said first goal and said first factor contained in said plan-model wherein a change in the value of said first factor causes a change in the value of said first goal;

obtaining input values for an initial what-if state of said plan-model, in which what-if state all input values and all output values of said plan-model including the values of said first factor and said first goal are plan values;

establishing at least a first magnitude of variation for the value of said first factor, said first magnitude of variation being established based on said first factor plan value, said variation being in an axis of value variation independent of the axes of value variation represented by the input and output values in said initial what-if state of said plan-model; and providing a first graph having at least a first graph line in which each graph point reflects a different what-if state of said plan-model, said first graph line developed by determining representative graph points each representing a different first factor substitute value and a corresponding goal variant value for said first goal, wherein:

values of said representative graph points are determined and used to display said first graph and said first graph line in a computer process that includes generation of new values for said representative graph points using said plan-model and said plan values and display of said first graph with said first graph line using said representative graph points, which computer process is independent of user setup of additional modeling to create a table of such values external to said plan-model, said user setup of additional modeling including separate user steps to enter in spreadsheet cells external to said plan-model a plurality of first factor values and a formula reference for calculation of corresponding first goal values;

each of said first factor substitute values is determined based on said first factor plan value and said first magnitude of variation, each of said first factor substitute values is different from and a replacement for said first factor plan value, said first factor substitute values differ from any value of said first factor obtained from said initial what-if state of said plan-model and used in determination of said first factor substitute values, and said first factor substitute values differ from any value of said first factor obtained from the user and used in determination of said first factor substitute values; and each of said corresponding first goal variant values is the value of said first goal using said plan-model processes with said first factor plan value replaced by the first factor substitute value to which said first goal variant value corresponds, and depending on said relationship between said first goal and said first factor contained in said plan-model said corresponding goal variant values for said first goal are different from the plan value of said first goal, differ from any value of said first goal obtained from said initial what-if state of said plan-model and used in determination of said first goal variant values, and differ from any value of said first goal obtained from the user and used in determination of said first goal variant values;

in which graph line information is provided for said relationship between said first goal and said first factor and the value of said first goal at each value of said first factor for at least ten values of said first factor differing from any value of said first factor obtained from said initial what-if state of said plan-model and differing from any value of said first factor obtained from the user.

2. A method, as claimed in claim 1, wherein:
said accessing step includes linking to said plan-model and software providing said plan-model to enable interaction with said software and said plan-model.

3. A method, as claimed in claim 1, wherein:
said accessing step includes providing said plan-model in an electronic spreadsheet.

4. A method, as claimed in claim 1, wherein:
said choosing step includes creating menu lists of a number of said outputs for user selection of goals and of a number of said inputs four user selection of factors.

5. A method, as claimed in claim 1, wherein:
said choosing step includes identifying said outputs of said plan-model for user selection of goals or said inputs of said plan-model for user selection of factors.

6. A method, as claimed in claim 1, wherein:
said choosing step includes identifying said inputs of said plan-model affecting any particular output for user selection of factors.

7. A method, as claimed in claim 1, wherein:
said choosing step includes locating a number of said outputs to be offered for selection of goals and a number of said inputs to be offered for selection of factors in particular locations in said plan-model.

8. A method, as claimed in claim 1, wherein:
said choosing step includes designating a name for each of a plurality of said outputs which are selectable as goals including said first goal and each of a plurality of said inputs which are selectable as factors including said first factor.

9. A method, as claimed in claim 1, wherein:
said obtaining step includes acquiring a number of said input plan values from said plan-model or software containing said input plan values.

10. A method, as claimed in claim 1, wherein:
said providing step includes displaying a plurality of graph lines representing variation from plan values of a plurality of factors including said first graph line representing variation from plan value of said first factor, said displaying step including displaying said graph lines relative to a vertical axis associated with goal variant values of said first goal and a horizontal axis of factor substitute values associated with said plurality of factors including said first factor chosen from said inputs, with each of said graph lines illustrating said first goal variant values for a plurality of factor substitute values for a different factor of said plurality of factors, wherein each of said plurality of graph lines represents an axis of value variation of said plan-model established independently of said axes of value variation represented by the input and output values in said initial what-if state of said plan-model and contains at least ten graph points each:

representing for at least one of said plurality of factors a factor substitute value different from all values of said factor obtained from said initial what-if state of said plan-model and from the user and used in determination of said factor substitute value;

representing for said first goal a corresponding goal variant value determined using said factor substitute value and, depending on said relationship between said first goal and said first factor contained in said plan-model, different from all values of said first goal obtained from said initial what-if state of said plan-model and from the user and used in determination of said first goal variant value; and reflecting a what-if state of said plan-model different from said initial what-if state of said plan-model and different from the what-if state of said plan-model reflected by each of the rest of said ten graph points.

11. A method, as claimed in claim 10, wherein:
said displaying step includes illustrating said first graph line with said first goal variant values as a function of percentage-related deviation from plan value of said first factor.

12. A method, as claimed in claim 1, wherein:
said providing step includes displaying a plurality of graph lines representing combined variation from said plan values of two independently varying factors including said first graph line, said displaying step including displaying a vertical axis associated with goal variant values of said first goal and displaying a horizontal axis associated with factor substitute values of said first factor, with each of said graph lines illustrating said first goal variant values as a function of said first factor substitute values and a different value for said second factor, wherein said plurality of graph lines contains at least ten graph points each representing:

factor substitute values for each of two factors, each of said factor substitute values different from all values of that factor obtained from said initial state of said plan-model and from the user and used to determine said factor substitute values;

a corresponding goal variant value for said first goal different from all values of said first goal obtained from said initial state of said plan-model and from the user and used to determine said goal variant value; and a what-if state of said plan-model different from said initial what-if state of said plan-model, and said plurality of graph lines represents value variation of said plan-model in a combination of two axes of value variation each established independently of the axes of value variation represented by the input and output values in said initial what-if state of said plan-model.

13. A method, as claimed in claim 12, wherein said displaying step includes:

defining a factor substitute values axis and a goal variant values axis with units associated therewith;

determining a factor substitute values range and axis-scale increment for said first factor using said first factor plan value;

determining a factor substitute values graph line-set range and increment for said second factor using the plan value of said second factor;

determining a goal range and axis-scale increment for said first goal;

determining appropriate changes in ranges and increments for said factor and goal axes and said graph line-set;

displaying said plurality of graph lines including said first graph line; and showing labels for said factor axis, said goal axis and said graph line-set.

14. A method, as claimed in claim 13, wherein:

said step of determining said first goal range and axis-scale increment includes obtaining high and low first goal values across combined ranges of said first factor substitute values and second factor substitute values using said substitute values of said first factor and said second factor and the relationship contained in said plan-model between said first goal and said first factor and said second factor, and arriving at said first goal range and axis-scale increment using said high and low first goal values.

15. A method, as claimed in claim 1, wherein:

said providing step includes developing said graph points of said first graph line by calculating a plurality of first goal variant values using a plurality of said first factor substitute values.

16. A method, as claimed in claim 1, wherein:

said providing step includes displaying said first graph line.

17. A method, as claimed in claim 16, wherein:

said displaying step includes illustrating said first graph line on a display screen.

18. A method, as claimed in claim 1, wherein said providing step includes:

producing said first graph line associated with said plan-model wherein said relationship between said first goal and said first factor contained in said plan-model that said first graph line reflects is defined in said plan-model by a plurality of formulas separately expressed and separately located in said plan-model.

19. A method, as claimed in claim 1, further comprising:

choosing from said inputs of said plan-model a second factor different from said first factor;

obtaining for said second factor a second factor plan value establishing for said second factor at least a first magnitude of variation in an axis of value variation determined independently of the axes of value variation represented by the input and output values in said initial what-if state of said plan-model; and providing a number of graph lines, including said first graph line, containing a plurality of graph points representing factor substitute values for said first factor and corresponding goal variant values for said first goal and a plurality of graph points representing factor substitute values for said second factor and corresponding goal variant values for said first goal.

20. A method, as claimed in claim 19, wherein:

said providing step includes determining each of said first goal variant values using a factor substitute value for at least one of said first and second factors.

21. A method, as claimed in claim 1, wherein:

said providing step includes developing and displaying a plurality of graph lines including said first graph line, with said plurality of graph lines illustrating goal variant values of said first goal for factor substitute values for a plurality of factors, wherein:

said plurality of graph lines represents variation of said plan-model from said initial what-if state of said plan-model in a plurality of axes of value variation each established independently of the axes of value variation represented by the input and output values in said initial what-if state of said plan-model; and for each of a plurality of factors, said plurality of graph lines contains at least ten graph points representing a number of factor substitute values for said factor, wherein each of said ten graph points:

represents for at least said factor a factor substitute value differing from all values of said factor obtained from said initial what-if state of said plan-model and from the user and used in determination of said factor substitute value;

represents for said first goal a corresponding variant value determined using said factor substitute value and, depending on said relationship between said first goal and said factor contained in said plan-model, differing from all values of said first goal obtained from said initial what-if state of said plan-model and from the user and used in determination of said first goal variant value; and reflects a what-if state of said plan-model different from said initial state of said plan-model and different from the what-if state of said plan-model reflected by each of the rest of said ten graph points.

22. A method, as claimed in claim 1, wherein:

said accessing step includes providing at least portions of said plan-model in software that includes at least one of the following: spreadsheet software, accounting software, data base software and innovative graphic analysis software.

23. A method, as claimed in claim 22, wherein:

said providing step includes linking to said software to enable interaction with said software and said plan-model.

24. A method, as claimed in claim 1, wherein said providing step includes:

defining a factor substitute values axis and a goal variant values axis and units associated therewith;

determining a factor substitute values range and a factor substitute values axis-scale increment for said first factor using said first factor plan value;

displaying said factor substitute values axis with increment scaling and labeling;

determining a goal variant values range and a goal variant values axis-scale increment for said first goal;

displaying said goal variant values axis with increment scaling and labeling; and displaying said first graph line.

25. A method, as claimed in claim 24, wherein said step of determining said first goal variant values range and axis-scale increment includes:

determining first goal variant high values and low values using said first factor substitute values and said relationship between said first goal and said first factor contained in said plan-model; and arriving at said first goal variant values range and goal variant values axis scale increment using said high values and said low values.

26. A method, as claimed in claim 24, further including:

changing by the user when appropriate at least one of said first factor range and said first goal range.

27. A method, as claimed in claim 26, wherein:

said changing step further includes modifying said axis-scale increment for at least one of said factor axis and said goal axis.

28. A method, as claimed in amended claim 1, wherein:

said providing step includes analyzing a shape of said first graph line which is a functional relationship between said first goal and said first factor, for the purpose of determining a series of values of said first factor which in combination with corresponding values of said first goal will define a series of graph point that upon display with straight line segments connecting consecutive graph points produce a graph line providing a visual representation of said functional relationship.

29. A method, as claimed in claim 28, wherein:

said analyzing step includes determining a plurality of graph points along said first graph line, with each of said graph points comprised of one of said first factor substitute values and one of said first goal variant values determined using said first factor substitute value and said relationship between said first goal and said first factor.

30. A method, as claimed in claim 28, wherein said analyzing step includes analyzing a direct expression of a number for formulas in said plan-model.

31. A method, as claimed in claim 1, wherein:

said providing step includes using said plan-model to calculate said first goal variant values based on said first factor substitute values.

32. A method, as claimed in claim 1, further including:

creating a user interface for said graph that involves at least one of the following: creation of methods of choosing said goals and factors, methods of moving interactively on said graph, and methods of illustrating information relative to values of factors and goals for graph points moved to on said graph.

33. A method, as claimed in claim 1, wherein:

said relationship between said first goal and said first factor includes a plurality of formulas separately expressed and separately located in said plan-model.

34. A method, as claimed in claim 1, wherein:

said establishing step includes establishing said first magnitude of variation in an axis of plan-model value variation determined independently of the axes of value variation represented by any series of values in said initial state of said plan-model including any series of values contained in a horizontal row or a vertical column or a series of pages or a list in said initial state of said plan-model.

35. A method, as claimed in claim 1, wherein:

said providing step includes showing said first graph line wherein each of a number of segments of said first graph line represents a continuum of graph points with each of said graph points depicting a different first factor substitute value and a corresponding first goal variant value and reflecting a different what-if state of said plan-model.

36. A method, as claimed in claim 1, wherein:

said providing step includes determining a plurality of graph line definition first factor values which together with corresponding first goal variant values represent a series of graph line definition graph points such that straight line segments connecting consecutive graph points in said series show additional graph points reflecting the relationship between said first goal and said first factor in said plan-model.

37. A method, as claimed in claim 36, further including:

changing by the user said determining of graph line definition first factor values.

38. A method that relates to graphic analysis of variation of economic plans, comprising:

accessing a plan-model having variables including inputs defined to have externally entered input values and outputs defined to have output values determined through plan-model processes affected by one or more of said input values, said plan-model being changeable into any of a number of what-if states, each of said what-if states being a particular combination of particular values for said inputs and any change in any of said input values being a change of said plan-model from one what-if state to another what-if state;

choosing at least a first goal from said outputs and at least a first factor from said inputs, said first factor being chosen based on said first goal and being an economic parameter that is useful to a user in planning and managing said first goal and based on desire for information associated with a relationship between said first goal and said first factor contained in said plan-model wherein a change in the value of said first factor causes a change in the value of said first goal;

obtaining input values for an initial what-if state of said plan-model, in which what-if state all input values and all output values of said plan-model including the values of said first factor and said first goal are plan values;

establishing at least a first magnitude of variation for the value of said first factor, said first magnitude of variation being established based on said first factor plan value, said variation being in an axis of value variation independent of the axes of value variation represented by the input and output values in said initial what-if state of said plan-model;

providing a first graph having at least a first graph line in which each graph point reflects a different what-if state of said plan-model, said first graph line including graph points each representing a different first factor substitute value and a corresponding goal variant value for said first goal, wherein:

each of said first factor substitute values is determined based on said first factor plan value and said first magnitude of variation, each of said first factor substitute values is different from and a replacement for said first factor plan value, said first factor substitute values differ from any value of said first factor obtained from said initial what-if state of said plan-model and used in determination of said first factor substitute values, and said first factor substitute values differ from any value of said first factor obtained from the user and used in determination of said first factor substitute values; and each of said corresponding first goal variant values is the value of said first goal using said plan-model processes with said first factor plan value replaced by the first factor substitute value to which said first goal variant value corresponds, and depending on said relationship between said first goal and said first factor contained in said plan-model said corresponding goal variant values for said first goal are different from the plan value of said first goal, differ from any value of said first goal obtained from said initial what-if state of said plan-model and used in determination of said first goal variant values, and differ from any value of said first goal obtained from the user and used in determination of said first goal variant values;

in which graph line information is provided for said relationship between said first goal and said first factor and the value of said first goal at each value of said first factor for at least ten values of said first factor differing from any value of said first factor obtained from said initial what-if state of said plan-model and differing from any value of said first factor obtained from the user;

moving interactively along said first graph line to arrive at a first graph point of a plurality of graph points represented by said first graph line, said first graph point representing a first factor substitute value selected by the user from a plurality of factor substitute values represented by the range of a factor axis and reflected by said plurality of graph points along said first graph line, for which first factor substitute value information is desired regarding the corresponding goal variant value of said first goal;

determining said corresponding goal variant value of said first goal represented by said first graph point using said first factor substitute value and the relationship between said first goal and said first factor contained in said plan-model; and illustrating said factor substitute value and said corresponding first goal variant value represented by said first graph point, wherein said first graph line represents at least ten graph points including said first graph point to which the user can move interactively, each of said graph points representing a factor substitute value of said first factor different from any value of said first factor obtained from said initial what-if state of said plan-model and representing a what-if state of said plan-model different from said initial what-if state of said plan-model.

39. A method, as claimed in claim 38, further comprising:

creating a plan-model revised version reflecting factor and goal values represented by said first graph point, differing from said plan-model by having at least one factor substitute value different from said factor's plan value.

40. A method, as claimed in claim 39, wherein:

said creating step includes making a copy of said plan-model and in said copy changing plan values of a number of factors to substitute values of said factors that correspond to said first graph point.

41. A method, as claimed in claim 38, wherein:

said moving interactively step includes moving interactively to one of a plurality of graph lines selected by the user to move along and illustrating which of said plurality of graph lines has been moved to.

42. A method, as claimed in claim 41, further comprising:

Moving interactively relative to a plurality of graph lines including said first graph line each representing said relationship between said first goal and said first factor relative to a first factor axis and a first goal axis with each of said graph lines representing said relationship with a different value for a second factor, to a graph point that is not on a displayed graph line but between two of said graph lines, wherein said graph point represents a first factor substitute value relative to said first factor axis and also associated with said first factor substitute value represents a factor substitute value for said second factor that is defined by the position of said graph point relative to said two graph lines and the goal variant value represented by said graph point is determined using said factor substitute values of said first and second factors and the relationship between said first goal and said first and second factors contained in said plan-model.

43. A method, as claimed in claim 38, wherein:

said illustrating step includes displaying markers located relative to said first graph point moved to and said factor axis and a goal axis illustrating the selected factor substitute value of said first graph point moved to relative to said factor axis and the corresponding goal variant value of said first graph point relative to said goal axis.

44. A method, as claimed in claim 38, wherein:

said illustrating step includes presenting a number indicating said first factor substitute value moved to relative to said factor axis to arrive at said first graph point along said first graph line and a number for the first goal variant value of said first graph point determined using said first factor substitute value and said relationship between said first goal and said first factor contained in said plan-model.

45. A method, as claimed in claim 38, wherein:

said illustrating step includes displaying numbers showing values associated with said first graph point for a plurality of factors including said first factor substitute value and for a plurality of goals including said first goal variant value.

46. A method, as claimed in claim 45, wherein:

said displaying step includes displaying for each of a plurality of graph points, including said first graph point, numbers showing values associated with said graph point for a plurality of factors and a plurality of goals.

47. A method, as claimed in claim 38, wherein:

said moving interactively step includes locating a marker at each of a number of said graph points and displaying at least one text area for user entry and display of information related to at least one of said graph points having one of said markers.

48. A method, as claimed in claim 1, further comprising:

saving in computer memory a file of a number of said graphs including said first graph having at least said first graph line, said file having for each of said graphs information to reestablish relinking to said plan-model and reproduce said graph and enable moving interactively to graph points along at least said first graph line on said graph by moving to factor substitute values relative to a factor axis and illustrate information on said graph points moved to including goal variant values of said graph points determined using said factor substitute values moved to and the relationship between the goal and the factors represented on said graph.

49. A method, as claimed in claim 38, wherein:

said moving interactively step includes moving to a graph point representing a factor substitute value for at least one factor different from every value of said factor used to determine how to display said graph line.

50. A method, as claimed in claim 38, wherein:

said moving interactively step includes:

determining a first increment of consecutive values of said first factor moveable to along said graph line relative to said factor axis; and user adjusting of the values of said first factor that can be moved to along said graph line relative to said factor axis including user adjusting of the increment between consecutive factor values moveable to along said graph line.

51. A method, as claimed in claim 38, wherein:

said moving interactively step includes moving interactively to any of at least 100 graph points along said first graph line representing different factor substitute values of said first factor.

52. A method that relates to graphic analysis of variation of economic plans, comprising:

accessing a plan-model having variables including inputs defined to have externally entered input values and outputs defined to have output values determined through plan-model processes affected by one or more of said input values, said plan-model being changeable into any of a number of what-if states, each of said what-if states being a particular combination of particular values for said inputs and any change in any of said input values being a change of said plan-model from one what-if state to another what-if state;

choosing at least a first goal from said outputs and at least a first factor from said inputs, said first factor being chosen based on said first goal and being an economic parameter that is useful to a user in planning and managing said first goal and based on desire for information associated with a relationship between said first goal and said first factor contained in said plan-model wherein a change in the value of said first factor causes a change in the value of said first goal;

obtaining input values for an initial what-if state of said plan-model, in which what-if state all input values and all output values of said plan-model including the values of said first factor and said first goal are plan values;

establishing at least a first magnitude of variation for the value of said first factor, said first magnitude of variation being established based on said first factor plan value, said variation being in an axis of value variation independent of the axes of value variation represented by the input and output values in said initial what-if state of said plan-model;

providing a first graph having at least a first graph line in which each graph point reflects a different what-if state of said plan-model, said first graph line including graph points each representing a different first factor substitute value and a corresponding goal variant value for said first goal, wherein:

each of said first factor substitute values is determined based on said first factor plan value and said first magnitude of variation, each of said first factor substitute values is different from and a replacement for said first factor plan value, said first factor substitute values differ from any value of said first factor obtained from said initial what-if state of said plan-model and used in determination of said first factor substitute values, and said first factor substitute values differ from any value of said first factor obtained from the user and used in determination of said first factor substitute values; and each of said corresponding first goal variant values is the value of said first goal using said plan-model processes with said first factor plan value replaced by the first factor substitute value to which said first goal variant value corresponds, and depending on said relationship between said first goal and said first factor contained in said plan-model said corresponding goal variant values for said first goal are different from the plan value of said first goal differ from any value of said first goal, obtained from said initial what-if state of said plan-model and used in determination of said first goal variant values, and differ from any value of said first goal obtained from the user and used in determination of said first goal variant values;

in which graph line information is provided for said relationship between said first goal and said first factor and the value of said first goal at each value of said first factor for at least ten values of said first factor differing from any value of said first factor obtained from said initial what-if state of said plan-model and differing from any value of said first factor obtained from the user; and moving interactively including moving a reference marker to at least a first goal variant value of said first goal relative to a goal axis on said graph and illustrating at least one graph point on said first graph line of said graph that corresponds to said goal variant value moved to, wherein said graph point represents a factor substitute value for said first factor which if substituted for the plan value of said first factor in said plan-model will change said plan-model to a what-if state in which the value of said first goal corresponds to the first goal variant value moved to.

53. A method, as claimed in claim 52, wherein:

said moving interactively step includes displaying graphically along each of a plurality of graph lines including said first graph line at least one graph point along said graph line, including said graph point on said first graph line, representing said goal variant value of said first goal moved to and a factor substitute value relative to a factor axis which in association with said graph line and the relationship between said first goal and factors associated with said graph line will produce said goal variant value moved to for said first goal.

54. A method, as claimed in claim 52, wherein:

said illustrating step includes displaying a number for said first factor substitute value of said graph point determined using said first goal variant value moved to and said relationship between said first goal and said first factor contained in said plan-model.

55. A method, as claimed in claim 54, wherein:

said displaying step includes manipulating said plan-model to find said first factor substitute value.

56. An apparatus that relates to graphic analysis of variation of economic plans, comprising:

a plan-model having variables including inputs defined to have externally entered input values and outputs defined to have output values determined through plan-model processes affected by one or more of said input values, said plan-model being changeable into any of a number of what-if states, each of said what-if states being a particular combination of particular values for said inputs and any change in any of said input values being a change of said plan-model from one what-if state to another what-if state, from which at least a first goal is chosen from said outputs and at least a first factor is chosen from said inputs, said first factor being chosen based on said first goal and being an economic parameter that is useful to a user in planning and managing said first goal and based on desire for information associated with a functional relationship between said first goal and said first factor contained in said plan-model wherein a change in the value of said first factor causes a change in the value of said first goal, and for which inputs input values are entered for an initial what-if state of said plan-model, in which what-if state all input values and all output values of said plan-model including the values of said first factor and said first goal are plan values; and first means for providing a first graph having at least a first graph line in which each graph point reflects a different what-if state of said plan-model, said first graph line developed by determining representative graph points each representing a different first factor substitute value and a corresponding goal variant value for said first goal, wherein:

values of said representative graph points are determined and used to display said first graph and said first graph line in a computer process that includes generation of new values for said representative graph points using said plan-model and said plan values and display of said first graph with said first graph line using said representative graph points, which computer process is independent of user setup of additional modeling to create a table of such values external to said plan-model, said user setup of additional modeling including separate user steps to enter in spreadsheet cells external to said plan-model a plurality of first factor values and a formula reference for calculation of corresponding first goal values;

each of said first factor substitute values is determined based on said first factor plan value and a first magnitude of variation established for the value of said first factor, said first magnitude of variation being established based on said first factor plan value, said variation being in an axis of value variation determined independently of the axes of value variation represented by the input and output values in said initial what-if state of said plan-model, each of said first factor substitute values is different from and a replacement for said first factor plan value, said first factor substitute values differ from any value of said first factor obtained from said initial what-if state of said plan-model and used in determination of said first factor substitute values, and said first factor substitute values differ from any value of said first factor obtained from the user and used in determination of said first factor substitute values; and each of said corresponding first goal variant values is the value of said first goal using said plan-model processes with said first factor plan value replaced by the first factor substitute value to which said first goal variant value corresponds, and depending on said relationship between said first goal and said first factor contained in said plan-model said corresponding goal variant values for said first goal are different from the plan value of said first goal, differ from any value of said first goal obtained from said initial what-if state of said plan-model and used in determination of said first goal variant values, and differ from any value of said first goal obtained from the user and used in determination of said first goal variant values;

in which graph line information is provided for the relationship between said first goal and said first factor and the value of said first goal at each value of said first factor for at least ten values of said first factor differing from any value of said first factor obtained from said initial what-if state of said plan-model and differing from any value of said first factor obtained from the user.

57. An apparatus, as claimed in claim 56, further comprising:

an electronic display screen for displaying said first graph line.

58. An apparatus, as claimed in claim 56, further including:

linking software for linking to said plan model to enable interaction with software of said plan model.

59. An apparatus, as claimed in claim 56, wherein:

said plan model is entered in an electronic spreadsheet which is activatable on a computer display screen.

60. An apparatus, as claimed in claim 56, further comprising:

means for identifying outputs for user selection of goals and identifying inputs for user selection of factors.

61. An apparatus, as claimed in claim 56, further comprising:

second means for identifying all of said inputs from said plan-model that affect said first goal.

62. An apparatus, as claimed in claim 56, wherein:

said first means includes means for determining said first factor substitute values, using said first factor plan value.

63. An apparatus, as claimed in claim 56, wherein:

said first means includes means for establishing a factor axis related to said first factor and a goal axis related to said first goal.

64. An apparatus, as claimed in claim 56, wherein:

said plan model contains a plurality of formulas that collectively determine a relationship between said first goal and said first factor but contain no formula expressing the relationship between said first goal and said first factor.

65. An apparatus, as claimed in claim 56, further including:

third means for selecting by the user of a plurality of factors including said first factor from said inputs of said plan-model and providing said first graph with a plurality of graph lines including said first graph line, wherein said plurality of graph lines illustrates a goal variant value for each of a plurality of factor substitute values for each of said plurality of factors selected by the user, contains at least ten graph points each representing at least one factor substitute value and a goal variant value not obtained from either the initial what-if state of the plan-model or from the user and each representing a different what-if state of said plan-model, and illustrates variation of plan-model values in a plurality of additional axes of value variation of said plan-model each established independently of the axes of value variation represented by the input and output values in said initial what-if state of said plan-model.

66. An apparatus that relates to graphic analysis of variation of economic plans, comprising;

a plan-model having variables including inputs defined to have externally entered input values and outputs defined to have output values determined through plan-model processes affected by one or more of said input values, said plan-model being changeable into any of a number of what-if states, each of said what-if states being a particular combination of particular values for said inputs and any change in any of said input values being a change of said plan-model from one what-if state to another what-if state, from which at least a first goal is chosen from said outputs and at least a first factor is chosen from said inputs, said first factor being chosen based on said first goal and being an economic parameter that is useful to a user in planning and managing said first goal and based on desire for information associated with a relationship between said first goal and said first factor contained in said plan-model wherein a change in the value of said first factor causes a change in the value of said first goal, and for which inputs input values are entered for an initial what-if state of said plan-model, in which what-if state all input values and all output values of said plan-model including the values of said first factor and said first goal are plan values;

first means for providing a first graph having at least a first graph line in which each graph point reflects a different what-if state of said plan-model, said first graph line including graph points each representing a different first factor substitute value and a corresponding goal variant value for said first goal, said first means also for interactively moving relative to said first graph line by selecting by the user of a position relative to a first axis of said first graph, and determining for a graph point on said first graph line at the selected position relative to said first axis the value and position of said graph point relative to a second axis of said first graph according to said relationship between said first goal and said first factor contained in said plan-model, wherein;

each of said first factor substitute values is determined based on said first factor plan value and a first magnitude of variation established for the value of said first factor, said first magnitude of variation being established based on said first factor plan value, said variation being in an axis of value variation determined independently of the axes of value variation represented by the input and output values in said initial what-if state of said plan-model, each of said first factor substitute values is different from and a replacement for said first factor plan value, said first factor substitute values differ from any value of said first factor obtained from said initial what-if state of said plan-model and used in determination of said first factor substitute values, and said first factor substitute values differ from any value of said first factor obtained from the user and used in determination of said first factor substitute values; and each of said corresponding first goal variant values is the value of said first goal using said plan-model processes with said first factor plan value replaced by the first factor substitute value to which said first goal variant value corresponds, and depending on said relationship between said first goal and said first factor contained in said plan-model said corresponding goal variant values for said first goal are different from the plan value of said first goal, differ from any value of said first goal obtained from said initial what-if state of said plan-model and used in determination of said first goal variant values, and differ from any value of said first goal obtained from the user and used in determination of said first goal variant values;

in which graph line information is provided for the relationship between said first goal and said first factor and the value of said first goal at each value of said first factor for at least ten values of said first factor differing from any value of said first factor obtained from said initial what, if state of said plan-model and differing from any value of said first factor obtained from the user.

67. An apparatus, as claimed in claim 66, further including:

second means for saving said first graph with an identifier, wherein upon selection of said identifier said first graph is reproduced on a display screen and on the reproduced said first graph the user can move interactively along said first graph line to a graph point representing a factor substitute value of said first factor relative to a factor axis and said factor substitute value and the first goal variant value of said graph point moved to are illustrated, said first goal variant value determined using said factor substitute value moved to and said relationship between said first goal and said first factor contained in said plan-model.

68. An apparatus, as claimed in claim 66, wherein:

said first means includes means for selecting from a number of graph lines said first graph line to move along and indicating that said first graph line is selected to be moved along.

69. An apparatus, as claimed in claim 66, wherein:

said first means includes means for interactively moving to at least a first graph point on said first graph line by selecting by the user of a factor substitute value for said first factor relative to a factor axis and illustrating a corresponding goal variant value for said first goal of said first graph point relative to a goal axis in accordance with the relationship of said first goal to said first factor in said plan-model.

70. An apparatus, as claimed in claim 66, wherein:

said first means includes means for displaying a number showing the value of said position relative to said first axis selected by the user and a number showing the value of said position of said graph point on said first graph line relative to said second axis determined using said value of said position relative to said first axis and the relationship between said first goal and said first factor contained in said plan-model.

71. An apparatus, as claimed in claim 66, wherein:

said first means includes reference markers illustrating the position of a graph point moved to along said first graph line relative to a factor axis and relative to a goal axis with position relative to one axis being user selected and position relative to the other axis being determined using said relationship between said first goal and said first factor contained in said plan-model.

72. An apparatus, as claimed in claim 66, wherein:

said first means includes means for interactively moving to a user selected goal variant value of said first goal relative to a goal axis and illustrating a graph point on said first graph line representing the goal variant value moved to and a first factor substitute value of said graph point relative to a factor axis determined using said goal variant value moved to and said relationship between said first goal and said first factor contained in said plan-model.

* * * * *